(12) United States Patent
Felten et al.

US009767960B2

(10) Patent No.: US 9,767,960 B2
(45) Date of Patent: *Sep. 19, 2017

(54) USE OF ORGANIC AND ORGANOMETALLIC HIGH DIELECTRIC CONSTANT MATERIAL FOR IMPROVED ENERGY STORAGE DEVICES AND ASSOCIATED METHODS

(71) Applicant: CLEANVOLT ENERGY, INC., Research Triangle Park, NC (US)

(72) Inventors: John James Felten, Chapel Hill, NC (US); Zakaryae Fathi, Raleigh, NC (US); James Elliott Clayton, Raleigh, NC (US); Jospeh H. Simmons, Tucson, AZ (US)

(73) Assignee: CLEANVOLT ENERGY, INC., Research Triangle Park, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/556,783

(22) Filed: Dec. 1, 2014

(65) Prior Publication Data

US 2015/0162131 A1    Jun. 11, 2015

Related U.S. Application Data

(63) Continuation of application No. 13/747,441, filed on Jan. 22, 2013, now Pat. No. 8,929,054, which is a continuation of application No. PCT/US2011/044912, filed on Jul. 21, 2011.

(60) Provisional application No. 61/366,333, filed on Jul. 21, 2010.

(51) Int. Cl.
| | |
|---|---|
| *H01G 4/18* | (2006.01) |
| *H01G 4/20* | (2006.01) |
| *H01G 11/00* | (2013.01) |
| *C08L 1/02* | (2006.01) |
| *C08L 1/28* | (2006.01) |
| *H01G 11/30* | (2013.01) |
| *H01G 4/008* | (2006.01) |

(52) U.S. Cl.
CPC ............... *H01G 4/183* (2013.01); *C08L 1/02* (2013.01); *C08L 1/28* (2013.01); *H01G 4/008* (2013.01); *H01G 4/206* (2013.01); *H01G 11/00* (2013.01); *H01G 11/30* (2013.01); *C08L 2203/20* (2013.01); *Y02E 60/13* (2013.01); *Y10T 428/31511* (2015.04); *Y10T 428/31663* (2015.04); *Y10T 428/31938* (2015.04); *Y10T 428/31971* (2015.04)

(58) Field of Classification Search
CPC . C01G 4/183; C01G 4/18; C01G 4/20; C01G 4/206; H01G 4/183; H01G 4/18; H01G 4/20; H01G 4/206
See application file for complete search history.

(56) References Cited

U.S. PATENT DOCUMENTS

| | | | | | |
|---|---|---|---|---|---|
| 4,702,987 | A | * | 10/1987 | Fukuchi | G03G 13/09 399/285 |
| 4,771,085 | A | * | 9/1988 | Lazaridis | H01B 3/40 522/103 |
| 4,784,932 | A | * | 11/1988 | Nakamura | G03F 7/0285 430/138 |
| 5,897,912 | A | * | 4/1999 | Shaikh | H01G 4/0085 29/25.41 |
| 6,069,244 | A | * | 5/2000 | Masuda | C09B 47/22 252/587 |
| 7,879,688 | B2 | * | 2/2011 | Novack | H01L 51/0537 257/E21.625 |
| 2002/0161074 | A1 | * | 10/2002 | Zhang | C08F 214/22 524/88 |
| 2003/0213408 | A1 | * | 11/2003 | Mochizuki | C09D 11/037 106/410 |
| 2004/0033307 | A1 | * | 2/2004 | Wu | H05B 33/10 427/66 |
| 2004/0060730 | A1 | * | 4/2004 | Lauf | C01G 23/003 174/255 |
| 2006/0030648 | A1 | * | 2/2006 | Flaim | C08G 79/00 524/176 |
| 2006/0171099 | A1 | * | 8/2006 | Barber | B32B 18/00 361/321.2 |
| 2006/0213382 | A1 | * | 9/2006 | Kanasugi | H01G 13/04 101/129 |
| 2007/0057364 | A1 | * | 3/2007 | Wang | C03C 8/02 257/701 |
| 2007/0080317 | A1 | * | 4/2007 | Iezumi | C04B 35/493 252/62.9 PZ |
| 2007/0228340 | A1 | * | 10/2007 | Hayes | B32B 17/10 252/587 |
| 2007/0232480 | A1 | * | 10/2007 | Yanagida | C04B 35/4682 501/139 |
| 2007/0235694 | A1 | * | 10/2007 | Nair | H01B 1/22 252/500 |
| 2008/0081195 | A1 | * | 4/2008 | Chung | C08F 214/22 428/421 |
| 2008/0145622 | A1 | * | 6/2008 | Roy | H01G 4/18 428/195.1 |
| 2008/0169530 | A1 | * | 7/2008 | Koebrugge | C04B 35/4682 257/532 |

(Continued)

FOREIGN PATENT DOCUMENTS

CN        101215414 A  *  7/2008

OTHER PUBLICATIONS

Machine translation of CN 101215414 A, 2013.*
Reda (Dyes and Pigments, 75, 2007, 526-532).*

*Primary Examiner* — Liam J Heincer
(74) *Attorney, Agent, or Firm* — Olive Law Group, PLLC

(57) ABSTRACT

A dielectric material is provided. The dielectric material includes at least one layer of a substantially continuous phase material. The material is selected from the group consisting of an organic, organometallic, or combination thereof in which the substantially continuous phase material has delocalized electrons.

15 Claims, 42 Drawing Sheets

(56) References Cited

U.S. PATENT DOCUMENTS

| | | | |
|---|---|---|---|
| 2008/0174931 A1* | 7/2008 | Skamser | H01G 4/30 361/272 |
| 2008/0226487 A1* | 9/2008 | Akimoto | H01G 4/008 419/2 |
| 2009/0278447 A1* | 11/2009 | Saitoh | C07C 13/62 313/504 |
| 2009/0281224 A1* | 11/2009 | Koh | H01B 3/006 524/435 |
| 2010/0097739 A1* | 4/2010 | Prymak | H01G 4/12 361/301.4 |
| 2010/0159259 A1* | 6/2010 | Kosowsky | H01L 27/1021 428/457 |
| 2010/0202100 A1* | 8/2010 | Koh | H01G 4/206 361/323 |
| 2010/0239793 A1* | 9/2010 | Andrews | B41M 5/46 428/32.69 |
| 2011/0252614 A1* | 10/2011 | Prymak | H01G 4/12 29/25.41 |
| 2011/0255210 A1* | 10/2011 | Tatemichi | H01G 4/203 361/311 |
| 2011/0255211 A1* | 10/2011 | Koh | C09D 127/16 361/311 |
| 2011/0260283 A1* | 10/2011 | Wu | H01L 51/052 257/506 |
| 2012/0006393 A1* | 1/2012 | Cruz | H01L 31/022441 136/256 |
| 2012/0104335 A1* | 5/2012 | Etori | B82Y 10/00 252/519.21 |
| 2012/0132898 A1* | 5/2012 | Pan | B82Y 10/00 257/40 |
| 2012/0153264 A1* | 6/2012 | Park | H01L 51/0007 257/40 |
| 2013/0049530 A1* | 2/2013 | Koo | H01L 41/0986 310/300 |

* cited by examiner

Dieperse Dielectric Material Into Vehicle

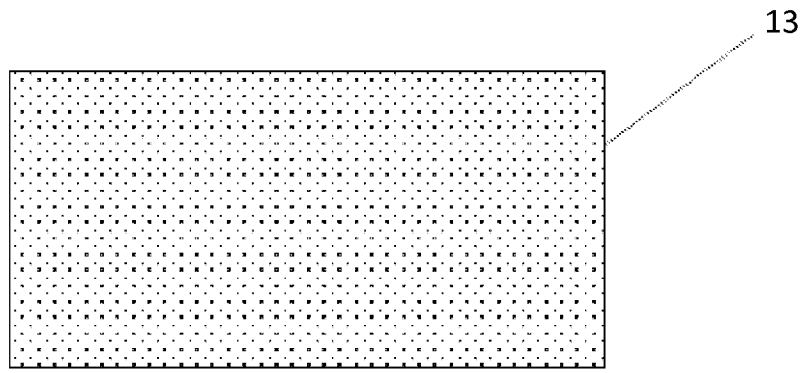
FIG. 5A Substrate/apply the bottom electrode
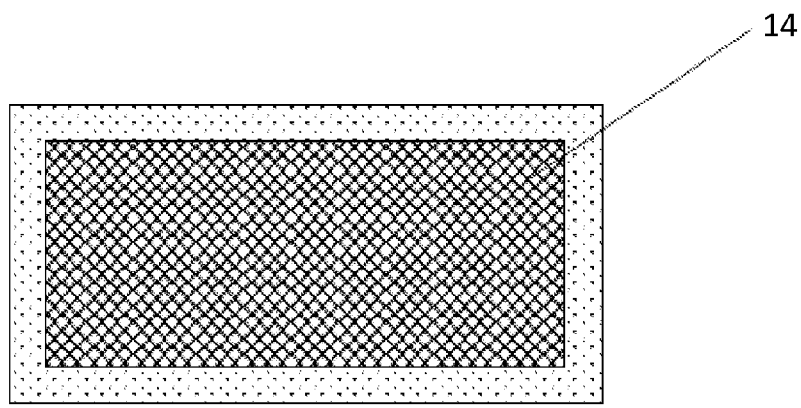
FIG. 5B Application of the dielectric paste
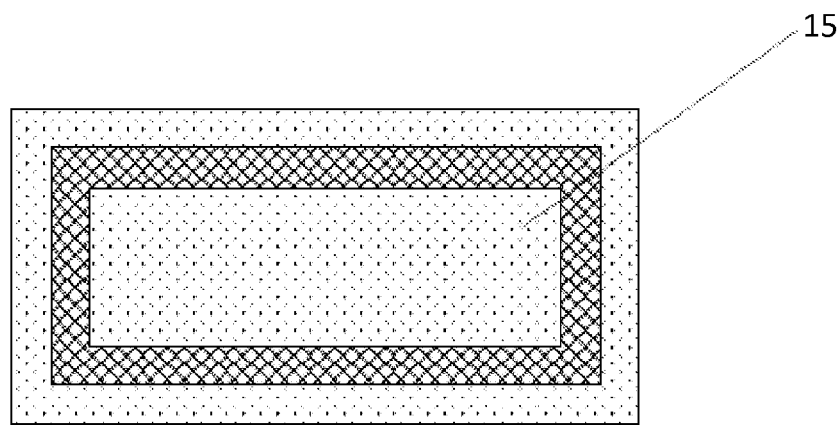
FIG. 5C Apply the top electrode

USE OF ORGANIC AND ORGANOMETALLIC HIGH DIELECTRIC CONSTANT MATERIAL FOR IMPROVED ENERGY STORAGE DEVICES AND ASSOCIATED METHODS

CROSS REFERENCE TO RELATED APPLICATIONS

This is a continuation of U.S. patent application Ser. No. 13/747,441, filed Jan. 22, 2013, which is a continuation of International Application No. PCT/US11/044912 filed Jul. 21, 2011, which claims priority to U.S. Provisional Patent Application No. 61/366,333 filed on Jul. 21, 2010; the entire contents of which are hereby incorporated by reference in their entireties.

TECHNICAL FIELD

The present invention relates to ultra-high charge capacity dielectric material (UHCC-dielectric material) for use in a dielectric material, associated fabrication methods, and applications of the dielectric material and fabrication methods. The dielectric material enables superior energy storage per unit mass or per surface area given a fixed thickness compared to existing state of the art materials.

BACKGROUND

Electrical energy has been used for providing energy to automobiles. Among the advantages of electrical propulsion are its cleanliness and lack of emissions during driving, high efficiency, quietness, and reliability. During the early years of automotive development electrical propulsion was a formidable competitor to the internal combustion engine.

The internal combustion engine had a decided advantage over electric motors because of the greater onboard energy storage afforded by liquid fuel, especially petroleum distillates and gasoline. Early electric automobiles had only a short range, typically less than 40 miles, followed by a lengthy charging cycle. By comparison, fossil fuel powered vehicles can travel hundreds of miles and need only a quick refueling in order to go another several hundred miles.

The significant drawback of electrically propelled automobiles has been the low energy density of the batteries used as a power source. Early batteries were usually lead acid type, which were very heavy and added to the weight of the vehicle. Over the years, improvements have been made in battery technology to reduce the weight penalty, but progress has not been sufficient to radically change the relative range of electrically powered automobiles versus their gasoline powered counterparts.

Recently, lithium ion batteries have been introduced which reduce the weight and increase the driving range of electric automobiles, but they are very expensive so that their most promising application is in hybrid automobiles where a smaller battery is sufficient. The small battery means that the primary energy source is still a gasoline powered engine.

Capacitors store electric energy. A capacitor usually includes a pair of electrodes that are configured on each side of a dielectric material to increase energy storage. The amount of energy stored by the capacitor is directly proportional to the dielectric constant. Thus the higher the dielectric constant, the greater the energy storage. Accordingly, efforts are being undertaken to develop dielectric materials with higher dielectric constants so that capacitors and related devices can be used for energy storage for powering devices and machinery including as automobiles.

SUMMARY

This Summary is provided to introduce a selection of concepts in a simplified form that are further described below in the Detailed Description of Illustrative Embodiments. This Summary is not intended to identify key features or essential features of the claimed subject matter, nor is it intended to be used to limit the scope of the claimed subject matter. Considerable work has been done on thin films of copper pthalocyanine which were prepared by sputtering or evaporation. There are several problems with using thin films, among which are a low breakdown voltage due to the thinness of films, and limited ability to make composite films.

One or more experiments and investigations disclosed herein investigated thick film structures with pthalocyanine, therefore, and successfully developed methods of making thick films that would act as capacitors with the ability to store charge hence ultra-high charge capacitors having capacitor like and battery like attributes.

Disclosed herein is the use of copper phthalocyanine particulates embedded within organic vehicles to form a ultra high dielectric constant k, and capacitors with ultra high capacitance and the ability to hold charge for long periods of time. One or more capacitors disclosed herein may be made by dispersing copper phthalocyanine particulates in a solvents and mixing the dispersion in a printing vehicle to form a green copper phthalocyanine dielectric. The green copper phthalocyanine dielectric is applied over a conductive electrode of a capacitor to form a thick film. The thick film copper phthalocyanine green dielectric layer is dried at 60 to 80 C and optionally sintered at 150 to 200 degrees C. to form a continuous layer. The preparation steps are repeated if necessary. A top electrode is applied over the bottom phthalocyanine dielectric structure of steps. This method has the advantage that large thickness dielectric layers can be applied, enhancing the charge storage capability and increasing the resistance of the dielectric, whereas conventional methods of creating a copper phthalocyanine dielectric were limited when using an extremely thin dielectric layers prohibiting a large scale polarization and charge storage.

A filler material can be added to the green paste of the novel dielectric to increase resistance.

BRIEF DESCRIPTION OF THE DRAWINGS

The foregoing summary, as well as the following detailed description of preferred embodiments, is better understood when read in conjunction with the appended drawings. For the purposes of illustration, there is shown in the drawings exemplary embodiments; however, the presently disclosed invention is not limited to the specific methods and instrumentalities disclosed. In the drawings:

FIG. 5A illustrates a first electrode according to at least one embodiment of the invention;

FIG. 5B illustrates a film made of the novel dielectric having ultra-high dielectric constant applied to the first electrode of FIG. 5a;

FIG. 5C illustrates a second electrode applied to the film and first electrode of FIGS. 5a and 5b;

DETAILED DESCRIPTION

Figure 1:
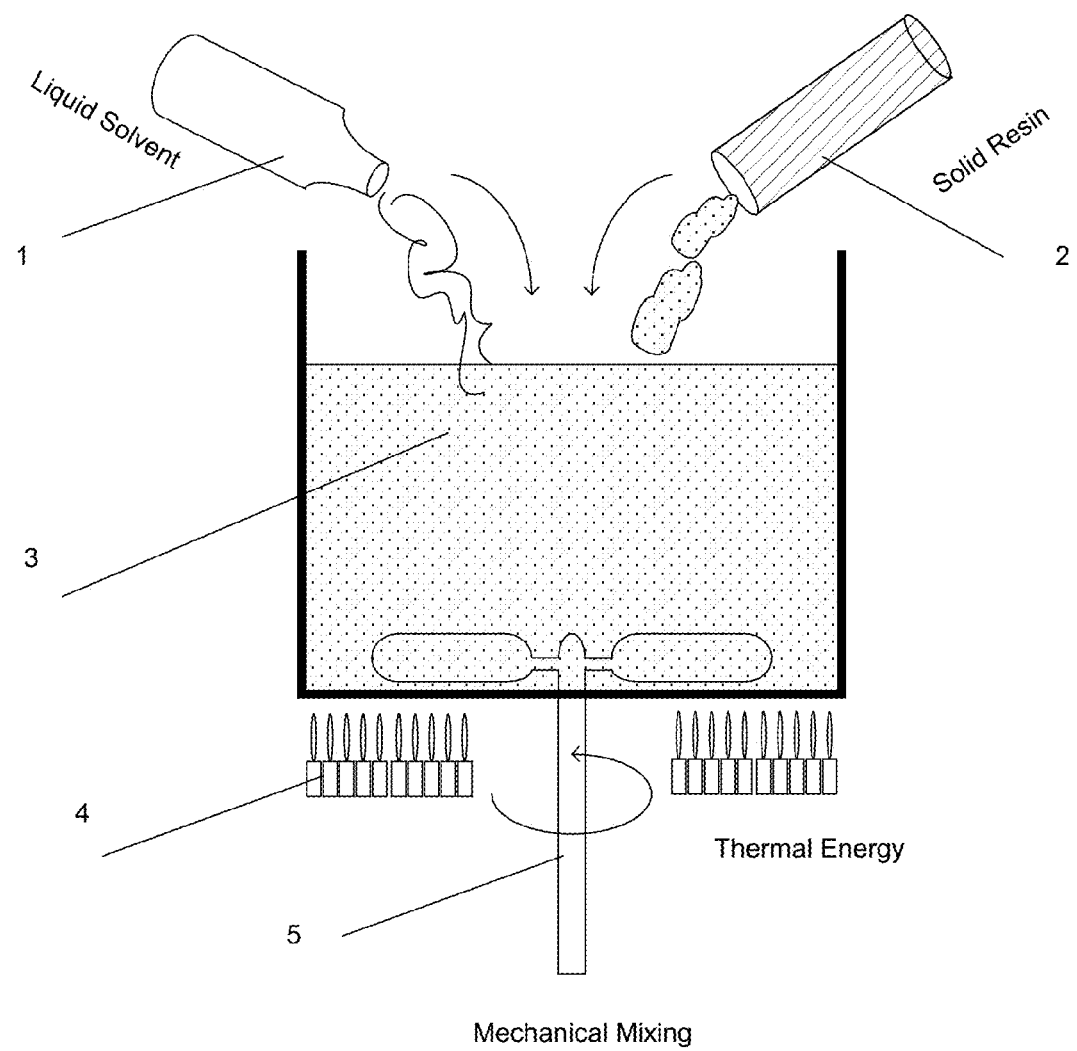
FIG. 1 is an illustration of the organic vehicle according to at least one embodiment of the invention, in which a solvent and a resin are mechanically stirred under heat to assist uniformity of the mix.

The presently disclosed invention is described with specificity to meet statutory requirements. However, the description itself is not intended to limit the scope of this patent. Rather, the inventors have contemplated that the claimed invention might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

According to at least one embodiment, one or more capacitors operate at or below 1 Hz, or may operate at as low as 0.00001 Hz, and are made by inner-layering special materials enabling extremely high charge storage at the molecular level. The inner-layered structure is stabilized to enable a macroscopic ultra-high charge storage with dielectric constant far exceeding 2,000 reaching into the 100,000 range and in special cases (post further stabilization) in the 35,000,000 range and higher.

The ultra high energy storage capability achieved, for example, enables far ranging battery applications from Personal Digital Assistants and computers to automobiles.

When used in a low frequency setting with the application of electrodes, the one or more UHCC-dielectric materials allow for the fabrication of one or more capacitor devices that may be used for battery applications. Such a device may operate at or below 10 Hz. In at least one embodiment, a capacitor device operates in a static conditions 0 Hz or below 0.1 Hz or 0.00001 Hz, and is constructed by preparing a paste of the un-processed dielectric material and subsequently applying at least on thick film and preferably multilayered thick film with a central inner layer for bridging the two halves of the dielectric and mating electrodes with each side of the formed layered dielectric structures while ensuring good electrical contact at the interface of the dielectric and the electrodes on each side to achieve high charge flow, charge build up and storage of said electrical charge at the super-capacitor level. In one or more embodiments, more than one layer of UHCC-dielectric material may be used.

The obtainment of a high dielectric constant (or high-K value) and superior charge storage per unit mass is enabled through the use of a family of organic and/or organometallic materials having delocalized electrons and characteristically long relaxation times (more than a minute) under oscillating electric fields.

Novel layering leading to the obtainment of high-K values and minimal leakage currents consists of forming and stabilizing a thick film of a substantially continuous phase out of the family of organic and organometallic materials. The materials family can include organic and organometallic semiconductors. The film can be made from the organic family alone or in combination with the family of organometallics. Conversely, the film can be made from the organometallic materials family alone or in combination with the family of organic materials.

The organics and/or organometallics materials may be selected from a group comprising Phthalocyanine, polycyclic aromatic hydrocarbon, Pyrene Benzoquinoline, Fluorescein, Carbonyl, Unsaturated Ketone, Anthrone, Uranine, Rhodamine, compounds and/or related organometallics such as Copper-Phthalocyanine, Zinc-Phthalocyanine, Nickel-Phthalocyanine, Magnesium-Phthalocyanine and other metals associated with the Phthalocyanine.

A thick film may be made of the organic materials disclosed herein, the organometallic materials disclosed herein, or a combination thereof. The terms organic, organometallic, and any combination thereof may be used interchangeably in these descriptions. In at least one embodiment, a thick film does not contain diluting agents or additives such as other high-K dielectrics, or semiconductors. Additives can be used for the purpose of dilution of a pure film to reduce the film potency in terms of charge storage but also beneficially increase resistance. Additives can be both organic and inorganic in nature. Additives can have a particle size, for example, of 50 nanometer or higher.

The fabrication of the novel thick film dielectric can be effectuated in various manners, one of which comprises first forming an organic vehicle by mixing a resin and a solvent and then adding a mixture of a solvent system with an organometallic material such as copper Phthalocyanine, for example, followed by a heat treatment to ensure the uniformity of the mix. The green paste can be improved by further mulling and or roll milling and subsequently applied to form a thick film on an electrode. The thick film is then dried for solvent removal and optionally heated to slightly elevated temperatures to promote the formation of necking between the various particulates to trigger the onset of sintering and to form a thick film with a continuous phase or a substantially continuous phase of compacted metal-phthalocyanine particulates. The thermal energy required may be estimated to correspond to at least a one tenth of the melting point, and may correspond to as much as one half of the melting point, of the organic and/or organometallic material. The vehicle material is formed by mixing a dielectric resin and solvents under heat to form a paste.

The formation of a diluted film can be effectuated in various manners, one of which may include mixing a dielectric material with the novel organic, or the novel organometallic or a mixture of the novel organic to the novel organometallic materials at advantageous ratios or concentrations, followed by a heat treatment to enhance the mixing, then to print on an electrode, then to heat and the particulate in the thick film to densify the particulate through the onset of sintering and to form a film having a substantially continuous phase within which a dispersed additive dielectric additive is in discrete phase or non continuous phase. The thermal energy required is estimated for drying is between 60 C and 80 C and the temperature required for densification is in the 150 C range which is typically at least one tenth of the melting point, and in one or more embodiments, one half of the melting point, of the organic and/or organometallic. In some cases, the organic and/or organometallic materials are semiconductors.

Dielectric material additives may be, but are not so limited to, alumina, silica, aluminosilicates, alkali aluminosilicates, alkaline aluminosilicates, Zeolites or an organic such as Bismaleimide-Triazine, cyanate ester, epoxy, silicones, polystyrenes, ethyl cellulose, nitrocellulose, Si, ZnS, GaAs, BaTiO3 or a combination thereof.

The net charge storage of a film can be optimized by changing the properties of the raw chemical ingredients used in a mixture as well as by changing the process parameters used during fabrication.

For instance, optimization techniques in the materials preparation may include, but are not limited to, changing the ratio or concentration of organic to organometallic materials used to form the film, or changing the concentrations of additive dielectric materials with respect to the novel organic material used in the novel dielectric paste that is prior to applying the dielectric thick film to the electrodes of a capacitor. Another method entails changing the dielectric constant of a dielectric material by choosing a material with a characteristic dielectric constant that is higher or lower that one used before.

Yet another technique includes doping special organometallic materials with chemicals that can deliver metallic dopants able to interact with the organometallic materials and lead to an observable overall dilution in charge storage capability. Such metallic doping methods may result in less efficient charge-storing dielectric layers but can also minimize charge storage.

For instance, optimization techniques in the process category may comprise, but are not limited to, controlling the thickness of a deposited layer, which may be a near pure film or diluted film, or controlling the stepped thermal profiles for heating the materials. The heating and cooling profiles can lead to formation of crystalline phases in the substantially continuous phase of the organic, organometallic, or mixed organic to organometallic materials. Other optimization methods include applying a high intensity electric field for aligning the molecules of the organometallic materials in special orientations.

The stabilization of the one or more capacitors disclosed herein made from the ultra-high charge capacity dielectric material (UHCC-dielectric) is accomplished through multi-layering or the use of various layers. Each layer can be tuned to have more or less charge storage capability from a maximum charge storage layer (being the pure film) to a low charge storage capability layer (having diluents or dielectric additives, or semiconductor additives or metal dopants). The additives play a key role in increasing internal resistance of the novel dielectric which in turns minimizes leakage currents.

Further stabilization of the novel dielectric used to construct the super capacitor is accomplished in the electrode region by having an interface layer between the electrode and the multilayer dielectric. The interface layer is configured to behave similar to a diode thereby allowing the passage of current substantially in one direction. The interface material can be derived by choosing a suitable metal doping for a specific organometallic. For example, Silver if the preferred metal dopant when the special organometallic is copper phthalocyanine.

Yet another method for stabilization in the electrode region is based on the use of a thin film having suitable electrical properties for maximizing the electrical coupling between the dielectric and the electrode. This thin film interface can be obtained by applying a liquid containing the appropriate carbon, activated carbon or graphene and subsequently evaporating the liquid to leave the residual dopants on the electrode interface and therefore form an interface layer bridging the dielectric material with the electrode. The concentration of charge carriers and pore size at the interface is tailored to avoid leakage currents and maximize surface area at the electrode level. The liquid interface can have various degrees of polarity and heavy ionic concentration.

The one or more dielectrics, capacitors, and related methods disclosed herein make use of substantially continuous phases rather than dispersed or discrete phases of the special organic and organometallic materials. This may be counter intuitive to the practiced state-of-the-art. For example, US Patent Publication No. 2006/0256503 A1 by Kato et. al discloses the use of organometallic materials in a dispersed configuration and for high frequency with limited high storage capability (below 150 degree C.). The present invention uses the route of liquid based chemistry to promote the densification of the copper phthalocyanine and zinc phthalocyanine particulates and the overall behavior of the novel capacitor depends on the thickness and the quality of the film which is related to the densification achieved between the particulates. This is exactly opposite from the teaching of Kato et. al. This is also different than all the thin film deposition techniques (sputtering and vapor phase deposition to name two) that inhibits charge build up.

Furthermore, the use of dispersed phases, which is conventionally used, is obtained through using high charge storage materials as fillers. Special care is given to avoid short circuiting the dispersed phases. Furthermore, special care needs to be taken to avoid dielectric breakdown taking place between the dispersed phases. Also, the use of high charge storage materials as fillers in a high frequency regime inherently limits the storage capability of the composited materials. The present invention is diametrically opposite in regards to some conventional practices. By using layered materials and using special organic and organometallic materials having delocalized electrons at the molecular level and having a long dielectric relaxation time, charges can be stored to a much higher extent without dielectric breakdown and without short-circuiting across the material.

The one or more UHCC-dielectric materials disclosed herein are stabilized to enable a super-capacitor having a macroscopic ultra-high charge storage with dielectric constant far exceeding 2,000 reaching into the 100,000 range and in one or more experiments, (post further stabilization) in the 35,000,000 range and higher.

The ultra high energy storage capability achieved in the one or more experiments relating to the disclosed subject matter enables far ranging applications from personal digital assistants, computers, renewable energy storage, energy transport, automotive electric cars and hybrids, and other applications to name a few.

The one or more capacitors and dielectric materials described herein are relevant from an industrial stand point and applicable to various battery related use.

Copper phthalocyanine is among the best known and best performing blue/green color pigments in inks and paints. It is colorfast and very intense, making it widely used. It has been in use for about 80 years since its development as a pigment by Dupont®.

Another property of copper phthalocyanine is its extremely high dielectric constant, making it orders of magnitude higher than the highest K ceramics used in electronic applications. It is unusable in electronic applications, however, because of the extremely low frequencies at which it has the high dielectric constant. Recently, however, speculation about supercapacitors use as battery replacements has raised the possibility that copper phthalocyanine could be used for supercapacitor applications. At frequencies from about 10 hz and below, the dielectric constant and hence capacitance are dramatically higher, giving supercapacitors using copper phthalocyanine much greater power storage capability than the best batteries currently available. Calculations based on simple estimates indicate a power storage capability in copper phthalocyanine capacitors of one to two orders of magnitude greater than a fuel tank of similar volume and weight, giving a possible range of up to many thousands of miles between charges.

These capacitors also have the potential of being much more efficient devices for storing and transporting energy in general than fossil fuels could ever be, affording the potential of revolutionizing the way energy is transported and stored. For example, a single freight train could be capable of transporting the energy equivalent of several million barrels of crude oil, as much as several tanker loads of crude oil. This technology could supersede the use of hydrogen-powered fuel cells in automobiles. They also make practical the use of nuclear power to charge these devices and transport the power in directly usable form to automobiles without the need for chemical conversion to a fuel such as hydrogen.

Use of Phthalocyanine in Capacitors

The United States published patent application no. US2006/0256503 to Iki et al. discusses a novel use of various materials including copper phthalocyanine. The application intended by Iki et al. demands very different properties from the one or more devices, methods, and other embodiments described herein. In Iki et al., the frequency range and the dielectric constant is in the range of 150. This dielectric constant is much lower than the intended use. One particular technical aspect that was described in the referenced patent emphasizes a major problem impeding the development of the ultimate high dielectric constant from the copper pthalocyanine and that is, the semiconductor property of the material. Iki et al. chose to use the material in a finely divided state, diluting it so that no conductive pathways are developed between the capacitor plates.

The one or more capacitors and devices disclosed herein overcome the semi-conductive nature of the material and make use of copper pthalocyanine in a constructive way to promote the build of much higher K of tens to hundreds of thousand by doping one of the electrode/capacitor interfaces to form a diode junction at that point. The leakage reduction is achieved using this method. Furthermore the device becomes less sensitive to the thickness of the dielectric layer. Yet another approach is to use a thicker layer of the copper pthalocyanine to increase resistance. This method is used along with stabilizing the innerlayers and minimizing voltage breakdown. Based on theoretical understanding and literature reviews, the Copper phthalocyanine has a crystalline configuration that consists of molecules stacked flat against each other. This may suggest that the interaction between the copper atoms in the center of individual molecules and neighboring phthalocyanine molecules is the origin of the extremely high dielectric constants observed in the one or more devices disclosed herein. The phthalocyanine molecule has a system of sixteen delocalized electrons. Since systems of delocalized electrons obey the rule 6+4n, where the numbers represent electrons and n is an integer, systems containing 6 electrons (benzene), 10 electrons, (naphthalene), 14 (polycyclic aromatic molecules), and up in increments of 4 electrons, this yields stable configurations.

Phthalocyanine may be converted to an anion by deprotonating two nitrogens in the ring, achieving the stable 18 electron configuration. The center of the molecule is suitable for containing a divalent cation such as copper. An extremely stable organic anion is thus achieved.

Since the CuPc molecules are stacked flat, placing copper ions in individual molecules close enough to interact with their neighbors, conductivity related to movement of the cations through a "tunnel" of negative Pc rings of nitrogen might be expected, and does occur. The cations are apparently easily moved in an electric field so as to polarize large numbers of adjacent molecules simultaneously. The polarization in addition to polarizing molecules producing extremely high dielectric charge capacity, causes the copper ions to move sufficiently that some transfer of copper cations from molecule to molecule through a sort of "tunnel" of electric charge from the Pc ions will occur. This causes the phenomenon of low insulation resistance that we see in our compositions, in addition to extremely large charge capacity in our capacitors.

Mixtures of different sizes of crystallites as well as different metals in the center of Pc anions hinders movement of cations between crystallites in the one or more dielectric materials and compositions disclosed herein. Pure CuPc has a resistivity as low as 8 Kohms per mil of thickness per cm sq. in our films. By mixing different MPc crystallites (M=Cu and Zn), and adding $BaTiO_3$ to the compositions. The resistance may be increased to about 1 Mohm per cm square. Further increase of several orders of magnitude in resistance can be achieved by the use of thick (as high as hundreds of mils) dielectric films. The advantageous nonlinearity of charge versus voltage makes this possible.

Supercapacitors

An alternative to the chemical battery is the so-called supercapacitor, which does not generate electrical current by a chemical reaction, but simply stores an electrical charge by the electrostatic attraction between oppositely charged plates. The amount of charge stored on capacitor plates is enhanced by interposing a layer of material with a higher dielectric constant between the plates. These materials can make the amount of charge stored tens of thousands of times greater than when the intervening space between capacitor plates is air or a vacuum. There is a need for a supercapacitor that is competitive with lithium ion batteries.

Dielectric Materials

The dielectric behavior of a material depends on its short-range electrical conductivity. The short-range motion of a material's charge carriers leads to electrical energy storage. The capacitance, C (in F or C/V) of a dielectric material is defined as the ratio of the stored charges, Q (in Coulombs-(C)), to the applied voltage V (in Volts):

$$C=Q/V$$

The ratio of the capacitance of a condenser filled with a dielectric material, C, to that of a vacuum capacitor, Co, of the same geometry (spherical, cylindrical, parallel plate) is defined as the dielectric constant of that material:

$$k=C/C_0$$

For a parallel plate capacitor with an area A (in m2) and separated by distance, d, (in meters), C and $C_0$ are found to be $$C0=\epsilon_0 A/d$$

$$C=\epsilon A/d$$

where $\epsilon_0$ is the permittivity of free space (8.854×10−12 C2/m2 or F/m) and $\epsilon$ is the permittivity of the dielectric material (F/m). The relative dielectric constant of the material is therefore the ratio of the material's permittivity, $\epsilon$, to the permittivity of free space $\epsilon 0$:

$$k^*=\epsilon/\epsilon 0$$

The relative dielectric constant (also referred to as the relative permittivity), which is independent of the applied electric field at low field strengths. For very strong fields, the permittivity may depend on the field strength and saturation effects are detectable.

The dielectric constants of materials are frequency dependent and can be as low as 3.78, for materials such as SiO2, and very high, about 1100 GHz, as with materials such as BaTiO3. Since the relative dielectric constant of a dielectric material is greater than unity, the ability of a condenser to store charges is increased. The reason for this increase in capacitance is a result of polarization effects occurring at the molecular level inside the material. The charged species inside the material are displaced from their equilibrium position and create dipoles under the influence of an externally applied electric field. The created dipoles tend to orient with the electric field and tie up charges on the plates of the condenser. Consequently, part of the applied electric field is neutralized. Indeed, if the voltage across a dielectric field condenser is expressed as a function of the vacuum capacitance, the following expression results:

$$V=(Q/k)/C0$$

The voltage required to maintain the same surface charge is only a fraction of the voltage across the vacuum capacitance. The bound charge is neutralized by the polarization of the dielectric. The charge which is not neutralized by the dipoles is called the free charge and is equal to Q/k. The free charge sets up an electric field and voltage toward the outside.

There are four major polarization mechanisms in dielectric materials that contribute to charge storage, all of which involve short-range charge motion. Depending on the operating frequency, one or a combination of several polarization mechanisms might be at work.

Electrical-Double-Layer Capacitors, Super-Capacitors, and Ultra-Capacitors

Simple air-gap capacitors consist of two parallel or concentric electrodes which are made up of an electron-conducting material, connected to an external circuit. The electron conducting material can be any good electronic-conducting material, well-known to those practiced in the art, such as copper, silver or gold. The two opposite plates are charged with opposite charges (electrons on one plate and electrical holes on the other plate). These charges balance each other and if the space between the plates is filled with air (e.g. and air-gap capacitor) the energy that can be stored by the device (U) is given by the equation:

$$U = \tfrac{1}{2} C V^2$$

where C equals the capacitance of the capacitor and V equals the applied voltage.

The capacitor electrodes need to be in close proximity to each other in order to generate a high capacitance, and they can be parallel flat plates, or concentric cylinders or spheres, or any desired shape that can hold charge of opposite sign in close proximity to each other.

For parallel-flat-plate capacitors, the capacitance (C) is given by the equation:

$$C = \epsilon_0 A/d$$

where A is the area of the plates, d is the separation between the plates and $\epsilon_0$ is the dielectric permittivity of free space or air which is nearly the same.

In order to increase the amount of energy that can be stored in a capacitor, electrical configurations are developed in which the space between the electrodes is replaced by a material that exhibits a larger dielectric permittivity.

As charge builds up on the electrodes, and equal and opposite charge builds up on the dielectric filling the space between. The dielectric permittivity of the space between the electrodes increases to a dielectric permittivity ($\epsilon$) value of:

$$\epsilon = \kappa \epsilon_0$$

where $\kappa$ is the dielectric constant of the material between the electrodes.

The stored energy is proportional to the capacitance, and the capacitance increases proportionally with increased permittivity and electrode area.

The maximum operating voltage is determined as either the dielectric breakdown voltage of the material between the electrodes, or its decomposition voltage. Most are limited to about two (2) to about three (3) volts.

Super-capacitors and ultra-capacitors are designed to exhibit very high values of capacitance in order to have the ability to store a large amount of charge. There are at least two common ways to achieve this by either increasing the surface area of the electrodes and/or increasing the dielectric constant of the materials between the electrodes.

There are many inventions relating to electrode materials for supercapacitors. Commercial electrodes and capacitors (Maxwell, Ness, Nippon, Power Systems, Batscap, LS Cable and others) are made from carbon (graphite) powder or activated carbon powder. Powder increases the surface area of the electrodes over a solid electrode by many times. New developments are ongoing in graphene materials, carbon nanorods or nanotubes and porous materials to increase both the surface area and conductivity of the electrodes. Some studies have also examined nanoporous metals, metal oxides and semiconductors.

Portions of the subject matter disclosed herein concern increasing the dielectric constant of the materials between the electrodes. When this material allows diffusion of ionic species of different sign of charge to cause the polarization that enhances charge build up, then it is called an electrolyte. Electrolytes can be liquids, fluids and solid. Typical electrolytes used in super- or ultra-capacitors include aqueous acids, organic and ionic liquid electrolytes. (sulfuric acid or potassium hydroxide in an aqueous solution, propylene carbonate, $TEABF_4$ in acetonitrile, BMIIM, $EMI-BF_4$ which is 1-ethyl-3-methylimidazolium-tetrafluoroborate, and EMI-DCA).

Frequency Dependence of Polarization

Since the polarization of matter is of interest, it is desirable to classify the various types of polarization with reference to the time required for the polarization process. The polarization process always involves rapidly forming dipoles and in some instances may also involve slowly forming dipoles (referenced in its entirety is a 1994, PhD dissertation on Surface Modification Of Sodium Aluminosilicate glasses Using Microwave Energy by Z. Fathi)

Electronic polarization is a result of the displacement of the electrons in the atoms relative to the positively charged nuclei. This process requires about $10^{-15}$ seconds and corresponds to approximately to the frequency of ultraviolet light. Moreover, this process gives rise to a resonance peak in the optical range. The refractive index of a material is strongly dependent on the electronic polarization.

A relatively small atomic polarization arises from the displacement of atoms relative to one another inside the molecule, a process requiring about $10^{-12}$ to $10^{-14}$ seconds and corresponding to the frequency of infrared light. In ionic crystals, a similar but usually larger polarization arises from the displacement of oppositely charged ions, a process requiring about $10^{-12}$, and corresponding to the frequency of the far infrared region. A resonance absorption occurs at a frequency characteristic of the bond strength between the ions. Resonance absorption is characterized by large restoring forces and small damping effects.

Orientation polarization, also referred to as dipolar polarization, involves the perturbation of the thermal motion of ionic or molecular dipoles, producing a net dipolar orientation under the direction of an applied electric field. This is perhaps the most important mechanism of polarization in the microwave frequency range.

The time required for the dipolar polarization process depends upon the frictional resistance of the medium to the change of molecular orientation. The resistance to dipolar motion is equivalent to large damping effects, resulting in relaxation type absorption. For gases, the time required for the process is in the range of between about $10^{-12}$ seconds, corresponding to the far infrared region. For small molecules in liquids of low viscosity, the time required is between about $10^{-11}$. For large molecules or viscous liquids, the time required is in the order of $10^{-6}$ seconds, corresponding to radio frequencies. The high internal frictional resistance of very viscous liquids, glasses, and solids may lengthen the time required for the polarization process to seconds, minutes, or longer.

The orientation polarization mechanisms can be categorized in two types. First, molecules (liquids, gases and polar solids) containing a permanent dipole may be rotated against an elastic restoring force about an equilibrium position. The time required for the oscillation of these permanent dipoles is in the order of $10^{-10}$ to $10^{-12}$ seconds at room temperature. The orientation polarization involving permanent dipoles is sometimes referred to as deformation polarization.

The second mechanism of dipolar polarization involves the rotation of dipoles between equivalent equilibrium positions. This mechanism is of special interest in glass and ceramic materials. The interstitial cations give rise to losses, which are greater the more loosely bound the cations. The required time for this process is greatly dependent on the structure of the inorganic or organic matrices, and the binding energy distribution of the alkali ions. Due to the appreciable atomic distances involved in the ionic transitions, this polarization occurs at a frequency range of 103-106 Hz, at room temperature. Because this mechanism involves the same mobile cations that contribute to the dc conductivity, it is also referred to as migration loss.

In heterogeneous materials, an additional type of polarization, interfacial polarization, arises from the accumulation of charge at the interfaces between phases. It arises only when two phases differ from each other in dielectric constant and conductivity. For a two-layer dielectric, when the product of the dielectric constant ∈1 of one phase and the conductivity σ2 of the second phase is unequal to the product of the dielectric constant ∈2 of the second phase and the conductivity σ1 of the first phase, that is, ∈1 σ2≠∈2 σ1, space charge polarization is exhibited. Impurities or second phases usually represent physical barriers to conduction and lead to charge build up at the interfaces of the heterogenous materials. The charge pile-up at the different barriers leads to localized polarization of the material. If the ac field is of low enough frequency, a net oscillation of charge is observed. The interfacial polarization is observed over a broad range of frequencies.

The losses associated with the different polarization mechanisms occur at different frequency ranges. The atomic and electronic polarizations usually result in resonance absorption peaks. Orientation and space charge polarization on the other hand, results in relaxation absorption. In practice, depending on the material, the orientation and space charge losses can be quite broad and extend over an overlapping range of frequencies. It is often impossible to distinguish between them.

Of all the possible losses, orientation polarization is probably the dominant loss mechanism in the RF and microwave frequency range. However, along with orientation polarization losses, Maxwell-Wagner polarization together with DC conductivity losses are important contributions to charge storage and the loss mechanisms associated with them. Hence the complex nature of the dielectric constant There are two ways in which the complex nature of the dielectric constant is demonstrated: a) Ampere's circuital law and b) charging current in a linear dielectric within a circuit configuration. The following is limited to the charging current within a dielectric.

The stored charge in the dielectric can be expressed as a function of the applied voltage and the capacitance (a constant):

$Q=V/C$

The charging current can be expressed as:

$Ic=dQ/dt$

Combining the two equations gives:

$Ic=C(dV/dt)$

For a sinusoidal voltage in the form of V=V0exp(iωt), the expression for the charging current is as follows:

$Ic=i\omega CV0\exp[i(\omega t)]$

In an ideal dielectric there would be no free-ion conduction and no loss currents. The total current would therefore be equal to the charging current, Ic, and would lead the voltage by 90 degrees In real dielectrics (actual insulating materials), there are loss currents arising from two sources: a) ohmic conduction and b) polarization. The ohmic conduction losses involve the long range motion of charge carriers. Polarization (previously discussed) results in losses due to the dipoles resistance to oscillation and/or rotation under an alternating field. The ohmic and polarization loss currents can be expressed as:

$I_O=G_{dc}V$ $I_P=G_{ac}V$ in which Gdc and Gac are the dc and ac conductance in units of ohm-1. The loss current, $I_L$, corresponds to the summation of both the ohmic loss current, $I_O$, and the polarization loss current IP:

$I_L=I_O+I_P$

Expressed as a function of voltage and conductance, IL becomes:

$I_L=(G_{dc}+G_{ac})V$

The loss current is in phase with the applied voltage because Gac and Gdc are not complex in nature. The total current of the capacitor filled with a dielectric corresponds to the summation of the charging current and the loss current:

$I_T=I_C+I_L=(i\omega C+Gdc+Gac)V$

The charge stored in the dielectric can be expressed as $Q=CV=kC_0V$

Since the total flow of current is equal to the variation of charge with respect to time, the following expression is obtained:

$I_T=dQ/dt=C\ dV/dt=kC_0i\omega V$ $kC_0i\omega V=(i\omega C+G_{ds}+G_{ac})V$ this expression yields:

$k=C/C0-[i(Gdc+Gac)]/\omega C_0$

Thus, one demonstrates the complex nature of the dielectric constant of the material. The real and imaginary parts of k* are given as:

$K'=C/C0$ and $k''=(Gdc+Gac)/\omega C_0$

The total current inside a real dielectric possessing both charging and loss processes is expressed as a function of one complex parameter, k*, that is intrinsic to the material and has the following forms:

$k^*=k'-ik'$

The permittivity of real dielectrics is also complex in nature:

$\in^*=\in'-i\in''$ and is related to the complex dielectric constant:

$k^*=\in^*/\in_0$

The real part of $k^*$, $k'$, describes the ability of the dielectric to store charges and is referred to as the charging constant or dielectric constant. The imaginary part of $k^*$, $k'$, describes the losses exhibited by the dielectric and is called the dielectric loss factor. The ratio of the loss factor to the dielectric constant, tan δ, is referred to as the loss angle or the dissipation factor. The loss tangent is defined also as the ratio of the loss current to the charging current:

It is useful to relate the relative dielectric constant, $k'$, of the material, which is a macroscopic characteristic of the material, and the polarizability which is a characteristic of the molecule. This relationship can be established by considering the total electric displacement field or the electric induction, D (in C-m2). In free space, the relationship between the induction and the electric field is given by:

$$D = \in_0 E$$

In the presence of a material, the electric induction is a function of the properties of the medium, and is related to the externally imposed electric field by the complex permittivity of the material, $\in^*$, through the following expression:

$$D = \in^* E$$

The electric displacement field is also defined as the sum of the induction (if there was no dielectric in the condenser) and the polarization field within the material:

$$D = \in_0 E + P \text{ or } P = D - \in_0 E$$

Therefore, we can express P as a function of E:

$$P = \in^* E - \in_0 E = (\in^* - \in_0) E = \in_0 (k^* - 1) E$$

$$k^* - 1 = P/(\in_0 E)$$

the definition of the polarization which is described as the total dipole moment induced in a unit volume of the material. The polarization is a measure of the change in the capacitance (or field), so that:

$$P = (C-C0)V = C0V(k^*-1) = (Q/V)V(k^*-1)$$

$$P = \in_0(V/d)(k^*-1)$$

$$P = \in_0 E(k^*-1)$$

The tan δ, the ratio of the loss factor to the dielectric constant is therefore:

$$\tan \delta = \in''/\in' = (\in s - \in inf)\omega\tau/(\in s + \in sw2\tau2)$$

Space Charge Polarization Versus Loss

There are two main types of interfacial polarization. The first involves a variation of electrode polarization, the second consists of the dielectric behavior due to heterogeneities in materials (Maxwell-Wagner polarization)

Conductivity Losses

In mixtures containing large amounts of conductive phases, high losses due to dc conductivity can occur. The conductivity losses can be represented by:

$$E''dc = \sigma dc/\omega \in \text{ the conductivity losses dominate at low frequencies.}$$

Examples:

EXAMPLES

Paste Preparation.

There are several approaches to preparing films with which to make capacitors. Considerable work has been done on thin films of copper pthalocyanine which were prepared by sputtering or evaporation. There are several problems with using thin films, among which are a low breakdown voltage due to the thinness of films, and limited ability to make composite films.

One or more investigations disclosed herein investigated thick film structures with pthalocyanine, therefore, and began investigating methods of making films that would act as capacitors. First attempts were to use commercially available copper pthalocyanine made by the same process as pigmentary copper pthalocyanine (CuPT), which was about 2000 Angstroms particle size. Two problems arose: first, the solids loading of potential thick films was only about 30 weight percent, or 21 volume percent. TABLE I illustrates the composition of polymer containing thick film CuPC compositions.

TABLE I

| Chemical | Weight Percentage |
|---|---|
| CuPC (2000 Angstrom) | 28% |
| Texanol | 69% |
| Ethyl Cellulose (Dow) | 3% |

The CuPC was dispersed by mulling the above mixture between two glass plates until a satisfactory dispersion was achieved, as determined by drawdown examination under a microscope. This paste was applied by screen printing, and extensive mesh defects and mud cracking made the films impractical.

Another approach was tried, this time using only solvent and CuPC. TABLE II illustrates Solvent/Slurry of CuPC/Texanol.

TABLE II

| Chemical | Weight Percentage |
|---|---|
| CuPC | 33% |
| Texanol | 67% |

This material was again dispersed by mulling between two flat glass plates, then instead of screen printing the material was skived on by using a spacer tape on the edge of substrates and drawing down the ink slurry using polyimide tapes with 60 micron thickness along the edges of the film, and an Exacto knife blade as a drawdown straight edge. Again, excessive cracking was observed when films were dried at high temperatures, which was countered by drying films very slowly; under vacuum for example, the solvent was removed at about 55 degrees C. Cracking was dramatically reduced using this technique.

Gold plated Kovar(r) substrates 17×17 mm in size were obtained and used as printing substrates/electrodes. These were coated with CuPC at about 20 microns volume thickness after drying, assuming no voids; in actual practice, about 25 to 30 microns were measured. Capacitors were then made by clamping two substrates with CuPC films facing together with a C-clamp, and optionally heating overnight in an oven at 80 to 150 degrees C.

Electrical properties of these films were then measured and we found that the internal resistance of these capacitors was measured as high as 15,000 ohms, with capacitance in excess of 50 microfarads, on s 2.5 sq cm capacitor. Thus, the dielectric constant was initially determined to be in excess of 500,000.

Capacitors were also successfully made by drawing down CuPC slurry on aluminum foil, but these foil based devices were more difficult to handle and prepare than the ones on the thicker gold plated Kovar.

CuPC Film Densification

The CuPC films readily sinter and densify at 80 degrees C. and above, due to the extremely fine particle size of the powder (around 2000 angstroms). An oxygen free atmosphere is desirable because in oxygen the CuPC oxidizes, and the oxide film coating gives the film a lower insulation resistance. The reduction in electrical resistance by this oxide layer is about 90 percent, although capacitance is doubled.

We have found that heating at 80 degrees C. reduces the tendency to oxidize and dramatically reduces the tendency of cracks to form in the CuPC film during drying. TABLE III illustrates some Early Test Results from Devices Made in Above Experiments.

TABLE III

| Shear Method | Shear | Temperature Thermal Treatment | Pressure During Process | Pressure During Measurement | Measurements Resistivity | Capacitance |
|---|---|---|---|---|---|---|
| Screen Printing | Glass Plate + Metal Blade | 250 C. to 311 C. | N | N | 40 MOHMs ++ | <0.4 nF |
| Skiving on Metal Foils | 2 Glass Plates | 150 C. | Y | Y | 14 KOHMs/Cm2 | >40 mcrF |
| Skiving on Bottom Electrode | 3 Glass Plates | 150 C. | Y | Y | 5 KOHMS/Cm2 | >40 mcrF |
| Dip Transfer | No Shear | 150 C. | Y | Y | 40 MOHMs ++ | <0.2 nF |

Using Additives in CuPC Films Zinc Pthalocyanine

Zinc Pthalocyanine (ZnPC) was investigated as an additive to potentially increase insulation resistance (IR) of CuPC films. ZnPC was dispersed in a slurry containing Texanol(r) (See Table IV) to use in a mixture with CuPC slurry, to see whether the IR of capacitors made from these mixtures could be increased. TABLE IV illustrates a formula of slurry containing ZnPC.

TABLE IV

| Chemical | Weight Percentag |
|---|---|
| Zinc Pthaloccyanine | 33% |
| Texanol | 67% |

A 10/90 mixture of the composition in Table IV (ZnPC)/Table II (CuPC) was made and films were drawn down on aluminum foil and Kovar substrates. The 10% ZnPC doped films were joined to 100% CuPC films on aluminum foil and Kovar substrates. Resistances in the megohm range were measured with these devices, and over 40 microfarads capacitance was measured.

Adding Glycerol to Reduce Shrinkage and Improve Insulation Resistance

We have found that use of polar solvents improves electrical properties of CuPC films in these capacitors. CuPC films sintered at 150 C. for example, can be difficult to join effectively when two coated electrodes are abutted and pressed together. One typically can get high resistance in the megohm range and extremely low capacitance, around 0.1 nanofarads per square centimeter.

This difficulty can be overcome by adding about 10 percent by volume of glycerol to the CuPC in the slurry. The Texanol solvent can be easily dried while leaving the glycerol behind. Insulation resistances of 200 to 250 Kohms are typical, capacitance approaching 1 millifarad/cm2 is obtained, yielding a dielectric constant as high as 35,000,000. Table V gives typical formulations for compositions with these additives. Table VI gives the electrical properties of capacitors with glycerol additive.

Other polar solvents, notably acetone and methanol, have the same effect when allowed to diffuse into the films from the edges, but these examples are too volatile to be practical as additives. The reason why glycerol and these solvents are effective is probably that there is some plasticization of surface diffusion of solvents into the microcrystals of CuPC. This permits the two layers to form an intimate interface, and facilitates their joining to produce an electrically functional film. TABLE V illustrates formulations of CuPC and ZnPC/CuPC slurries.

TABLE V

| Chemical | Weight Percentage |
|---|---|
| Formulation 1 | |
| CuPC | 33.0% |
| Glycerol | 3.0% |
| Texanol | 64.0% |
| Formulation 2 | |
| CuPC | 29.4% |
| ZnPC | 3.6% |
| Glycerol | 3.0% |
| Texanol | 64.0% |

TABLE VI illustrates electrical results of tests of glycerol containing films. As can be seen, the addition of glycerol made a significant difference.

TABLE VI

| CPC | ZnPC | TXN | TPG | Glycerol | Device Built and tested | C (F) | ROHM (24 hrs) | 1st Half sec | 2nd half sec |
|---|---|---|---|---|---|---|---|---|---|
| 21% | 7% | 69% | | 3% | B12/B12 (2 caps in series) | 4.0E−05 | | 120 | 1080 |

TABLE VI-continued

| CPC | ZnPC | TXN | TPG | Glycerol | Device Built C and tested | C (F) | ROHM (24 hrs) | 1st Half sec | 2nd half sec |
|---|---|---|---|---|---|---|---|---|---|
| | | | | | B9/B10b (10 cm × 1 cm) | 1.3E−05 | 1.0E+07 | 12 | 108 |
| | 33% | 67% | | | B9 | 1.3E−05 | 7.0E+06 | 30 | 210 |
| | | | | | B11/B10b (10 cm × 1 cm) | 4.0E−05 | 1.8E+06 | 2 | 120 |
| | | | | | B11 | 4.0E−05 | 1.6E+06 | 3 | 27 |
| 33% | | 67% | | | B6/B6 | 4.0E−05 | 1.2E+06 | | |
| | | | | | B11/B10b + B field | 2.5E−06 | 8.0E+06 | | |
| | | | | | B82/B82 | 3.5E−07 | 4.0E+07 | | |

Applying Pressure During Heat Treatment (Drying and Partial densification or Partial SINTERING)

The CuPC and ZnPC. being finely divided, will sinter at temperatures approximately one half their melting point (in degrees Kelvin). In fact, because of the submicron size of the CuPC, it can be expected to sinter at well below half its melting point (603 degrees C.). We have been successful in densifying the CuPC at about 80 degrees C., and have obtained high capacitance (as high as 35,000,000) using temperatures of 80 to 150 degrees C. and adding low to moderate pressure by squeezing the film with a vise. The use of a glycerol or other additive, preferably with low solubility capacity for CuPC, also aids in the coalescence of the CuPC into a solid body at lower temperatures and pressures.

In one or more experiments, it was demonstrated the formation of a monolithic structure by successive heating, first as low as 60 degrees C., then increasing the temperature to 150 degrees C. Thus, it is possible to create highly dense thick films of CuPC, which is a prerequisite to forming high dielectric constant dielectric material.

Multiple Solvents

Often, when a very low solids slurry is to be printed, the use of several solvents is helpful in getting the required degree of shrinkage without causing mud cracks. If a single solvent dries rapidly in such a slurry there is not sufficient force generated as solvent evaporates to cause the particles to pack tightly together. However, if the evaporation is staged so that in a first stage the particles are forced closer together while still in a liquid matrix, less shrinkage must be undergone in subsequent solvent evaporation, and the particles are more likely to shrink uniformly. Also, the addition of a limited amount of a very viscous, very low vapor pressure solvent was the last to dry will dramatically reduce the rate of drying and also provide viscous force to cause the particles to interact with each other, dramatically reducing the occurrence of film defects. A final solvent with a limited solubility in the slurry solids also helps the particles to coalesce slowly, as though the final body had been plasticized. Once a solid body has been achieved, the last component of the solvent system can be evaporated, leaving a solid body. A three-component solvent system that we have evaluated with success is listed in Table VII. The glycerol was calculated to provide about 10% by volume of the CuPC and/or ZnPC solids in the slurry. Glycerol is very slow drying compared to texanol and tripropylene glycol, so it is essentially all present as the last remaining component. If desired, the Glycerol can be left in the dielectric body without harming capacitance, and actually improving the insulation resistance. Sealing the edges of the capacitor will make the glycerol essentially permanent. TABLE VII illustrates a three-component solvent system investigation and results.

TABLE VII

| Chemical | Weight Percentage |
|---|---|
| Texanol | 66.0% |
| Tripropylene glycol | 29.5% |
| Glycerol | 4.5% |

Graded Particle Size Mixtures in Improve Solids Packing, Reduce Film Defects

Often, to improve solids packing in a film, a slurry makes use of the phenomenon of graded particle sizes in the slurry. This permits smaller particles to fit into the spaces between the larger particles, thus permitting higher solids loading in the slurry and reducing the amount of shrinkage during drying to densify the film.

Usually, the best results are obtained using three graded particle sizes, each about one fourth the size of the next larger particle size, and in about one fourth the volume of the next larger size. Two particle sizes leaves significant unfilled space that could be taken up by a small fraction, and more than three particle sizes adds very little more to the packing level. A typical mixture of particle sizes and their relative volumes is illustrated in Table VIII.

TABLE VIII

| Particle Size | Percentage By Weight |
|---|---|
| 5 microns | 75.0% |
| 1.25 microns | 19.0% |
| 0.33 microns | 5.5% |

Carbon as an Interface; Using Mesh as at Least One Electrode

CuPC does not develop entirely satisfactory adhesion to metal surfaces. One solution to this problem is the use of a carbon interface that develops better adhesion both to the metal electrode and to the CuPC or ZnPC layers. This approach also has the advantage of providing increased surface area for the electrode, enhancing the capacitance. This raises the possibility of using a metal mesh electrode to allow drying of capacitors after electrodes have been applied, after which a carbon interface is applied over the mesh. The resistance at the interface between CuPC or ZnPC/CuPC layers is also improved by the addition of a carbon layer between the pthalocyanine containing layers. The decay time due to internal resistance is lengthened. In fact, the films on which we obtained a 35,000,000 dielectric constant all used carbon electrodes as an interface between Kovar electrodes and the CuPC/ZnPC films.

Curing Films Under Electrical and Magnetic Fields

Electric and magnetic fields have a major effect on the electrical properties of CuPC and ZnPC and mixtures in capacitors. We have found that an electric field significantly increases both capacitance and internal resistance of the capacitor, whereas the magnetic field causes an apparent increase in capacitance but a decrease in resistance. This invites speculation as to whether joining two films, one electrically biased and the other cured under a magnetic field. There is significant literature about the effect of electrical fields on electrical properties of CuPC, but less literature treating the effect of a magnetic field on these properties.

A strong (3000V) AC electrical field was applied to capacitors, with strong but varying results on capacitance and resistance. A 23.4 volt DC field was used with more predictable effect, yielding both improved internal resistance and capacitance. Biasing at 60 degrees C. temperature improved the half life of the capacitor markedly. Biasing at −40 degrees C., then warming to room temperature and then measuring the voltage decay when bias was removed gave the most improvement in voltage decay times.

TABLE IX

| Device Built and tested | C (F) | ROHM (24hrs) | 1st Half sec | 2nd half sec |
|---|---|---|---|---|
| B11/B10b + E field | 4.00E−05 | 1.7.E+05 | 30 | 570 |
| B11/B10b (no E Field) | 4.00E−05 | 1.8.E+06 | 2 | 120 |

Magnetic Field Used to Orient Molecules

In one or more experiments, it was demonstrated that exposure of a capacitor using pthalocyanine complexes to a strong magnetic field has a strong effect on the internal resistance of the capacitors. A field perpendicular to the capacitor electrodes dramatically reduces the internal resistance of the capacitor from several hundred thousand ohms to several hundred ohms; conversely, a magnetic field applied parallel to the electrodes dramatically increases the insulation resistance of the same, from the original several hundred thousand to many tens of megohms.

The application of a magnetic field parallel to the electrodes while the capacitor is under strong electrical bias has the potential to dramatically increase the insulation resistance while keeping the high dielectric constant (as high as 30 million and over) of the pthalocyanine containing complex dielectric material. An insulation resistance (IR) value of 100 mega-ohms/$cm^2$ will result in a practical electrical storage device for solar cells, and an IR of 10,000 to 100,000 megohms will result in the widespread replacement of conventional batteries in most applications. Experimental results are illustrated in TABLE X. The B field had an impact on resistance.

TABLE X

| Device Built and tested | C (F) | ROHM (24hrs) |
|---|---|---|
| B11/B10b + B field | 2.50E−06 | 8.0.E+06 |
| B11/B10b | 4.00E−05 | 1.8.E+06 |

In one or more embodiments, a silver containing polymer thick film paste is printed onto a ceramic substrate such as 96% alumina, followed by one or two prints of the dielectric material, and then a top silver electrode. The silver electrode paste comprises 80% silver powder with an average diameter of about 3 microns, 15% polymethylmethacrylate, and 15% Eastman Texanol™. The dielectric paste comprises 33% copper phthalocyanine pigment, 10% polyalphamethylstyrene, and 57% 1-octanol.

In another example, a silver containing polymer thick film paste is printed onto a ceramic substrate such as 96% alumina, followed by one or two prints of the dielectric material, and then a top silver electrode. The silver electrode paste comprises 80% silver powder with an average diameter of about 3 microns, 15% polyethyl methacrylate, and 15% Eastman Texanol™. The dielectric paste is composed of 33% copper phthalocyanine pigment, 5% ethyl cellulose, and 57% Texanol.

In terms of applicable substrates, any material may be used that will not flex to the extent that the dielectric layers will crack or become porous. Stiff circuit board and ceramic substrates such as those used in thin and thick film fabrication are examples of suitable substrates.

Polyimide and Mylar films can be used as well. In these cases the films are fixed to a rigid substrate or fixture during the application of the paste. The Polyimide can be removed from the fixture and rolled with the UHCC-dielectric to form cylindrical shapes or cylindrical capacitors.

In regards to organic Ink Binders, the resins suitable for the printing ink are used at very low levels such as one (1) to two (2) percent of solids volume in one or more embodiments so as not to interfere with the high dielectric constant, which may be referred to herein as a pure film. Typical resins are ethyl cellulose and nitrocellulose. Resins that volatilize at or below 200 degrees C. are particularly advantageous. An especially attractive binder for these compositions is polyalphamethylstyrene, which completely volatilizes at temperatures between about 150 and about 200 degrees, leaving a substantially pure copper phthalocyanine film after sintering, thus maximizing capacitance of resulting capacitors.

In regards to Ink solvents, the ink solvent may be relatively slow drying and suitable for screen printing. Examples of suitable solvents are Dowanol® PPH, alpha-terpineol, octanol, decanol, or Texanol®.

In regards to dielectric materials, the dielectric material for the one or more supercapacitors disclosed herein is chosen from a class of materials that has an extremely high dielectric constant from static (0 Hz) to low and to ultralow frequencies such as 10 Hz to 0.0001 Hz. The material used may be copper phthalocyanine. However, the material can be any material in which there is extensive electron delocalization and an ability to distort the molecular structure under an electrical field. The low dielectric relaxation time enables the use of these materials as super-capacitors.

In regards to paste preparation, the resin and solvent are combined and heated to about 100 degrees C., with stirring, until the resin has been dissolved to form the paste vehicle. Then the pigment (copper phthalocyanine) is added to the vehicle to a level of about 30 to 40 volume percent. The mixture is mixed in a device such as a countertop mixer and dispersed on a device such as a roll mill. Viscosity is adjusted to a suitable range to facilitate screen printing.

For the capacitor fabrication, a bottom electrode is deposited, and in one or more embodiments, may be deposited by a manner such as screen printing a polymer silver thick film paste. The print is then cured in an oven at 150 to 200 degrees C. One or two layers of dielectric paste are then printed over the bottom electrode, after which the dielectric prints are cured at between about 125 degrees C. and about 175 degrees C. A top electrode is applied in the same manner as the bottom electrode and finally cured, resulting in a finished capacitor.

An illustration of the paste preparation is provided in FIG. 1. Raw ingredients are mechanically mixed under thermal energy to assist in the mixing operation. The resin and solvent are combined and heated to about 100 degrees C., with stirring, until the resin has been dissolved to form the vehicle.

Figure 2:
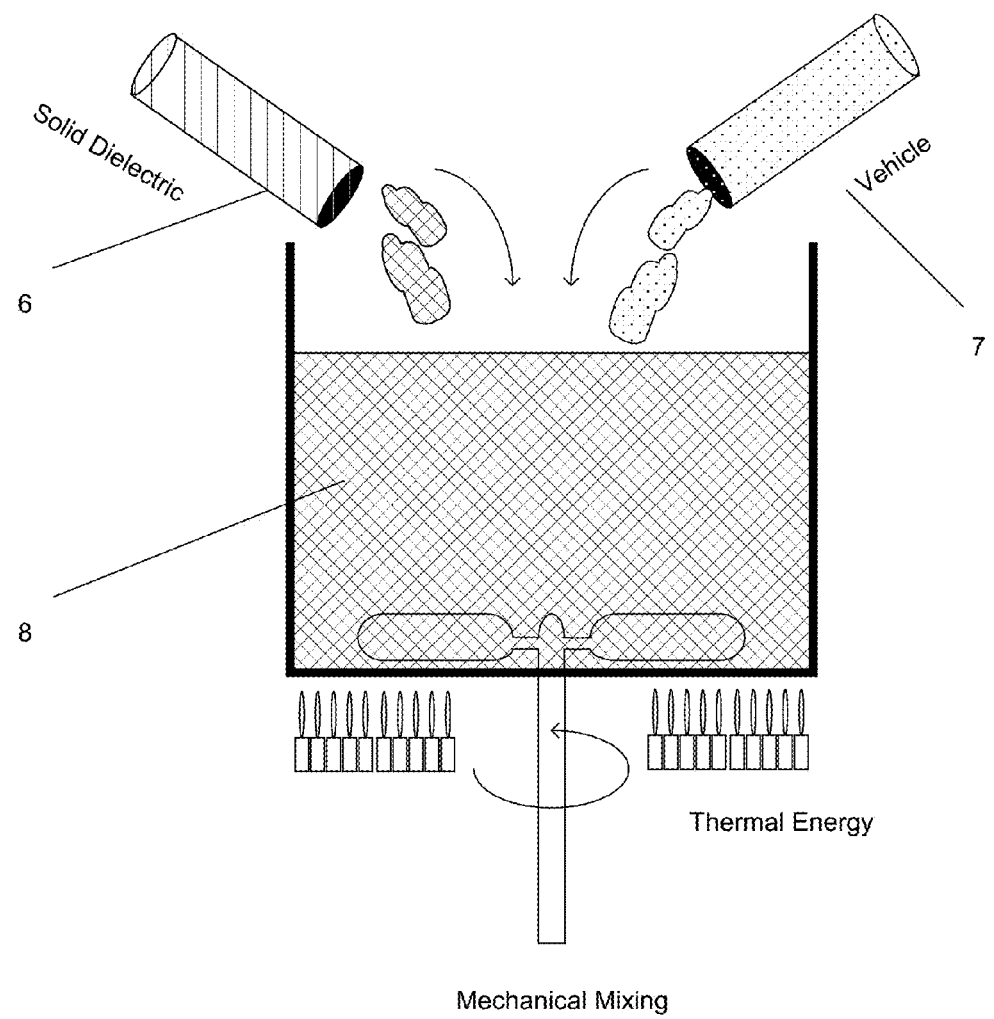
FIG. 2 is an illustration of a manner in which the solid dielectric particulates are mixed with a solvent and the organic vehicle to form a paste of the novel dielectric material according to at least one embodiment of the invention.

An illustration of the manner provided for pigment mixing is illustrated in FIG. 2. The pigment such as copper phthalocyanine or the solid dielectric material, special organic, special organometallic, mixture of organic to organometallic and mixtures or mixtures of dielectric additives with special organic or special organometallic are added to the vehicle to a level of about 30 to 40 volume percent. The mixture is mixed in a device such as a Kitchenaid® countertop mixer and dispersed on a device such as a Ross three roll mill. Viscosity is adjusted to a suitable range to facilitate screen printing.

Figure 3:
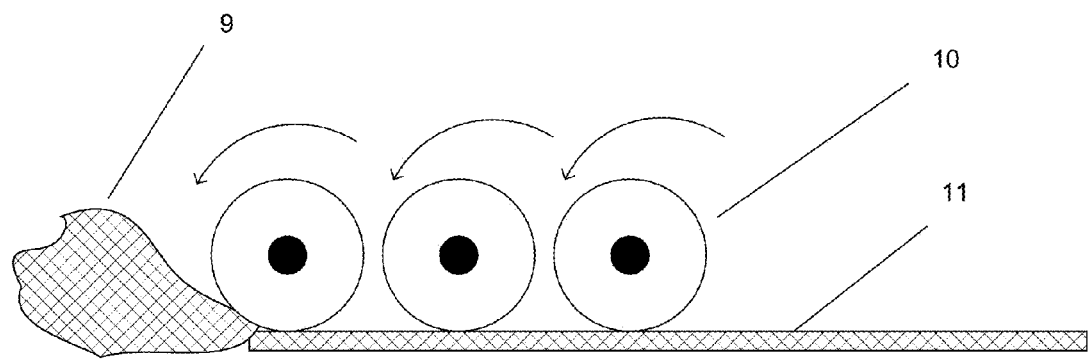
FIG. 3 is an illustration of a paste being roll milled to improve dispersion to form the printable paste of the novel dielectric material, according to at least one embodiment of the invention.

FIG. 3 provides an illustration of a paste being roll milled to form a dielectric material. This step can be followed by die cutting.

Figure 4:
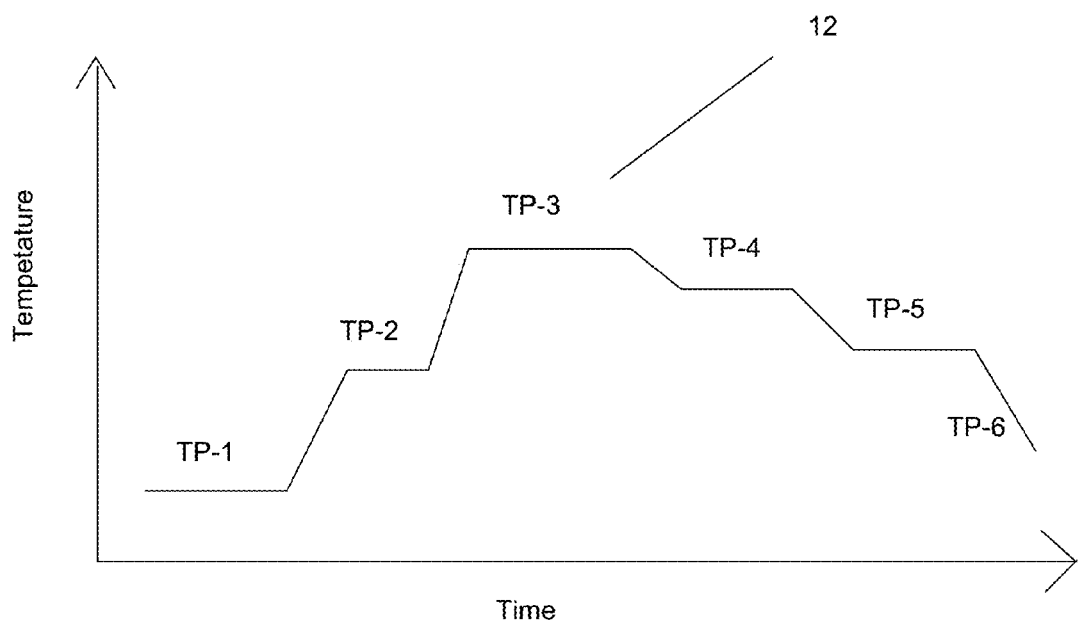
FIG. 4 graphically represents a controlled thermal profile to which the thick film green dielectric paste layer is subjected, according to at least one embodiment of the invention.

The thermal treatment of the mixed layer is subjected to a thermal treatment having heating steps and cooling steps that lead to controlled morphology of the film. As illustrated in FIG. 4, the various thermal plateaus (TPs) are designed to yield a good film given a starting raw material chemistry. Once the film is screen printed or milled on to a rigid substrate or a flexible substrate, a TP-1 of solvent removal is applied typically in the range of 80° C. Vacuum can be used to further assist in the removal of volatiles. This lessens the chance of subsequent pop-corning or cratering in the film during subsequent steps. A TP-2 in the range of 180° C. can be used to allow the organic or organometallic semiconductor to settle in with the dielectric powder and enable the removal of any trapped air pockets. Ultrasonication in the presence or absence of vacuum can be helpful in the removal of voids or pockets. The use of controlled atmospheres can be applicable. Once sufficient time is allowed at this temperature, a subsequent step of TP-3 is applied. The better results are observed when the sintering takes place in the thermal plateau having a temperature about half the melting point of the organic or organometallic material. Sufficient time is allowed to allow material flow and the establishment of a substantially continuous phase. In this thermal plateau an additional heat source can be used such an IR lamp or other lamps such as those used in rapid thermal processing of semiconductors. The continuous phase is driven to a high enough temperature to form a smooth surface with minimal defects trapped in the film. The cooling phases can be designed in TP-4 to promote nucleation and growth of small crystalline phases. The crystalline phases can be seeded by choosing a dielectric additive material having a lattice structure conducive to the formation of small crystals. Furthermore the heating apparatus can be equipped with a nebulized spray of small particles having a lattice structure conducive to crystal formation in the now sintered organic or organometallic semiconductor. The nucleation of small crystals is followed in TP-5 which can be designed to grow crystals at a rate that allow morphological control of the crystalline film. Furthermore, in lieu of, or, in addition to the techniques described supplementing the thermal treatment, all of TP-2, TP-3, TP-4 and TP-5 can be conducted under the influence of a strong electric field to promote preferential alignment of the special organic, organometallics, or mixtures thereof. The electric field magnitude can be in the range of 1 Killo-Volt per meter and greater. A magnetic field can also be used having a strength of about 0.1 Tesla and greater to promote alignment of a dielectric material having paramagnetic properties that leads to alignment of the dielectric which in turns aligns the special organic or organometallic.

FIGS. 5A, 5B, and 5C illustrate one or more embodiments of a top view of the build-up of a capacitor where two electrodes are of different area of size. The bottom electrode, 13, the film made of an ultra-high charge capacity dielectric material according to one or more embodiments disclosed herein after sintering, 14, and the bottom electrode, 15 are shown.

Figure 6:
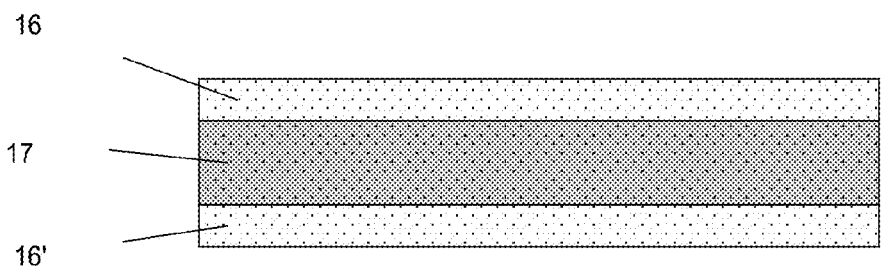
FIG. 6 represents a cross-sectional view of a capacitor having first and second electrodes around a dried thick film having a substantially continuous phase material there between, according to at least one embodiment of the invention.

FIG. 6 provides a cross-section of one or more embodiments of a capacitor showing a thin electrode, 16, a sintered film of organic, organometallic, or mixture thereof having a continuous phase, 17, and another electrode of the same or of different thickness, 16'.

Figure 7:
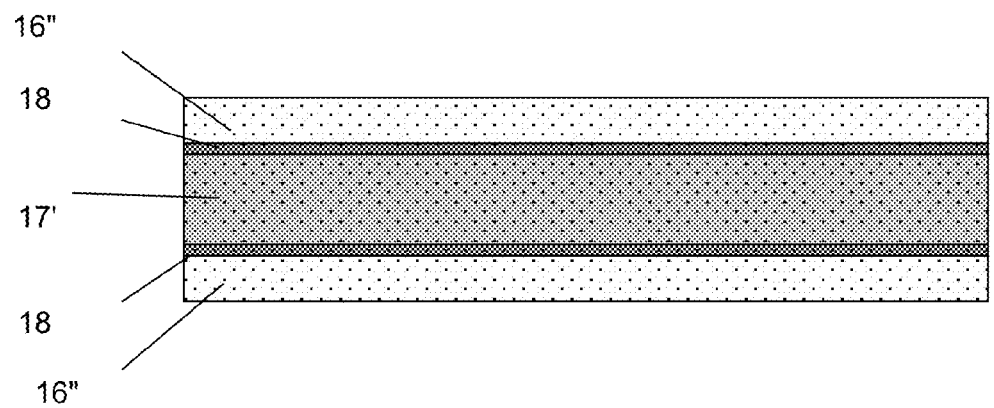
FIG. 7 represents a cross-sectional view of a capacitor having an interface material layered between the dielectric film and the electrode for each of the opposing electrodes, according to at least one embodiment of the invention.

FIG. 7 illustrates one or more embodiments of a capacitor cross-section showing a capacitor with an interface material layer 18, consisting of a silver doped copper phthalocyanine layer. In these one or more embodiments, a thin silver electrodes of 5 micron thickness, 16", are formed around the material dielectric 17' of 10 microns thickness having interfaces build on the surface. A sintered film of copper phthalocyanine having a continuous phase and having a thickness of 10 microns, 17', is first doped with silver to form the interface layer, 18.

Figure 8:
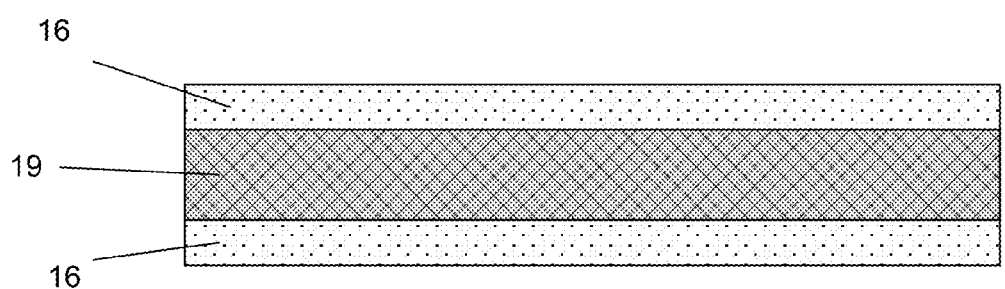
FIG. 8 represents a cross-sectional view of a capacitor having, between opposed electrodes, a substantially crystallized continuous phase of the novel dielectric thick material, according to at least one embodiment of the invention.

FIG. 8 illustrates one or more embodiments of a capacitor material having sintered film of copper phthalocyanine having a continuous phase and crystallized using nucleation and growth after special thermal treatment, 19.

Figure 9:
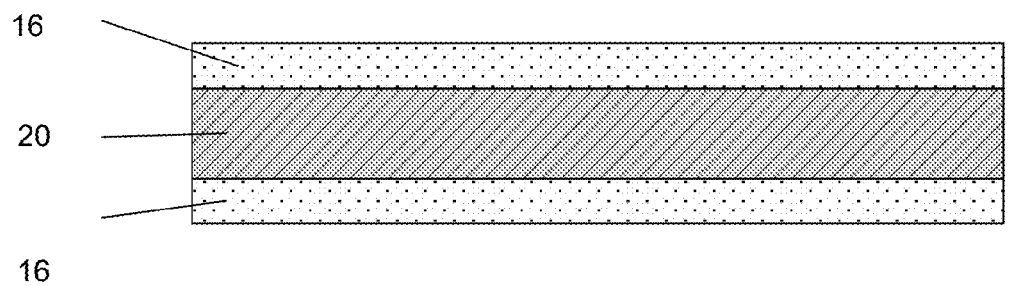
FIG. 9 represents a cross-sectional view of a capacitor having, between opposed electrodes, the novel dielectric material with its dipoles insubstantial alignment, according to at least one embodiment of the invention.

FIG. 9 illustrates one or more embodiments of a capacitor material having sintered film of copper phthalocyanine having a continuous phase and substantial alignment by the application of an electric field during processing, 20

Figure 10:
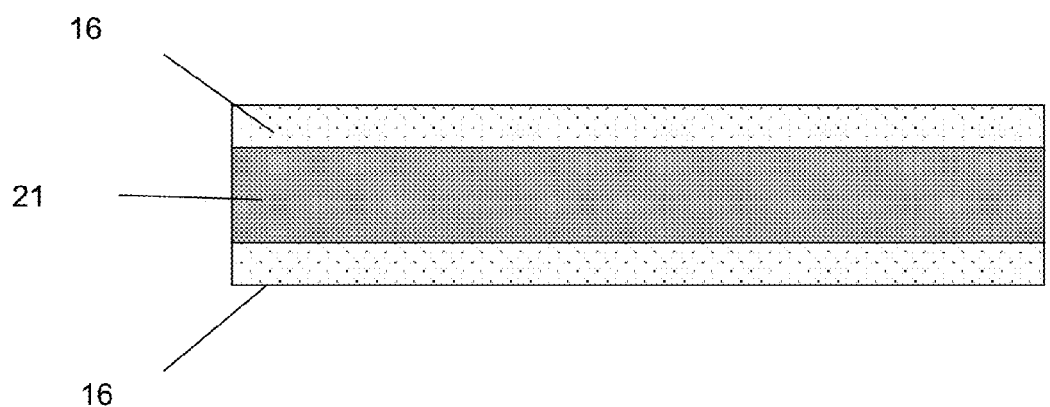
FIG. 10 represents a cross-sectional view of a capacitor having, between opposed electrodes, the novel dielectric material with dielectric fillers, according to at least one embodiment of the invention.

FIG. 10 illustrates one or more embodiments of a capacitor having sintered film of copper phthalocyanine having a continuous phase with nano size (or larger) dielectric fillers, 21.

Figure 11:
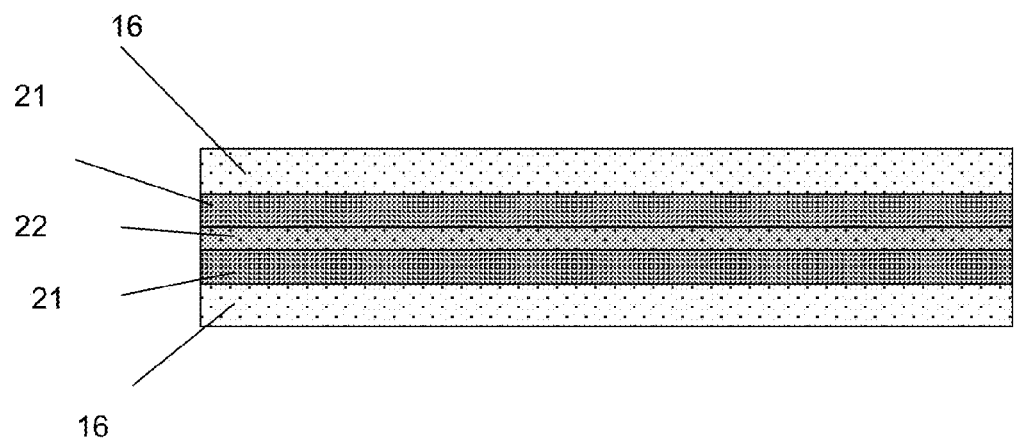
FIG. 11 represents a cross-sectional view of a capacitor having, an inner layer embedded substantially in the center of capacitor and within the novel dielectric between opposed electrodes, a layered structure including a continuous phase material and dielectric fillers, according to at least one embodiment of the invention.

FIG. 11 illustrates one or more embodiments of a capacitor having a sintered film of copper phthalocyanine, 22, sandwiched between two films having a continuous phase with nano-size (or larger) dielectric fillers, 21.

Figure 12:
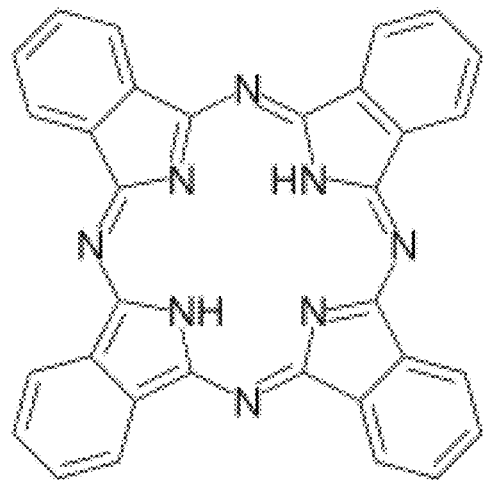
FIG. 12 represents a chemical structure of, phthalocyanine, according to at least one embodiment of the invention.

In FIG. 12, an illustration of one or more embodiments of an angled dielectric that is multilayered using items 21 and 22 is provided.

FIG. 12 provides one or more embodiments of an illustration of a chemical structure of phthalocyanine.

Figure 13:
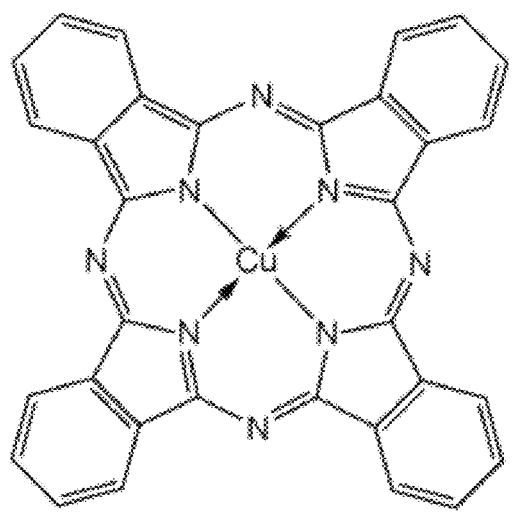
FIG. 13 represents a chemical structure of copper-phthalocyanine used in particulates form to construct the novel dielectric.

FIG. 13 provides one or more embodiments of an illustration of a chemical structure of copper-phthalocyanine.

Figure 14:
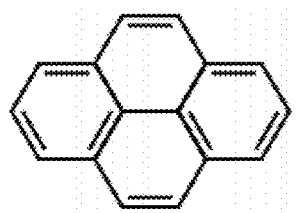
FIG. 14 represents a chemical structure of Pyrene.

FIG. 14 provides one or more embodiments of an illustration of a chemical structure of Pyrene.

Figure 15:
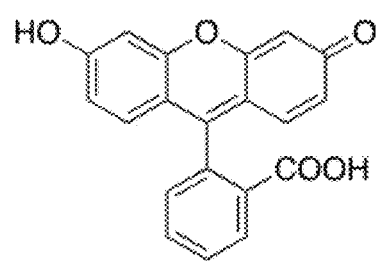
FIG. 15 represents a chemical structure of Fluorescein.

FIG. 15 provides one or more embodiments of an illustration of Fluorescein.

Figure 16:
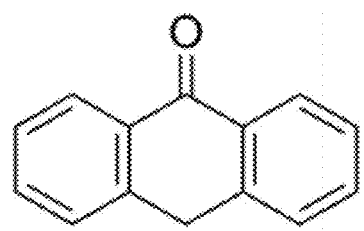
FIG. 16 represents a chemical structure of Anthrone.

FIG. 16 provides one or more embodiments of an illustration of Anthrone.

Figure 17:
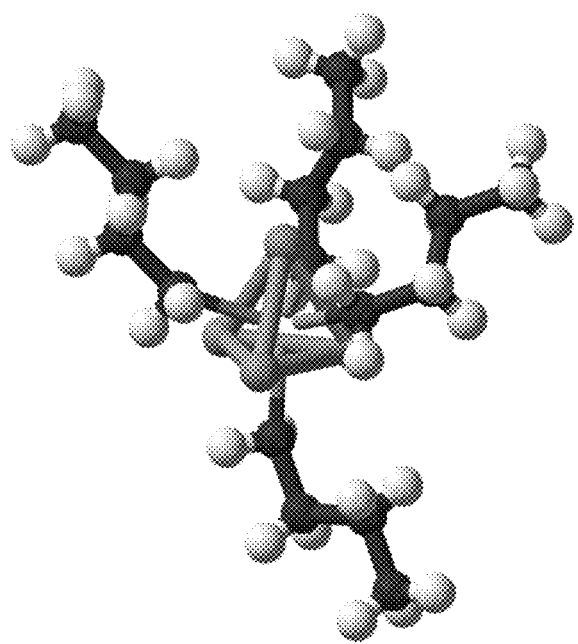
FIG. 17 represents a chemical structure of an organometallic compound, according to at least one embodiment of the invention.

FIG. 17 provides one or more embodiments of an illustration of an Organometallic compound.

Figure 18:
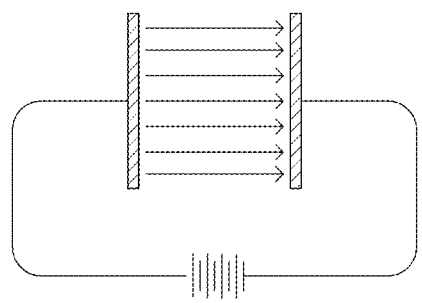
FIG. 18 is a diagrammatic representation of a parallel plate capacitor charged under DC conditions.

FIG. 18 provides one or more embodiments of a parallel plate capacitor charged under DC conditions.

Figure 19A:
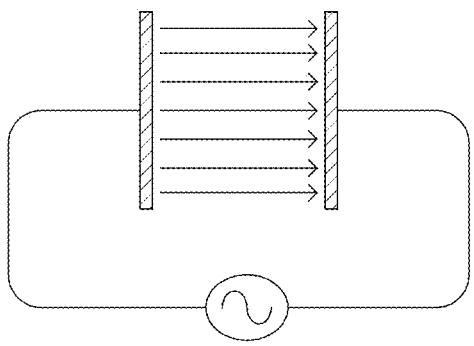
FIG. 19A is a diagrammatic representation of a parallel plate capacitor charged under AC conditions.
Figure 19B:
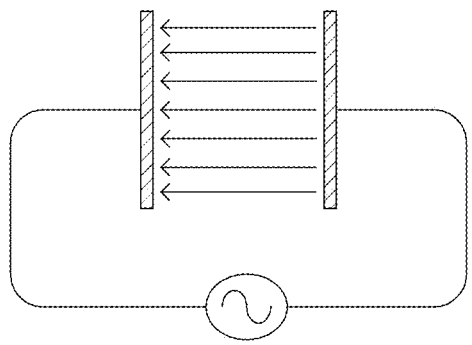
FIG. 19B is a diagrammatic representation of the parallel plate capacitor of FIG. 19a, with reversed field orientations.

FIG. 19 provides one or more embodiments of a parallel plate capacitor charged under AC conditions. Two opposite field orientations are shown.

Figure 20:
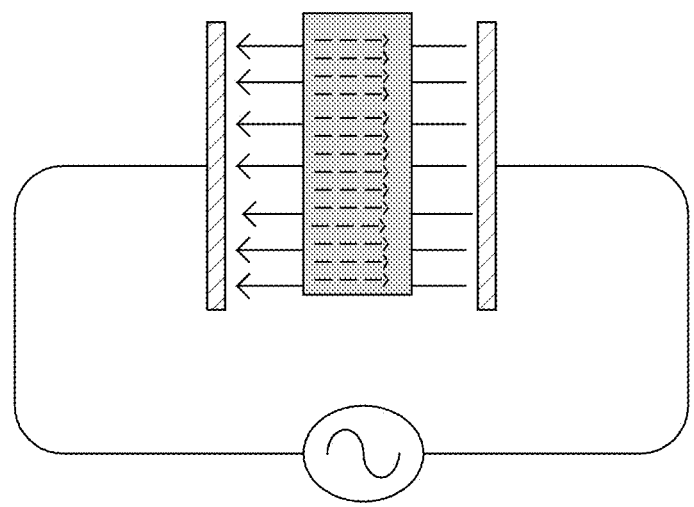
FIG. 20 is a diagrammatic representation of a dielectric material occupying a volume between opposed electrodes and the formation of dipoles within the material, according to at least one embodiment of the invention.

FIG. 20 illustrates one or more embodiments of a dielectric material occupying a volume and surface area between the electrodes. The introduction of a dielectric material between the electrode leads to the formation of dipoles opposing the electric field in the capacitor. This leads to the ability to store more charges in the capacitor.

Figure 21:
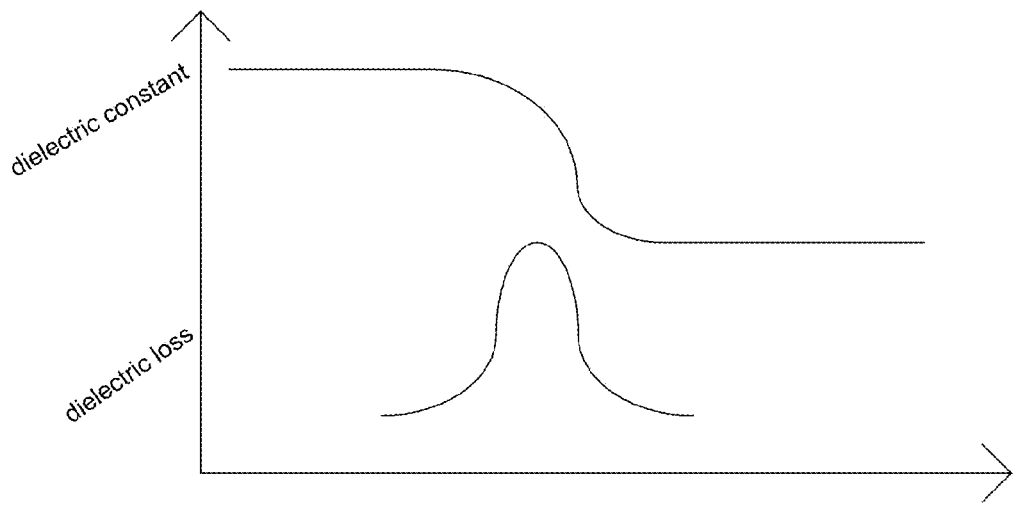
FIG. 21 graphically represents a dielectric constant and a loss factor as dependent on frequency, according to at least one embodiment of the invention.

FIG. 21 provides a chart depicting that the dielectric constant (or charge storage capability) as well as the loss factor are both dependent of frequency. As frequency is increased the loss increases and passes a peak value. The dielectric constant has two different values before and after the peak of the loss factor. The dielectric constant enters a plateau regime of lower values than before the peak in the loss factor. The low frequency regime prior to reaching a frequency that renders the copper Phthalocyanine static in oscillating electric field is the preferred regime of operation.

The remaining figures are directed towards experimental data and one or more devices and structures disclosed herein.

Examples of High K Dielectric Materials

High K dielectric materials used in electronic applications are commonly ceramic materials such as ferroelectric Barium Titanate, which has a K of a little over 3000, or a relaxor material such as lead Titanate, which has a dielectric constant of over 10,000, but has a poorer high frequency performance in the gigahertz frequency range than ferroelectrics. Thus, for high frequency applications, barium titanate BaTiO3 is much more commonly used than lead titanate.

Organic materials with high K are resins such as cyanoacrylates. These are commercially available with K of about 10 to as high as 50, and could be developed to produce filled barium titanate composites with dielectric constant of 100 to 500. Copper phthalocyanine pigments have extremely high dielectric constants up into the million range, but very poor usable frequency range at high K. This disclosure concerns principally copper phthalocyanine based devices for battery replacement applications but in principle is not limited to these materials. Since the frequency of charge and discharge of a supercapacitor used for power storage is on the order of tens to many thousands of seconds, frequency response is not an issue in power storage applications.

Materials for Filled Capacitors

A number of materials for fabricating filled capacitors are commercially available. These materials are in the form of finely ground (usually) ferroelectric powders commonly ranging from about 0.3 micron to about 3 to 5 microns average particle size. These materials place a high K dielectric material finely divided into an organic matrix, which usually is coated as a ceramic slip and dried to make a "tape" which is combined with electrode layers and fired usually above 1100 degrees C. The organic fraction of the composite is burned out, and the ceramic powders are sintered to form a ceramic grain structure with close to 100 percent high K dielectric material. The typical MLC capacitor consists of many layers of these dielectric/electrode materials, up to about 500 layers. These materials have a K of about 3000. Filled non-fired systems contain high K dielectric powder dispersed in an organic matrix and are screen printed or stenciled onto a substrate without the need for high temperature firing, as is necessary with dielectrics made of 100 percent ferroelectric or relaxor materials. These ceramic/organic non-fired composites commonly have a K of 30 to 60.

Multiple particle size mixtures can be used to fill void spaces between particles more completely than by using a single average particle size filler. Empirically determined size ratios and volume fraction ratios are 3 to 4 to 1 size ratio and about a 5 to 1 size ratio. Three discrete particle size fractions are even more effective than a bimodal mixture.

Ferroelectric Vs. Relaxor Ceramic Dielectrics

Ferroelectrics and relaxors are two types of ceramic dielectric. Ferroelectric dielectric materials, for example, barium titanate, have a high dielectric constant of 3000 to 3300, a very fast response time, and tan delta and K are relatively constant with increasing frequency. Relaxors, for example, niobium lead titanate, typically have a higher dielectric constant, which may be as high as 18,000, but dielectric falls off more rapidly with frequency, and tan delta increases with increasing frequency. Thus, for multi-gigahertz electronic applications, ferroelectrics are more useful.

Building a Filled Dielectric Device

To build a filled system, one would, for example, use barium titanate or niobium lead titanate powder in a mixture with copper phthalocyanine. Since the copper phthalocyanine melts at about 240 degrees C., it can be sintered in an oven to form a matrix around the filler material. The dielectric constant of the filled system can be approximated using the equation:

$$\log K(\text{comp}) = \log K(\text{matrix}) \cdot \text{vol.fr.}(\text{matrix}) + \log K(\text{filler}) \cdot \text{vol.fr}(\text{filler})$$

where K=dielectric constant and vol.fr. is the volume fraction of the respective component. To start, a bottom electrode is screen printed onto a substrate. The dielectric components are dispersed into an organic vehicle that burns out relatively easily below 200 degrees C., leaving very low residue. The mixture is then stenciled or screen printed onto the substrate over the electrode, dried, and then the copper phthalocyanine powder is sintered to form a continuous matrix surrounding the ceramic dielectric powder. A top electrode is then printed over the dielectric composite forming a capacitor, which can then be electrically tested.

Thick Films

Thick film materials are commonly prepared from powders in the range of 0.3 to 5.0 micron average particle size, depending on the application. These powders are dispersed into an organic vehicle to form a printing ink, are printed onto a suitable substrate, and can then be sintered to form a continuous film at temperatures well below the melting point of the powders. Thus they are more easily processed at lower temperatures than larger particles or discrete structures.

Sintered thick film materials such as dielectrics do not usually form a continuous film; rather, they sinter into a structure with grain boundaries, and usually there is residual porosity due to the presence of printing defects and large particles in the powders used, that cause voids in the film. To counter this phenomenon, multiple prints of dielectric are used. Since the probability of two tiny defects occurring in exactly the same position in two successive layers is vanishingly small, the problem is essentially solved. A very small amount of porosity is often tolerable, the resulting electrical degradation being referred to as leakage current, and the lower it is, the better the dielectric. Other performance parameters measured on thick film dielectrics are K, tan delta (<0.003 is acceptable), and breakdown voltage (typically 1000 to 4000 volts). The K of fired dielectrics is typically 1,000 to 3,000 for barium titanate based dielectrics.

Cylindrical Form Factor

To produce a cylindrical form factor, the dielectric can be printed on a thin polymeric film such as polyimide that will tolerate high curing temperatures easily, as a sort of scroll. The dielectric can be printed on both sides of the polymeric substrate, then rolled up to produce a cylindrical form factor compatible with electrolytic capacitors.

Applications:

The following applications are non-limiting and a non-exhaustive list of manners and products in which the one or more capacitors and dielectric materials disclosed herein may be employed:

Electric Car

A vehicle having a motor for propulsion powered by electrical energy that is used as the primary or exclusive mean of moving the vehicle or that is used in conjunction with a motor powered by a combustible fuel.

The battery electric vehicle has many advantages including reduced pollution and green house gases by departing from a fossil fuel and possibly leading to a 30% reduction in carbon dioxide emissions.

An on board battery pack can be replaced with one or more capacitors disclosed herein. The battery pack may include a series of tiles like super-capacitors connected together to provide sufficient energy for the vehicle and small enough that no one tiled super-capacitor having excessive energy.

Furthermore, the one or more capacitors disclosed herein enables a rapid charging of the tiled super-capacitors when compared to standard batteries used in battery electric vehicles.

Solar Panel

A photovoltaic based solar panel can convert the photonic energy from the radiation of the sun into electric energy. These solar panels can be used in solar plants and in residential buildings. The PV cells are arrayed in various configurations and linked together to form a panel. In turn panels can be arrayed and electrically connected together to yield more electrical energy. The photovoltaic installations include inverters and batteries. These photovoltaic systems can be used for off grid applications or in solar panels in vehicles and spacecrafts.

The one or more devices disclosed herein lead to efficient energy storage and enables one or more effective methods for transporting such energy from one geographical location to another. The one or more methods are more effective and efficient compared to transmitting the energy through copper wires and the like.

Appliances

Small appliances that are portable and semi portable that are powered using electrical energy can be powered using electrical energy stored by a capacitor according to one or more embodiments disclosed herein. The electrical appliance powered by the capacitors according to one or more embodiments disclosed herein may enable full portability of these appliances without being plugged into a residential electrical plug.

Personal Digital Assistant and Portable Computers

Most batteries used in computers and PDA are based on lithium-ion batteries in which an ion moves across two oppositely charged electrodes. The present invention leads to small tiled super-capacitors capable of storing energy and powering consumer electronics, PDAs, and portable computers.

Transportation

In applications related to energy storage for providing electricity to utilities, businesses and private customers, storage systems are needed for covering peak demand, for balancing the grid, and for handling intermittencies.

Supercapacitors have the potential to support the stated needs for a conventional grid, and can also be used to support solar and wind energy sources which suffer from weather-related intermittencies. Clearly the role of supercapacitors in handling weather-related intermittencies in wind and solar energy generation will depend on the energy storage capacity. For the latter, the utilities use natural gas turbines to overcome the drop in power from weather-related intermittencies. However, gas turbines have a spin-on time of 10 minutes before producing a steady supply of electricity. Consequently a critical application of supercapacitors would be to provide electricity to cover that 10-minute ramp-up time.

PV generation of electricity is highly weather dependent and unpredictably intermittent on very fast scales (sub-seconds) and over short (minutes) or long (hours) time periods.

One or more capacitors described herein could be stacked on the backs of each solar module to provide electricity for a 10 minute dead-time, or any other desired time period. Typical solar modules produce between 100 and 300 watts of power. A 10 minute full power interval would require 20-50 Watt-hours of delivered energy. For one or more capacitors whose voltage decreases with charge, the required range of energy capacity would be 40-100 Watt-hours. Another application would be to design separate banks of supercapacitors to provide the power smoothing required for the turbine spin-on periods to cover the weather-related intermittencies.

Due to the ease of fabrication of the solid electrolyte materials disclosed herein, it is also possible to integrate the supercapacitor into the cell fabrication at little added cost and build PV modules that provide the 10 minute energy back-up function in the same package.

For an integrated PV-supercapacitor device, a typical design would require the PV solar cell to be in parallel with the supercapacitor with a safety diode placed to prevent back current through the solar cell. The supercapacitor can be mounted or built on the backside electrode.

The diagram shows the backside electrode serving as one of the direct supports for one of the supercapacitor electrodes. The other is mounted on the other side of a perimeter spacer that permits addition of the electrolyte. Low cost requires that the supercapacitor electrodes be fabricated by a process that is fully compatible with the manufacturing process for the PV film stack. Metal contacts and electrodes can be deposited using the same processes as in PV manufacturing.

Elements

The following elements are represented by corresponding element numbers throughout this disclosure: Solvent, 1; Solid resin, 2; Vehicle during mixing, 3; Thermal Energy, 4; Mixer, 5; Pigment, special organic, special organometallic, mixture of organic organometallic, 6; Vehicle after mixing, 7; Paste during mixing, 8; Paste after screen printing or roller milling, 9; Roller milling, 10; Green film (film before sintering), 11; Thermal Profile, 12; Bottom Electrode, 13; Film after sintering, 14; Bottom Electrode, 15; Thin Electrode, 16; Sintered Film Of organic or organometallic or mixture thereof Having a Continuous Phase, 17; an electrode of the same or of different thickness, 16'; Silver Electrode with 5 micron thickness, 16"; Sintered Film Of Copper Phthalocyanine Having a Continuous Phase (10 microns), 17'; Interface Layer Having Doped Silver Layer interface, 18; Sintered Film Of Copper Phthalocyanine Having a Continuous Phase and crystallized using nucleation and growth after special thermal treatment, 19; Sintered Film Of Copper Phthalocyanine Having a Continuous Phase and substantial alignment by the application of an electric field during processing, 20; Sintered Film Of Copper Phthalocyanine Having a Continuous Phase with nano size dielectric fillers, 21; Sintered Film Of Copper Phthalocyanine, 22; Layered dielectric at an angle, 23; an electrode having a recess around its perimeter, 16-1; Large bottom electrode, 16-2; Perforated electrode, 16-3; Aluminum electrode, 16-4; Novel dielectric, 21; Copper Phthalocyanine, 21-1; Zinc Phthalocyanine, 21-2; Copper Phthalocyanine with added BaTiO3, 21-5; Inner Layer, 22; resin with high polarity, 22-1; resin with high polarity doped with carbon, 22-2; Passive metal inner layer (with no bias applied), 22-3; Active metal inner layer (with bias applied), 22-4; Rubber Gasket, 23; conductive Ink containing carbon black pigments, grahene, or activated carbon, 24-1; thin film of copper phthalocyanine deposited on the electrode using sputtering or evaporation techniques, 24-2; C-Clamp, 25; Electrical probes, 26; Perimeter spacer that permits addition of the electrolyte, 27; backside electrode of PV panel, 28; p-type or n-type semiconductor substrate, 29; and semiconductor junction material, 30.

Material Preparation:

In order to prepare a dielectric material according to the one or more embodiments disclosed herein, several methods for material preparation can be employed and are described herein.

In a method according to one or more embodiments disclosed herein, two grams of Copper Phthalocyanine dielectric powder were weighed in a mixing cup using a five (5) digit balance. A solvent, such as Texanol, was added to the organometallic powder using about a 3:1 ratio and thoroughly mixed by hand. As used herein, organo-metallic may refer to a complex of a phthalocyanine and a metal. The mixture was then transferred to between glass plates for shearing dispersion. The gap between the glass plates was about two (2) mills thickness. High shear was successful using two (2) glass plates. A roller mill may also be employed for imparting shearing forces.

An organic vehicle, such as a mixture of Ethyl Cellulose and Texanol, was added to the mixture of Texanol and Copper Phthalocyanine. The weight ratio of the Ethyl Cellulose to copper Phthalocyanine was varied from 0% (no organic vehicle) to about 12%. Additionally, a silver paste made from silver powder and Texanol was prepared.

Methods for Applying the Dielectric Material

In order to apply the dielectric material according to the one or more embodiments disclosed herein, several methods for material application can be employed and are described herein.

In a method according to one or more embodiments disclosed herein, an MPM screen printer may be used to apply the silver paste into a pattern to a substrate, such as one commercially available from CoorsTek® of Golden Colo., to form electrode patterns. After the conductive paste is applied to the substrates, a thermal treatment may be carried out in order to drive solvent removal, drying, and curing of the substrate. This process may be utilized to form both the top and bottom electrodes. In a method according to one or more embodiments disclosed herein, the dielectric mixture may be printed on top of the bottom electrode followed by drying and curing. Then the bottom electrode having the dielectric on one of its surfaces may be mated with the top electrode. The capacitor hence formed was tested for electrical properties in terms of resistance, capacitance, and its ability to hold charge.

Screen Printing

One or more methods of applying the dielectric material may include screen printing as disclosed herein. In one or more embodiments, the bottom electrode is formed by screen printing a conductive epoxy on a ceramic substrate. The substrate and the bottom electrode may then be heated to cure the conductive epoxy, which in one or more embodiments may be heated at or below 80° C. The dielectric may then be printed using a stencil of appropriately configured dimensions. In one or more embodiments, the Copper Phthalocyanince mixed with a Texanol solvent and ethyl cellulose as the organic vehicle may be printed in consecutive layers. More than one layer may be printed. For example, in one or more experiments, one, two, and three layers of dielectric were printed and the capacitance and other desired parameters were then tested. The quality of the film may be inspected using an optical inspection capability. Following every print, a partial solvent removal may be used. The removal of solvent(s) may be performed under heat below 80° C. and inert atmosphere. In one or more embodiments, the substrates with the dielectric were heated to above about 150° C. and below about 310° C. in order to sinter the particles in the material, though in one or more embodiments, sintering may not be required. In one or more embodiments, the bottom electrode may be formed by screen printing conductive epoxy on a ceramic substrate. The substrate and the bottom electrode may then be heated to cure the conductive epoxy. The capacitor may then be formed by assembling the top and bottom electrode with one or more dielectric layers in between. In one or more embodiments, after assembly, pressure may be applied to the capacitor in combination with heat and further testing may be carried out to determine desired electrical properties. The heat may be applied using a thermode embedded in a press such is commonly used in thermal compression bonding.

Draw Down the Material

In a method according to one or more embodiments, a Kovar electrode, such as that which is available from the Carpenter Technology Corporation of Reading, Pa., may be placed on a glass substrate and a spacer tape having a thickness of about 60 microns may be applied to two (2) out of four (4) sides of the glass substrate. A portion of the dielectric may be deposited on one end of the metal electrode. The dielectric material may be applied by drawing down the material using a knife, a razor blade, or glass from one side of the electrode to the opposite side of the electrode. The travel direction of the knife or blade may be parallel to the direction of the spacer tape. The materials may then be dried and the tape may then be removed to form a straight edge on the electrodes.

Figure 22A:
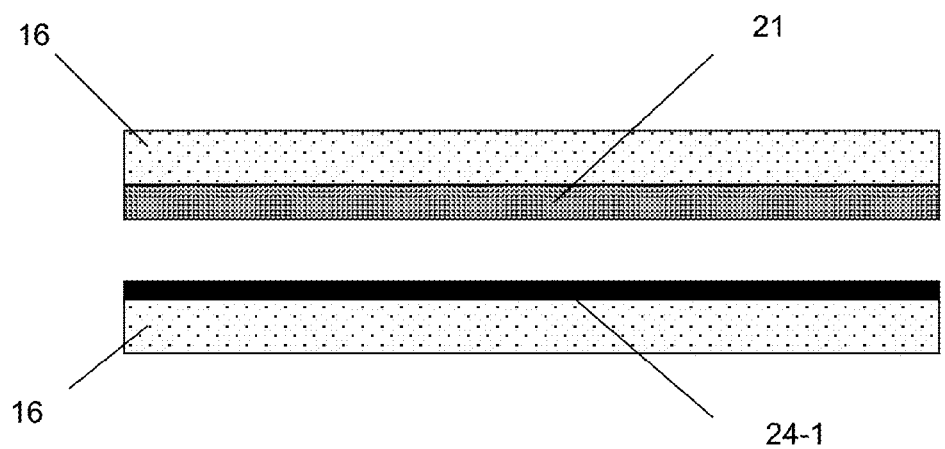
FIG. 22A illustrates a capacitor having first electrode coated with an interface layer made of a conductive Ink containing carbon, and a second electrode having a dielectric deposited thereon, according to at least one embodiment of the invention.
Figure 22B:
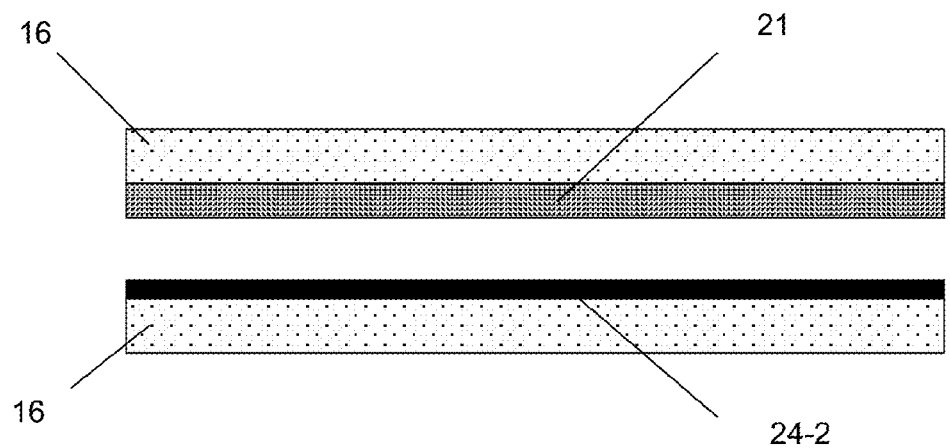
FIG. 22B illustrates a capacitor having first electrode coated with an interface layer made of a conductive Ink containing carbon, and a second electrode having a dielectric deposited thereon, according to at least one embodiment of the invention.

In one or more embodiments, the top electrode may be coated with an interface layer and then mated with the bottom electrode having a dielectric deposited thereon to form a capacitor. The two electrodes may be held together using a clamping device, such as a C-Clamp. The amount of pressure from a clamp may be varied. A representative illustration of a capacitor formed by one or more embodiments described herein is illustrated in FIG. 22.

In one or more embodiments, two (2) electrodes each of which may have a dielectric coating may be dried partially or fully. The two (2) electrodes having a dielectric may be mated together to form a capacitor. The two (2) electrodes may be clamped together using a clamp such as a C-clamp. In one or more embodiments, an inner layer or a bridging layer may be used to matingly engage the two (2) electrodes having dielectric coatings applied to them. The inner layer preparation and chemistry were found to be important to the overall operation of the capacitor and many chemistries were attempted in one or more experiments described herein.

Metal Foil/Flexible Electrode

According to one or more embodiments, the dielectric material may be drawn down onto a metallic foil, or metallic sheet. A spacer tape having a thickness of 60 microns may be used to draw a portion of dielectric and to form a uniform thickness film disposed on the surface of the metallic foil or the metallic sheet. A thermal treatment may then be applied to controllably heat and controllably cool the dielectric film formed thereby.

Dispensing

According to one or more embodiments, a dielectric may be applied using an automated dispenser to one of the electrodes using a controlled weight in a controlled pattern. The electrodes may then be collapsed on top of one another using a pick and place to obtain a uniform thickness. A spacer material may be placed to prevent shorting of the electrode and to promote the formation of a uniform film thickness. The assembly hence formed may be dried inside the oven.

Organic Vehicle

In one or more embodiments, the amount of organic vehicle used may increase the green strength of the dielectric. The higher the content of the organic vehicle results in more green strength of the dielectric, whereas the presence of increased organic vehicle results in less measured capacitance. An optimal range of organic vehicle that balances cracks after drying and capacitance build up may depend on the dielectric powder size and powder size distribution, the solvent system or combination of solvent systems used, and the difference of the coefficient of thermal expansion between the electrode and the dielectric film.

Thermal Treatment

According to one or more embodiments, thermal treatment may be conducted on the dielectric material using a heated chuck. In one or more embodiments, the heated chuck may be used with or without vacuum. Argon or Nitrogen may be used to apply a low pressure flow of inert gas towards the dielectric while inside the heated chuck. This method of directed gas flow in combination with vacuum may be used to control the environment around the dielectric during drying. The heat from the chuck may be provided to enable ramping up and cooling down the samples in a controlled fashion. In one or more embodiments, a vacuum oven may not be used. The addition of vacuum to the thermal treatment may be provided for removing solvents from the dielectric. The drying temperature may range from about 40° C. to about 175° C. Depending on the solvent system used or the combination of solvent(s) used, the drying temperature that led to the best results varied in one or more experiments disclosed herein. Drying at about 80° C. may be employed in order to avoid creating cracks in the film. In one or more embodiments, drying temperatures as low as about 40° C. may be employed while vacuum is being applied and as high as about 100° C. when an inert gas flow is being applied. Higher drying temperatures may higher temperatures may result in cracks in the dielectric.

Partial Vs. Full Drying

In most cases where the dielectric material was applied to one or both electrodes, a full drying, a partial drying or no drying at all were investigated in one or more experiments in terms of impact of the capacitance build up.

The surface roughness of the dielectric may have an impact on the capacitance values of a capacitor. For example, when two (2) electrodes have been coated with the dielectric material and then dried fully under heat and vacuum, an air pocket may be formed at the interface when the two (2) electrodes are engaged together. This air pocket may have negative effects on the capacitance values of the capacitor. Accordingly, various methods and steps may be taken in order to minimize the air pocket. For example, in one or more embodiments, the top and bottom electrodes may be mated and held together using a clamp such as a C-clamp. In one or more experiments, the air gap may be minimized by having the materials partially dried rather than fully or not dried at all before clamping. A small amount of residual solvents may be used to help bridge the dielectric materials when they are mated and held together.

Applying Compression C-Clamp

In one or more experiments, it was determined that applying compressive forces to the electrodes may help during the drying process. The compressive forces may be derived using weights on top of the capacitors or by using a clamp such as C-clamp to maintain compression. The amount of pressure from the C-Clamp may be varied and in some experiments may make a difference and in other experiments it may not make a difference.

In one or more experiments, a combination of solvents that lead to the formation of a good film having a good packing factor between the organic and organo-metallic particulates may be employed. It was determined that the compression induced by the sequential removal of multiple solvents exceeded the compression achieved by pressure from a C-clamp.

Particle Size:

The bi-model or a tri-model distribution of particle sizes may lead to an increase in density or the packing factor. According to one or more embodiments disclosed herein, a mixed particle size system suitable to maximize the packing factor that may facilitate particle to particle contact may be employed. The dispersion and shearing may also be important in the final properties.

An example is cited that contrasts two (2) copper phthalocyanines with different particle size distributions that were obtained from two (2) different vendors. The results from the copper phthalocyanine obtained from AESARs was in the range of 200 nm while the copper phthalocyanine was in the range of 500 nm and yielded a better film. The compaction of a powder depends on the particle size distribution. The current dielectric paste preparation includes a mixture of inorganic dielectric, organic polymers, and organometallic particulates. The packing factor is no different than mixed particle systems in that higher densification may be obtained using a suitable tri-modal distribution.

Thermal Treatment

In one or more experiments, it was discovered that upon heating the material, the particles forming the dielectric material start sintering, meaning that the materials begin "necking" which may be the first step of densification. This densification was observed at about 150° C. and above. It was also determined that in one or more experiments, the percentage of vehicle contained in the mix may have an effect on capacitance. In one or more experiments, it was determined that the higher the temperature and the faster the heat rate, the more cracks will be observed after drying. The particles are prone to oxidation which leads to an increase in resistance and a reduction of capacitance. Therefore, an oxygen free atmosphere is most desirable because even a small amount of oxygen may lead to oxidation. However, in one or more experiments, good results were obtained even when the materials were processed in air.

Film Crack Healing

A mix of copper phthalocyanine or other organometallic particles with a high solvent content may be used to fill and heal cracks since the low viscosity mixture may carry particles inside to impregnate the pores and lead to higher densification. Multiple impregnation steps may be performed on the dielectric material to reduce porosity and increase density. Each of the multiple impregnation steps may be followed by a solvent removal step. These one or more steps may be provided to densify the porous material and increase the dielectric particulates content to reach a final form, with the desired results being a defect free dielectric film deposited on an electrode.

Figure 23:
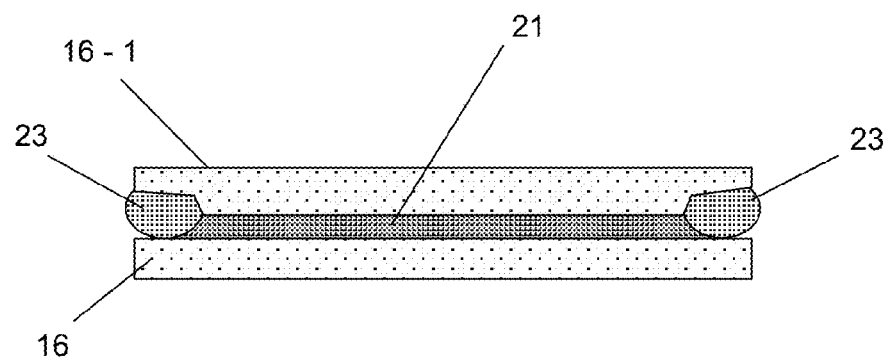
FIG. 23 illustrates the novel dielectric material with a solvent is encapsulated between two opposed electrodes by a gasket, according to at least one embodiment of the invention.

According to one or more embodiments, a low viscosity solvent such as Texanol, Ethanol, or Acetone may be used and encapsulated using a rubber gasket such as that which is illustrated in FIG. 23. This may lead to an increase in capacitance without a decrease in resistance. A pure solvent may increase the potential of being flammable and may have other drawbacks. According to one or more embodiments, porous electrodes may be employed to allow for a volatile removal path for the various solvents.

Electrical Measurements

In one or more experiments, an HP meter 34401A available from Hewlett Packard, a DC power supply HP6634B (0-100V & 0-IA), a triple output DC power supply HP E3630A 0-6V, 2.5 A/0-+/-2.0V, 0.5 A, and a Radio Shack (catalogue #22-811) digital multimeter for capacitance measurements having a maximum capacitance measurement of this instrument was 40 micro-Farads were used. Any values greater than 40 micro-Farads resulted in an Over Flow signal in the meter. The capacitors built using 12 mm×12 mm kovar electrodes in the one or more embodiments disclosed herein showed an over flow response.

Figure 24:
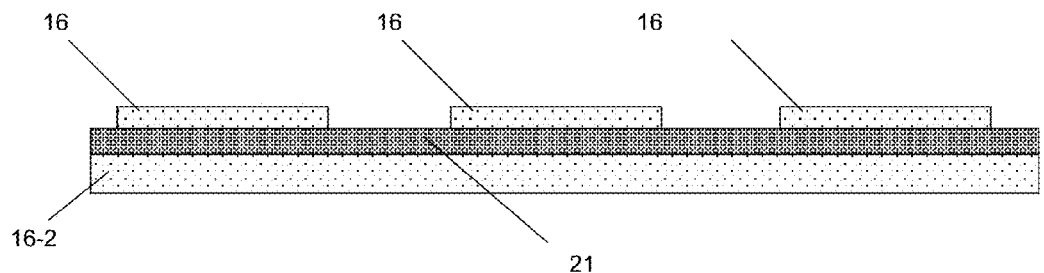
FIG. 24 illustrates a capacitor in which multiple first electrodes are coupled to a larger single second electrode, according to at least one embodiment of the invention.

In one example, on an electrode measuring 8.0 cm by 2.0 cm, the dielectric material was drawn down and dried. The top electrode was 1.2 cm by 1.2 cm. The measured resistance was 158.2 kilo-ohms and the capacitance was over 40 micro-farads. In one or more embodiments, more than one top electrode may be coupled with the large bottom electrode such as that which is illustrated in FIG. 24 in which the bottom electrode 16-2 may have three smaller top electrodes 16 and the novel dielectric 21.

In one or more experiments and/or embodiments in which a metal foil was used, after the dielectric material was drawn down and dried, the metal foil was wrapped around a ceramic substrate and adhesively bonded to it, a top electrode was then mated with the outer most surface of the dielectric layer and held in place using a C-clamp to form a capacitor.

In one or more experiments in which copper phthalocyanine having a 3% by weight ethyl cellulose was used as the organic vehicle, a capacitance of over 40 micro-farads was measured. In these one or more experiments, the area of the electrodes was 0.00027225 square meters and the distance between the electrodes was 20 microns, a dielectric constant of $3.34 \times 10^5$ was measured.

In one or more experiments in which copper phthalocyanine in one layer mixed with Glycerol and copper phthalocyanine mixed with zinc phthalocyanine in the other layer bridged with a dried carbon ink containing carbon black, the dielectric constant was calculated according to the table below. Hence we have a dielectric constant around 50 millions in this example. Other examples were shown to lead to higher values. Experimental results for dielectric constant k are illustrated in TABLE XI.

TABLE XI

| | | |
|---|---|---|
| C | 0.000833333 | Farads |
| Co | 1.6896E−11 | Farads |
| ko | 8.8E−12 | — |
| L1 | 0.012 | |
| L2 | 0.012 | m2 |
| D | 0.000075 | m2 |
| k | 49,321,338 | |

Non-Linear Behavior

In one or more experiments, it was determined that by changing the material composition of the dielectric material, the resistance decreases with applied bias.

Super-capacitors have the ability to produce large power density (per unit weight or unit volume) by releasing stored charge quickly. Existing devices are not too far from batteries in this respect. However, energy density has always been a disadvantage. In order to achieve high energy density, large amounts of charge must be stored in the device. In making super-capacitors that hold large amounts of charge, either of three methods are used including increasing the surface area of the electrodes, increasing the dielectric constant of the electrolyte or the material between the electrodes to store more charge or polarization, and/or designing a hybrid super-capacitor/battery system in which the electrodes react with the electrolyte.

All three approaches have been used in the past without success for increasing energy density. The last option suffers from the same life cycle limitations as do batteries.

The one or more capacitors and other devices disclosed herein increase the stored charge or polarization in the electrolyte in order to produce a net higher energy density. This is accomplished through the use of metal phthlocyanines as described in the one or more embodiments of this invention.

As the material between the electrodes stores charge, this forces the electrodes to hold enough charge to produce a net-zero electric field in the entire device. Increasing the charge or polarization in the material between the electrodes increases the internal electric field and causes the electrodes to hold more charge. The total amount of stored charge in the super-capacitor and its consequent energy density is therefore dependent on the total charge and polarization stored in the material between the electrodes. Breakdown voltage limits the total stored charge and leakage current decreases it with time.

Conventional copper phthalocyanine and mixtures of other phthalocyanines such as zinc phthalocyanine have relatively high leakage current at one mil thickness in devices. Also, the relationship between charge stored and applied voltage which is commonly linear in dielectric materials decreases with increasing voltage applied to devices. Voltage breakdown is not a problem; the devices withstand 100 volts per mil easily, and leakage only increases linearly with increasing voltage.

The nonlinearity of these metal phthalocyanine mixtures is enormous; when charge storage is estimated by comparing the half life of these materials with decreasing voltage during discharge of these metal phthalocyanine containing devices.

the discharge behavior of a typical device. Half life increases enormously as the capacitor discharges, from seconds at 12 volts to days at under 0.5 volts. And at 0.2 volts, based on time to recharge, we estimate that about 30% of the charge still remains in the device after many days Comparing this behavior to that of a linear capacitor (charge and voltage vary inversely and linearly), this is extremely different, and this behavior can be used to the device maker's advantage. For example, by increasing dielectric thickness two orders of magnitude, in a linear capacitor the capacitance is reduced by 99%, whereas it is only reduced by about two thirds in devices using our metal phthalocyanine mixtures. Since the effective dielectric constant of our MPC (metal phthalocyanine) devices is in the hundreds of billions, a two third reduction in charge storage with its concomitant increase in half life and other properties is a very worthwhile tradeoff.

Increasing the voltage by two orders of magnitude increases energy storage density by a factor of 10,000, disregarding the loss due to increased thickness. By making the capacitor two orders of magnitude thicker, the net energy storage increases substantially after subtracting charge loss due to increased thickness. The increase may be over three thousand fold, and the other device characteristics such as insulation resistance, Q, and breakdown voltage are also greatly improved. Continuing the two orders of magnitude comparison, the energy density per unit weight of the thicker device is 33× that of the thinner device. Calculated energy density per pound of such a device is about 100× that of a lithium ion battery. Thus, a 6 pound MPC device may theoretically replace the 600 pound lithium battery found in electric vehicles.

Impact of Dielectric Thickness

A capacitor was build using one layer thickness of the novel dielectric. The same novel dielectric was used to build a five layers for the novel capacitor. Surprisingly, the charge storage was very good and decay time was excellent. The novel dielectric allows increased spacing between the electrodes of a capacitor without detrimental penalty to the charge capacitance or decay time. This is atypical behavior. As can be seen, the five layer thickness capacitor worked.

As illustrated in TABLE XII the half life was over 2 hours even for a dielectric material having five times the thickness (150 microns) compared to the typical 30 microns used in single layers. This result is remarkable and the novel dielectric has a solid electrolyte like behavior and charge storage is maintained with thickness.

TABLE XII

| Time | voltage |
|---|---|
| 0.1 | 1.63 |
| 0.5 | 1.5 |
| 1 | 1.44 |
| 2 | 1.38 |
| 4 | 1.34 |
| 5 | 1.33 |
| 10 | 1.29 |
| 15 | 1.27 |
| 20 | 1.24 |
| 32 | 1.2 |
| 60 | 1.12 |
| 75 | 1.07 |
| 90 | 1.04 |
| 141 | 1.03 |
| 106 | 1.01 |
| 129 | 0.996 |
| 135 | 0.956 |

Increasing Resistance & Capacitance

In one or more experiments, zinc phthalocyanine was added to copper phtahlocyanine in order to increase resistance of the dielectric material. In one or more experiments, a formulation having a 9:1 ratio of copper phthalocyanine to zinc phtahlocyanine was prepared, disposed onto a capacitor, and tested for resistance. The material mixture was drawn down on electrodes. The top electrode was coated with a pure copper phthalocyanine and the bottom electrode was coated with the formulation having a 9:1 ratio. The electrodes were mated and held using a C-clamp and measured. Similarly other compositions having various ratios of Zinc Phthalocyanine to Copper Phthalocyanine were prepared and these included ratios of 1%, 3%, 10%, and 100%. The 100% composition means no Copper Phthalocyanine was present and the composition was pure Zinc Phthalocyanine. The resistance of the compositions is illustrated in TABLE XIII:

TABLE XIII

| Zinc Phthalocyanine | Copper Phthalocyanine | Resistance (k-OHM) |
|---|---|---|
| 1% | 99% | 1,000 |
| 3% | 97% | over 1,000,000 |
| 10% | 90% | over 1,000,000 |
| 100% | 0% | over 1,000,000 |

In one or more experiments, it was determined that the addition of Zinc Phthalocyanine was effective for increasing the resistance of the overall dielectric which is favorable provided that the mixture maintains high capacitance. In one or more experiments, the addition of Magnesium Phthalocyanine and Nickel Phthalocyanine were also tested and yielded similar results in that the resistance is increased by virtue of mismatch in the electronic orbital or a mismatch in conductive pathways between the various materials while the capacitance was maintained by virtue of the compositional selection.

In one or more experiments, a capacitor was developed using two (2) layers including a first dielectric layer of suitable composition, such as pure Copper Phthalocyanine, that was applied to the top electrode and a second dielectric layer of suitable composition, such as Copper Phthalocyanine doped with Zinc Phthalocyanine, that was applied to the bottom electrode. It was determined that the properties of the capacitor performed best when the first dielectric layer and the second dielectric layers have different compositions rather than the same composition. In one or more experiments, it was determined that the film quality impacts results as more cracks led to high leakage currents.

Figure 29:
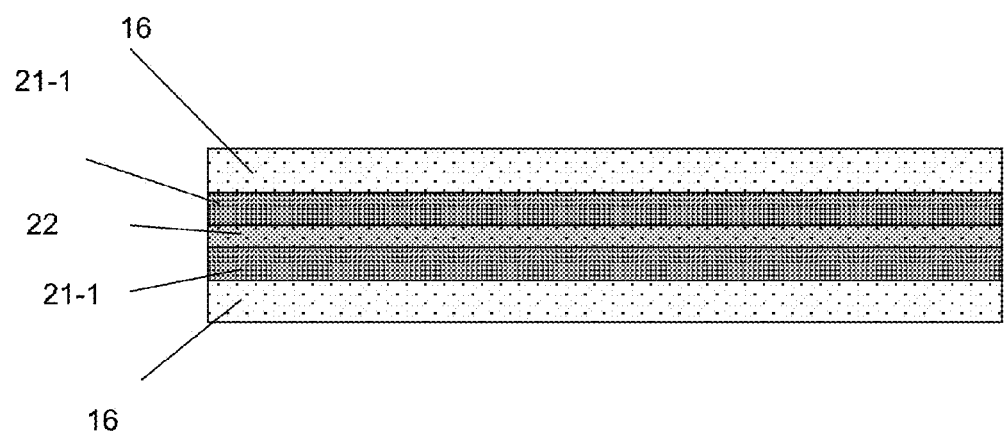
FIG. 29 illustrates a capacitor having an inner dielectric layer lodged between two thick film layers of the novel dielectric
Figure 30:
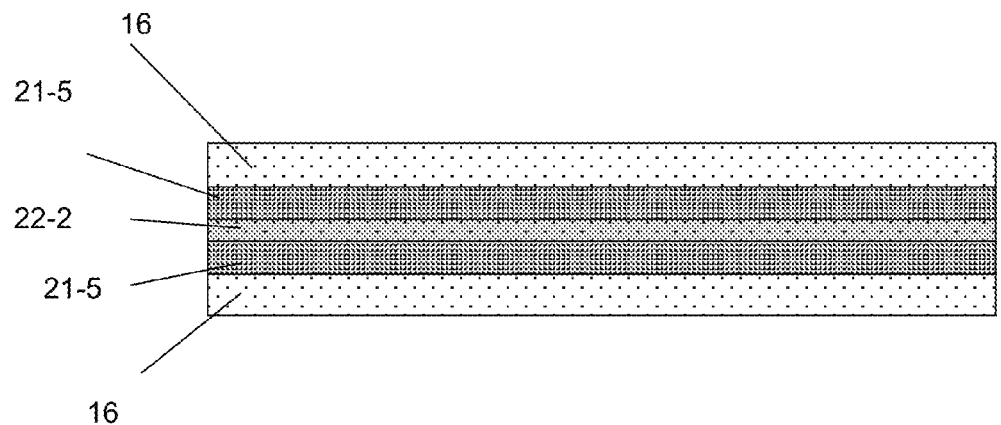
FIG. 30 illustrates another capacitor having an inner layer that is a resin with high polarity (where the resin can be doped using carbon) according to at least one embodiment of the invention.

In one or more experiments, a capacitor having improved characteristics was found when the dielectric layers to be mated were bridged using an inner layer 22 of suitable compositions as illustrated in FIG. 29. The copper Phthalocyanine 21-1 was applied to electrodes 16 and the suitable inner layer. In FIG. 30 for example the novel dielectric Copper Phthalocyanine with added BaTiO3 (21-5) has an inner layer made of a resin with high polarity doped with carbon (22-2).

The subject of which is addressed herein in one or more experiments to increase both the resistance and the capacitance.

Different Dielectric Layers

Figure 25A:
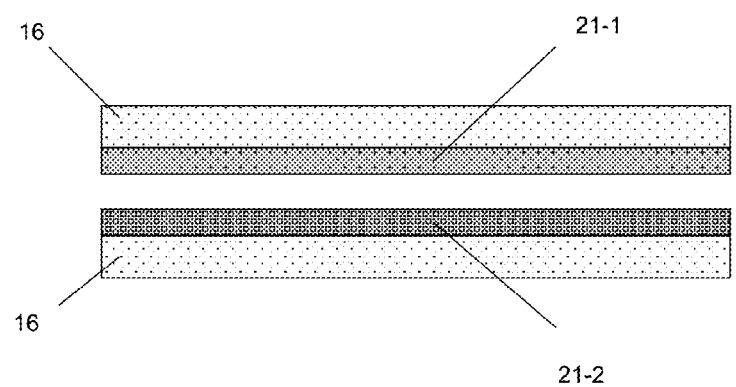
FIG. 25A illustrates first and second opposed electrodes having respective dielectric layers with different chemistries.
Figure 25B:
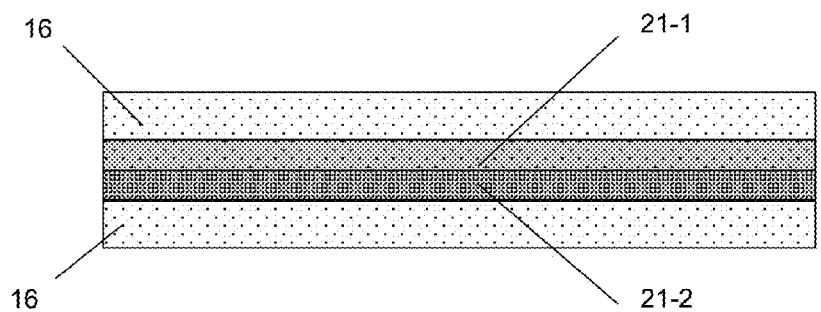
FIG. 25B illustrates the dielectric layers of FIG. 25A mated to form a capacitor of increased resistance, capacitance and the half life by using two chemistry variations of the novel dielectric compositions, according to at least one embodiment of the invention.
Figure 26:
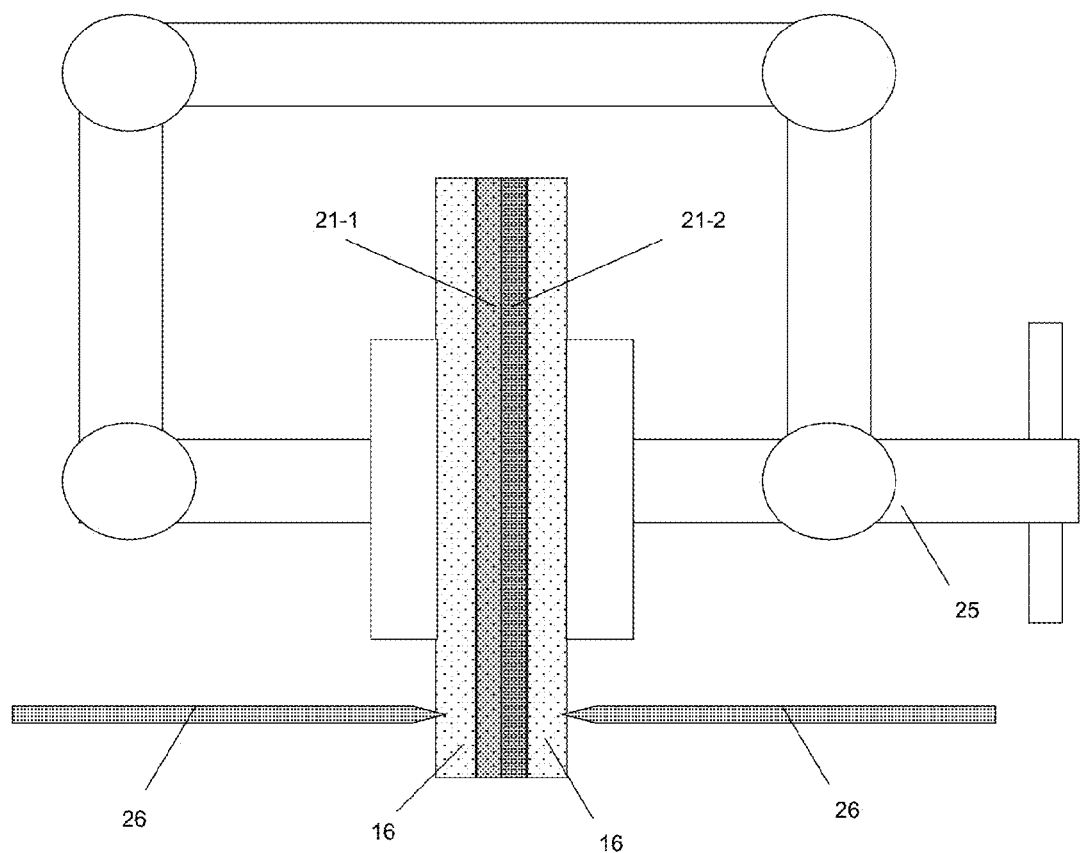
FIG. 26 illustrates a capacitive device having two dielectric layers of different compositions and held using a compression device, according to at least one embodiment of the invention.

In one or more experiments, a device having two (2) dielectric layers and an interface by the electrode was built as illustrated in FIG. 25A. As illustrated, a copper phthalocyanine layer (21-1) was placed on top of electrode (16), another dielectric layer of zinc phthalocyanine (21-2). The capacitor hence formed having two different dielectric layers have better decay time. FIG. 25B shows the two halves of the capacitor mated together. The capacitors were electrically tested using electric probes (26) while held together using a compression device (25) as is illustrated in FIG. 26.

Diode-Like Behavior:

In one or more experiments, it was determined that when only one electrode is coated the capacitor may exhibit diode-like behavior. The resistance as measured in one direction is different than the resistance measured in the opposite direction. This diode-like behavior may be engineered to yield desirable devices having charge flow dominated in one direction. An illustrative example of a capacitor exhibiting diode-like behavior is illustrated in FIG. 27.

In one or more experiments, the biasing under voltage was done in such manner to have the electrode coated with an interface being the negative pole of the capacitor. In one or more experiments, the biasing under voltage was done in such manner to have the electrode coated with an interface being the positive pole of the capacitor. Each of the capacitor device in the one or more experiments exhibited a diode like behavior since both charge storage and resistance became orientation dependent.

Figure 27A:
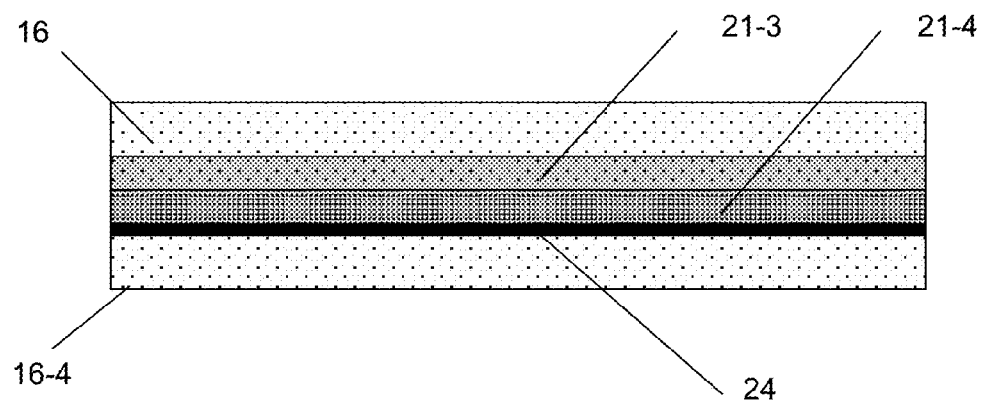
FIG. 27A illustrates a capacitor exhibiting diode-like behavior, according to at least one embodiment of the invention where an aluminum electrode coated with a aqueous ink containing carbon black.

In some cases as illustrated in FIG. 27A illustrates a capacitor exhibiting diode-like behavior, according to at least one embodiment of the invention where the bottom Aluminum electrode (16-4) was coated with an aqueous ink filled with carbon black (24). The biasing of the electrodes is case-1 was such that the Al electrode was negatively charged and kovar was positively charged. In case-2 the biasing of the electrodes was such that the Al electrode was positively charged and kovar was negatively charged. In case 1 the resistance was 700 k-Ohm and the capacitance was 1.6 nano-Farads. In case 2 the resistance was 115 k-Ohm and the capacitance was over 40 micro-Farads. Hence the diode like behavior was demonstrated.

Figure 27B:
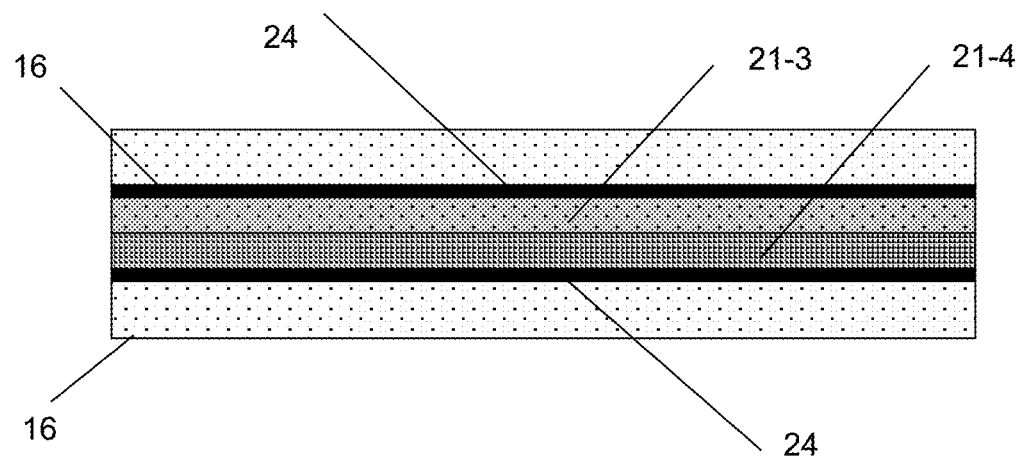
FIG. 27B illustrates a capacitor exhibiting high capacitance having two Kovar electrodes coated with an aqueous ink containing carbon black, according to at least one embodiment of the invention.

FIG. 27B illustrates a capacitor exhibiting high capacitance having two Kovar electrodes (16) coated with an aqueous ink containing carbon black (24), according to at least one embodiment of the invention where the two layered dielectric are different and sufficiently mismatched as is the case of Copper Phthalocyanine with added Glycerol (21-3) and Zinc Phthalocyanine and Copper Phthalocyanine mixture (21-4).

Figure 27C:
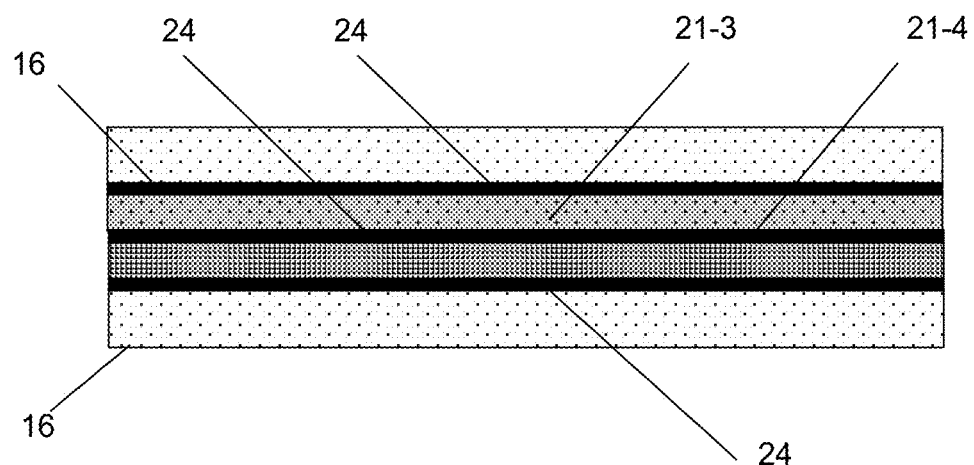
FIG. 27C illustrates a capacitor exhibiting high capacitance having two Kovar electrodes coated with an aqueous ink containing carbon black and an inner layer of a dried aqueous ink containing carbon black, according to at least one embodiment of the invention.

In other cases as illustrated in FIG. 27C a capacitor exhibiting high capacitance having two Kovar electrodes (16) coated with an aqueous ink containing carbon black (24) and an inner layer of a dried aqueous ink containing carbon black (24), according to at least one embodiment of the invention. The conductive ink containing carbon (24) used for coating the electrodes (16) were formulated using various carbons including carbon black, activated carbon, graphene that showed good results either on top of a electrode or as an inner layer (22).

In one or more experiments, the texanol solvent is removed at a drying temperature of about 80° C.; however, glycerol remains in the dielectric since it has a boiling point much higher than the drying temperature. This step may be used to keep the dielectric particulates in dispersion in the media.

Multiple Solvents and Pressure Application

In one or more embodiments, a double or triple solvent system may be used to achieve enhanced compaction of the organic and organo-metallic particulates at an increasingly elevated temperature as one solvent is removed at a time which leads to increasingly higher compaction of the particulates due to the different boiling points from each solvent. In one or more experiments, a triple solvent system was used and consisted of a mixture of texanol, tripropylene glycol, and glycerol. This step of using multiple solvents was conducted in one or more experiments with pure Copper Phthalocyanine and with a combination of Zinc Phthalocyanine and Copper Phtalocyanine.

A manner of applying pressure to the particles within the dielectric film leads to the predisposition of said particles to enter into contact followed by necking at elevated temperature and finally densification and mass transport from one particle into another. One manner of applying pressure may be to use a triple solvent system. Each of the solvents has a distinct evaporation temperature or boiling point. As an example according to one or more embodiments, a four solvent system may contain water, Texanol, Tri Propylene Glycol, and Glycerol. As water evaporates at 100° C., the particles remain under the Texanol and Tri Propylene Glycol. When Texanol evaporates, the particles push against one another to remain under the Tri Propylene Glycol. When the last solvent is removed, then the particles go under considerable pressure to avoid air since the surface energy of particles is lower when they are in contact with a solvent as opposed to being in air.

In one or more experiments, it has been determined that the quality of the film and the intimate contact between adjacent particles control the electrical properties of the film and specifically the leakage current that happens within the film. It has also been determined that the charge storage capability of the film is compromised if the film contains defects such as crack or holes.

In one or more experiments, the dielectric layers were heated to a low temperature to remove solvents with heat recipes that minimize film cracking. In one or more embodiments, the layers were heated to about 60° C. under vacuum, and a film made according to these one or more experiments exhibited improved characteristics. In one or more experiments, the layers were heated to 80° C. in a convection oven. At temperatures above 80° C., the film cracks that are observable after the drying phase are accentuated and the addition of stabilizing agents is noticeable. In one or more experiments, it was determined that Copper Phthalocyanine films having added Glycerol and dried at temperatures of 60° C. exhibited much less drying defects than those at elevated temperatures and without Glycerol.

In one or more experiments, the dielectric layers of various mixtures and chemical compositions that were heated to 150° C. and above began to densify. The particles entered into a necking process and the Capacitance was developed to a greater extent. The films that were dried at 60° C. and then heated to at least 150° C. under pressure in a vice underwent limited to no-cracking followed by more densification. This led to the formation of a densified film made of Copper Phthalocyanine. This passage from a film to a densified film resulted in increased capacitance. The films using Glycol in the mixtures exhibited much less defects. In one or more experiments, the pressure was applied using a vice and then placed in an oven and sometimes applied using a hot iso-static press such as thermal compression bonding.

Figure 28:
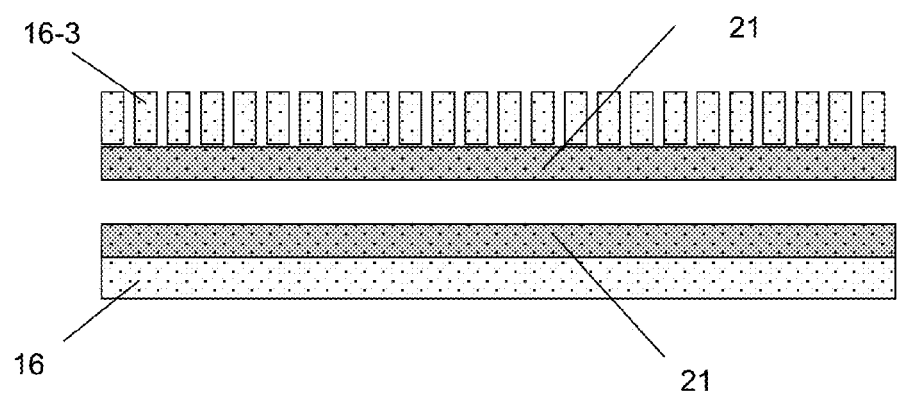
FIG. 28 illustrates a capacitor having a perforated electrode, according to at least one embodiment of the invention.

Perforated Electrodes:

In one or more embodiments, an electrode may be perforated (16-3) to enable the evaporation of solvents through the perforations. The dielectric (21) is applied to another electrode (16) and mated with the coated perforated electrode (16-3). This method may be used to collapse two (2) halves of a capacitor and then dry the solvent post assembly of the capacitor. An example according to one or more embodiments is illustrated in FIG. 28

Biasing:

In one or more experiments, an electric field of up to about 3000 Volts with low current was used to test a capacitor according to one or more embodiments disclosed herein. In one or more experiments, alternating current (AC) was used for testing the capacitor. In one or more experiments, direct current (DC) was used for testing the capacitor. In one or more experiments in which AC at a 60 Hz frequency was employed, the material exhibited a decrease in resistance if voltage is in excess of 1000V. In one or more experiments, it was determined that the resistance is compromised particularly when an air pocket in the film leads to the dielectric breakdown of air and the resistance drops considerably as a low resistance path is created.

In one or more experiments in which DC of up to 100V was employed, the material was heated under bias. It was determined that this biasing aligned the molecules of the material, impacting the capacitance and the resistance in an advantageous way.

The Dielectric Constant:

In one or more experiments, the dielectric constant of the dielectric material and capacitors disclosed herein was determined. The dielectric constant was determined by relying on measured data and behavior of the capacitors disclosed herein.

According to one or more embodiments, a capacitor having three (3) layers is provided. A first dielectric layer of suitable composition (21-1) is applied to the top electrode (16) and a second dielectric layer of suitable composition (21-1) is applied to the bottom electrode (16). An inner layer (22) is provided that bridges the two dielectric layers. In one or more embodiments, the first dielectric layer (21-1) and the second dielectric layer have different compositions. A representative example of a capacitor according to one or more embodiments is illustrated in FIG. 29.

In one or more experiments, it was determined that surface roughness of the dielectric has an impact in the capacitance. Specifically, when two (2) electrodes have been coated with the dielectric material and then dried fully under heat and vacuum, when they are mated together to build the capacitor, the small air pocket left at the interface may compromise the capacitance and dielectric characteristics. For this reason and in order to optimize results, various inner layers were tested to minimize air pocket entrapment.

In one or more experiments, an inner layer was constructed using low molecular weight to high molecular weight polymers that exhibit high polarity. In one or more embodiments, these polymers were doped with conductors, while in one or more additional embodiments, the polymers did not contain a doping agent. In one or more embodiments, the polymers may be a Cyano-Acrylate resin, Glycerol, carbon doped resin, graphene doped resin, and a Cyano-Acrylate resin doped with chelating agent such as TEA in order to bridge the air pocket at the interface and allow good capacitance build up in the capacitor. In one or more experiments, it was determined that the addition of $BaTiO_3$ increased the resistance of the dielectric material (21-5). The addition of $BaTiO_3$ was varied from between about 0.1% by weight to about 20%. It was determined that at compositions of about 20% by weight, the resistance increased significantly while the capacitance decreased. According to one or more embodiments, an advantageous range of $BaTiO_3$ addition that increased resistance and safeguarded capacitance was found to be between about 3% by weight and about 17% by weight. The dielectric (21-5) formulation used in this embodiment was composed of 20.9% by weight Copper Phthalocyanine, 3.0% by weight Zinc Phthalocyanine, 16.4% by weight $BaTiO_3$, 56.7% by weight Texanol, and 3.0% by weight Glycerol. An inner layer (22-2) consisting of a resin with high polarity doped with carbon was placed between the two halves (see FIG. 30.)/The capacitor formed from the dielectric formulation was tested in terms of resistance as a function of applied voltage. Subsequently, the capacitor was charged and then measured for voltage decay.

In the one or more experiments, the results were unexpected in that the resistance and the capacitance exhibited a non-linear behavior. It was also determined that the leakage current is also non linear and generally low at low voltages and high at high voltages. Conversely, it was determined that the resistance is high at low voltages and low at high voltages.

Figure 31:
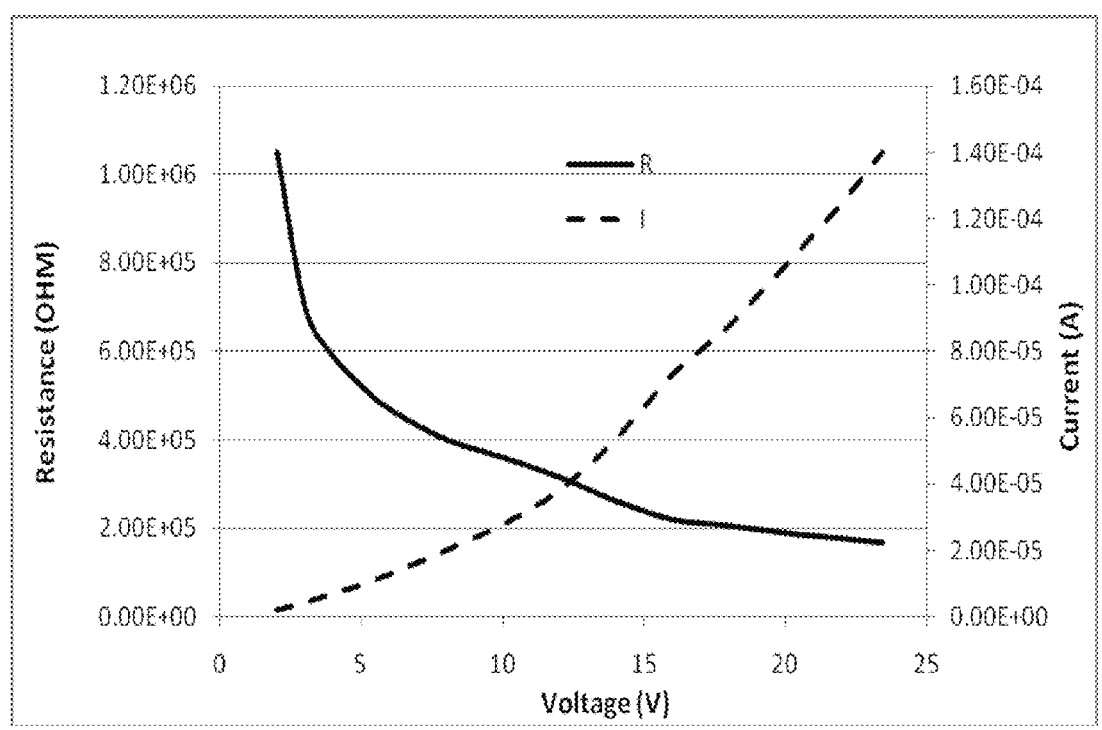
FIG. 31 is a graphical representation of experimental results in resistance and leakage current across a dielectric material to which a voltage range was applied.

In one or more experiments, it was determined that the lowering of resistance with increased voltage is possibly due to the fact that dielectric material disclosed herein made from a dispersion of particulates has many of its molecular dipoles align with the electric field. In the presence of a high field gradient, as is the case within a capacitor, the mobility of any charged species contained with the dielectric is increased. The increase in mobility of charge species may be the reason for the observed lowering of resistance and increased leakage currents with higher voltages. Experimental results according to the one or more experiments disclosed herein are illustrated in FIG. 31.

Figure 32:
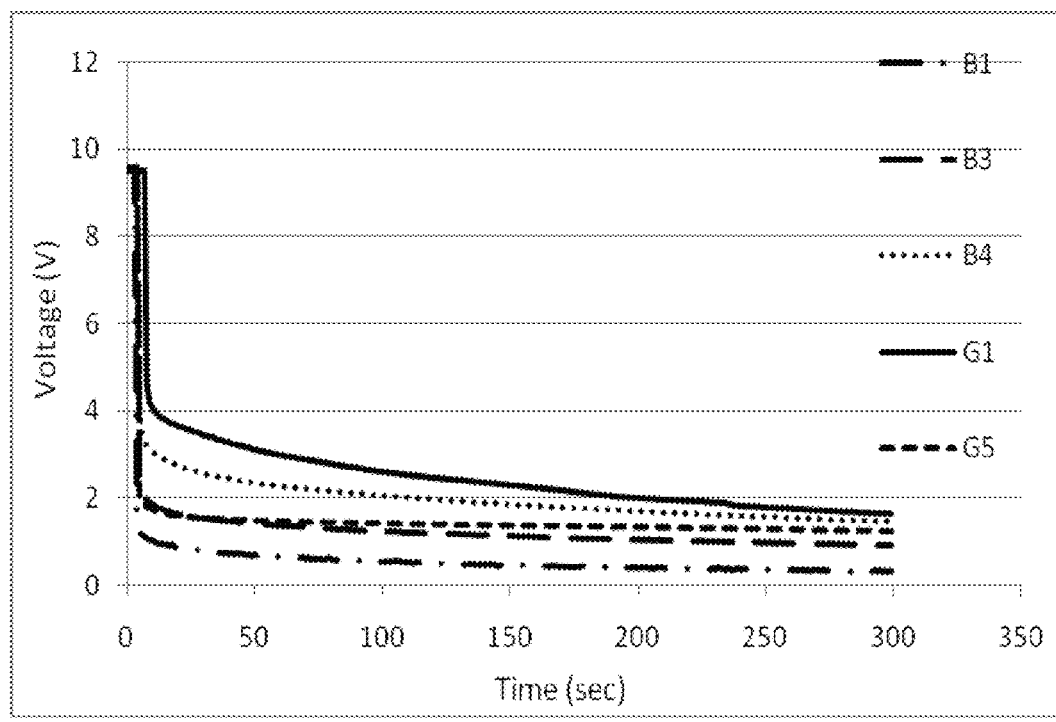
FIG. 32 graphically represents the experimental results of several chemistries tested in terms of charge decay which demonstrates the effect of chemistry on the resistance of the dielectric.

In one or more experiments, several chemistries were tested in terms of resistance as a function of voltage. The results of these one or more experiments determined that resistance of these chemistries indicates a strong dependency on formulation. It was determined that the addition of mismatched particles impacts the conductive path and increases resistance. A good balance between high resistance having minimal leakage current and high capacitance having good charge build up is needed to achieve best results. Experimental results are illustrated in FIG. 32. Demonstrate the dependency of charge storage on chemistry and formulation variations. In this particular example the best chemistry of the phthalocyanine particulates was composed of 25% Copper Phthalocyanine, 25% Zinc Phthalocyanine, 25% Magnesium Phthalocyanine, 25% Nickel Phthalocyanine.

Figure 33:
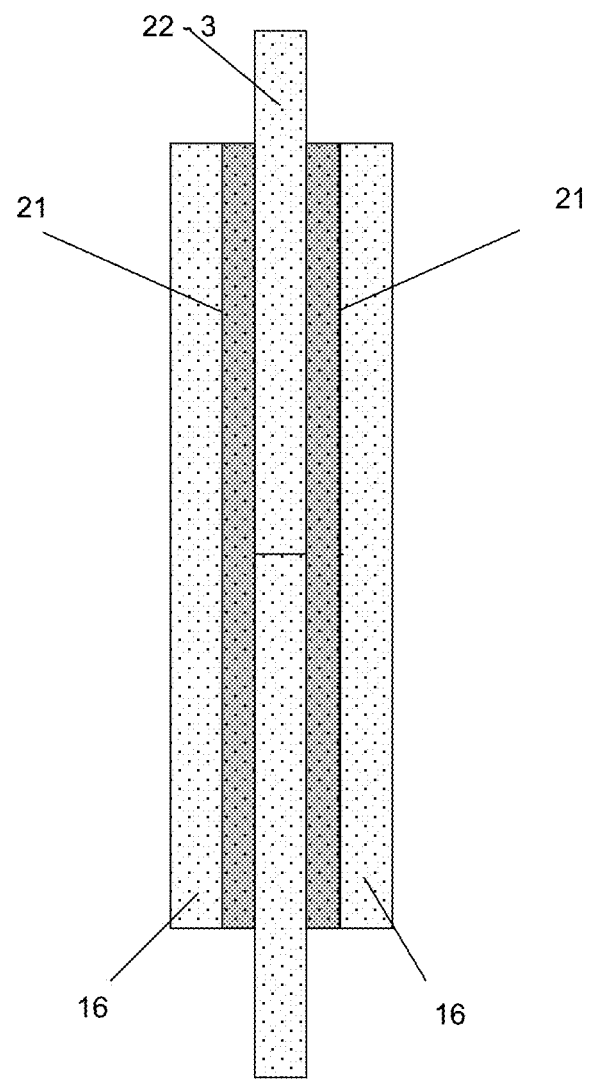
FIG. 33 illustrates a capacitor having a metallic inner layer carrying no bias and positioned between two layers of the novel dielectric that are disposed between two outer electrodes, according to at least one embodiment of the invention.
Figure 34:
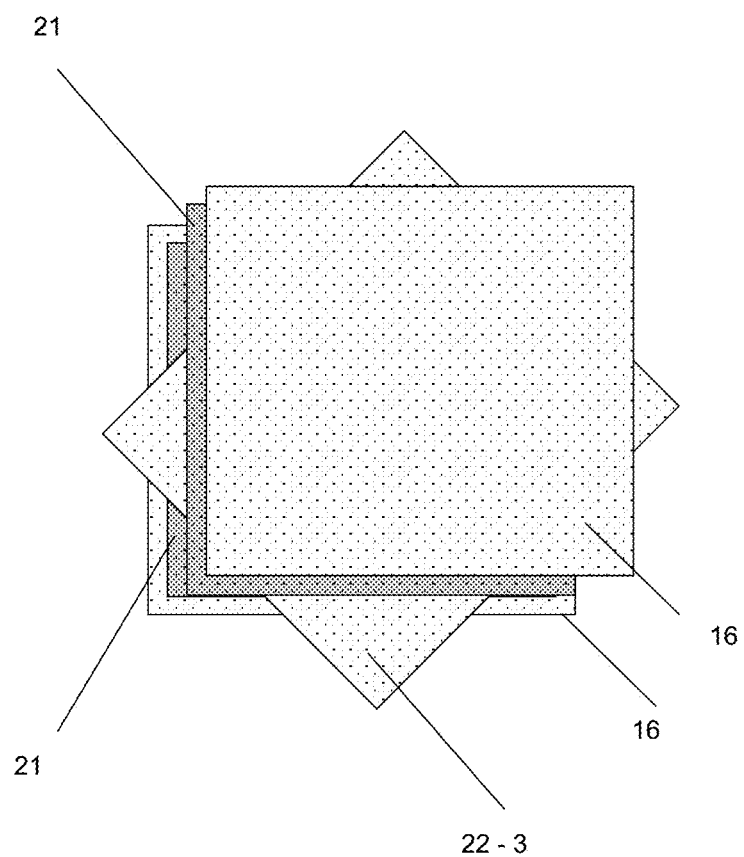
FIG. 34 is a plan view of the capacitor of FIG. 33.

Metal Bridging Electrode:

In one or more experiments, an inner layer was constructed from a metallic electrode. The two (2) external electrodes were coated with a dielectric material and partially dried. The inner metallic layer (22-3) was then placed in between the partially dried dielectric layers from each of the external electrodes. The capacitor formed is then clamped together and allowed to dry further. In one or more experiments, the capacitors were tested in terms of resistance, leakage current and charge storage and voltage decay. An exploded side view of the capacitor is illustrated in FIG. 33. A top view of the capacitor is illustrated in FIG. 34.

Current Measurement & Voltage Decay:

In one or more experiments, an ammeter was connected in series with the capacitor to measure the current flowing through it during the charging period. Since current flow decreases in the circuit as the capacitors charge, this technique was effective in determining at which time the capacitor was fully charged.

Figure 35:
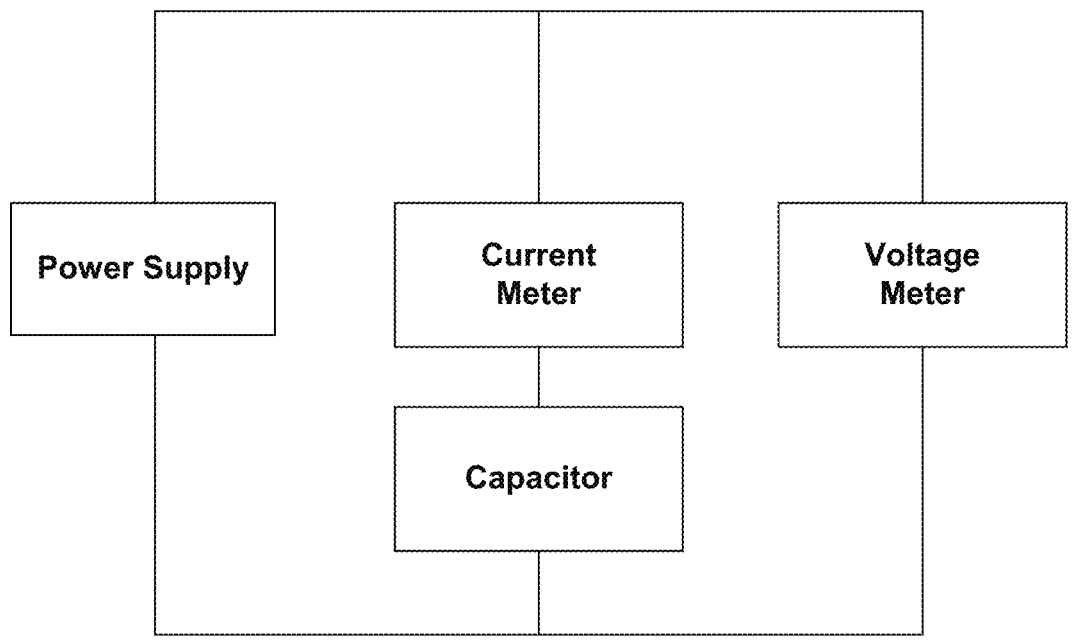
FIG. 35 is a schematic circuit diagram of an exemplary system used for charging and discharging capacitors.

In one or more experiments, the capacitor is discharged by connecting the volt meter in parallel to the capacitor and determining voltage drop as a function of time. Since the meter has a known resistance and the voltage from the meter is an output signal that may be saved through a data acquisition board, the current flow that is outputted by the capacitor may be calculated using the ratio of voltage to resistance. The cumulative current may also be integrated to determine the overall charge accumulation and hence the capacitance. A circuit schematic of a system used for charging and discharging the capacitors is illustrated in FIG. 35.

Voltage Decay:

Impact of Air Gaps/Defects at the Interface of 2 Mating Dielectric Films

Figure 36:
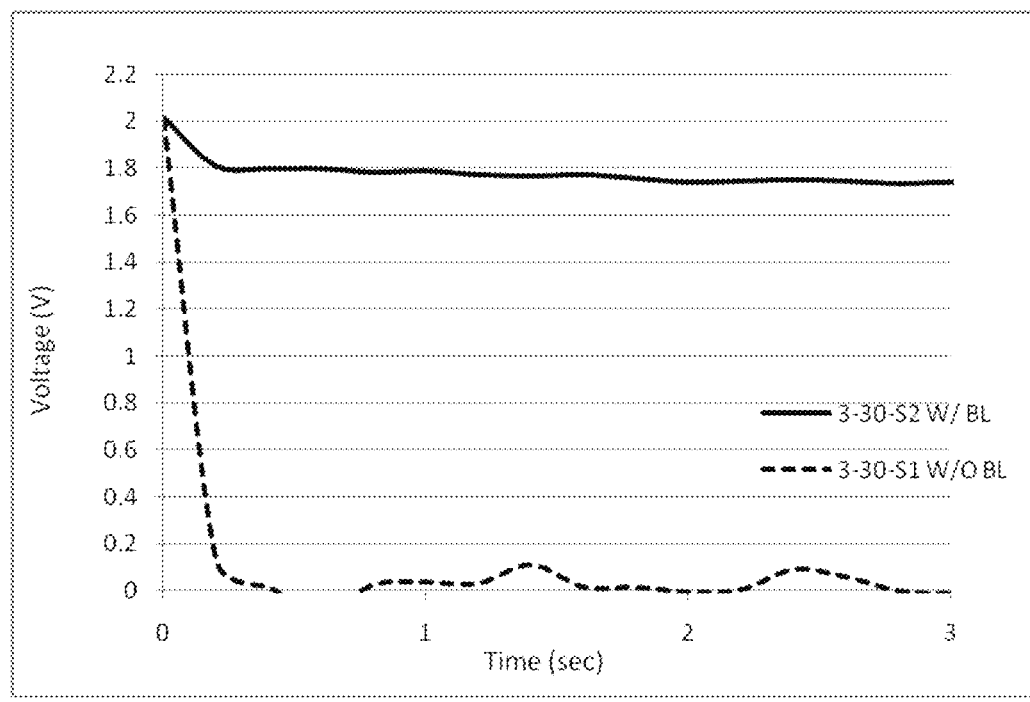
FIG. 36 graphically represents experimental results of the voltage decays in time of two capacitors, one having a bridging layer (the inner layer) and the other having no bridging layer.

The impact of interfacial defects at the interface of two (2) mating dielectric films is exemplified according to the one or more experiments that follow. Two (2) capacitors were built using identical electrodes in one experiment in which the capacitor was free of a bridging layer and in another experiment in which the capacitor has a bridging layer made of a cyanoacrylate resin doped with carbon black. The drying process was completed so that no or almost no solvent was present in the dielectric film. The completed drying exacerbates the air pocket entrapment described before. Biasing was done at 2 volts at room temperature for each of the two (2) capacitors. Experimental results depicting the voltage decay for a capacitor using a bridging layer (referred to as "BL" in the Figures) in one of the capacitors and having no bridging layer in another of the capacitors are illustrated in FIG. 36. FIG. 36 illustrates the impact of air gaps at the interface of the dielectric films in which the voltage decay was substantial for the capacitor without the bridging layer compared to the capacitor with the bridging layer. When the two halves of a capacitor are mated to form the capacitor, the residual solvents help the capacitance to develop and advantageous results may be obtained.

Charge Storage:

The slow voltage decay demonstrates that the dielectric film chemistries have the ability to store charges. This is significant in that the capacitor has a battery like behavior or a capacitor like behavior depending on the resistance that may be engineered within the film. In either case, the charge storage capability of the dielectric film made of organic and organo-metallic particulates is advantageously high.

Figure 37:
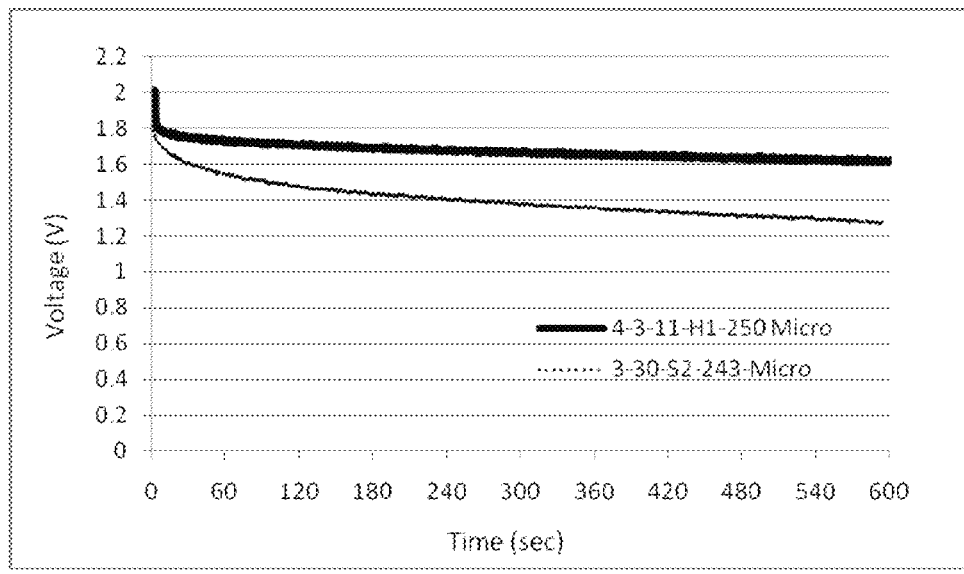
FIG. 37 graphically represents experimental results of the voltage decays in time of two capacitors having different concentrations of BaTiO3 additive in their dielectric layers.

The impact of BaTiO3 Concentration:

In one or more experiments, the impact of the oxide dielectric material on voltage decay was demonstrated. In one or more embodiments, the BaTiO3 concentration by volume was changed from about 3% to about 20%. As illustrated in the FIG. 37, the saturation current between the capacitor was within range and the thickness of the film was 35 microns per layer. The electrodes were Kovar for both data sets illustrated in FIG. 37. Both capacitors had the inner layer composition (carbon doped resin) and thickness (35 microns).

Figure 38:
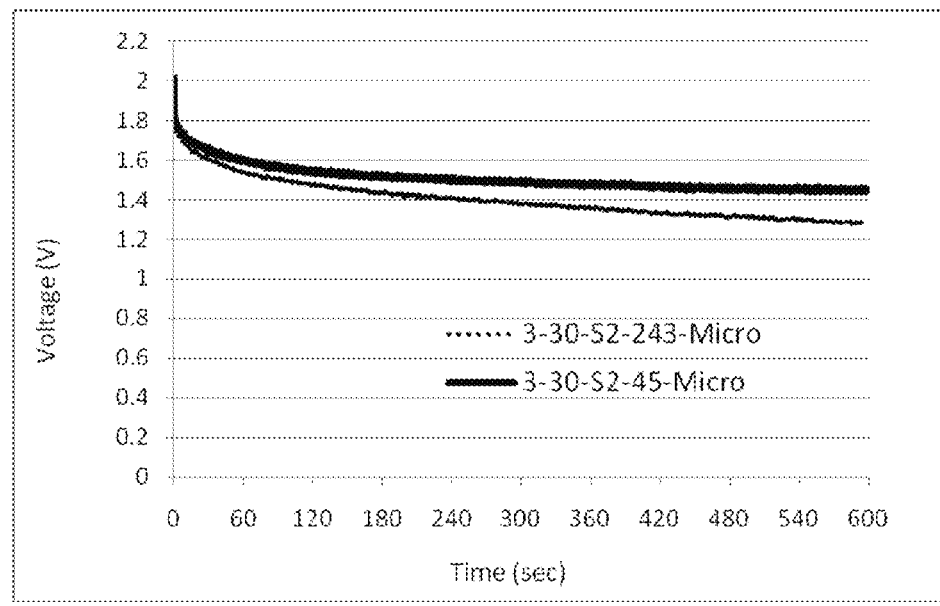
FIG. 38 graphically represents experimental results of the voltage decays in time of a capacitor that was charged under heat in one case and at room temperature in the other case applied heat during bias enables more charging as the saturation current dropped from 243 to 45 Micro-Amps FIG. 39 graphically represents experimental results of the voltage decay in time of a capacitor recharged until a saturation current was achieved, as illustrated in the figure the charge storage capability is demonstrated; furthermore, the rate of voltage decay is slower as time goes by FIG. 40 graphically represents experimental results of the voltage decays in time of capacitors having Kovar and aluminum electrodes, the Kovar electrodes are better for building the capacitors.

Charging Under Heat and Bias:

In one or more experiments, a capacitor was formed by mating two (2) dielectric coated electrodes and having an inner-layer to bridge the air pocket at the mating interface. The capacitor was then charged under two (2) different biasing conditions and measured for voltage decay to quantify the capability of the technology to hold charge. The charging current flowing through a capacitor under a two (2) volt bias was stabilized at 243 micro-amp. Subsequently to reaching current saturation, a voltage-decay through a voltmeter was performed. After the voltage decay, the same capacitor was charged using a two (2) volt bias while being heated to 45° C. using an air gun to drive more current flow in the capacitor. Using this thermal treatment under a biasing voltage may result in more charging of the capacitor. This may be demonstrated by the fact that the saturation current reached 43 micro-amps in these one or more experiments which is much lower than the 243 micro-amps obtained in the one or more experiments conducted under room temperature bias. The voltage decay was measured and graphed in FIG. 38 which illustrates that a slightly better result is obtained using heat and bias rather than just bias. Generally, the charging process is driven faster to completion in the presence of heat.

Charge Carriers:

In one or more experiments, it is determined that the increase in current flow brought about by the heat is most likely due to the fact that the mobility of charge carriers contained within the dielectric are able to flow more freely at slightly more elevated temperatures such as 45° C. in this example. This may serve as proof that the organics and organo-metallics contain charge carriers. The heat may also promote alignment of the dipoles contained within the dielectric. Thus the need for controlled heating and controlled cooling in conducting the one or more experiments disclosed herein.

Figure 39:
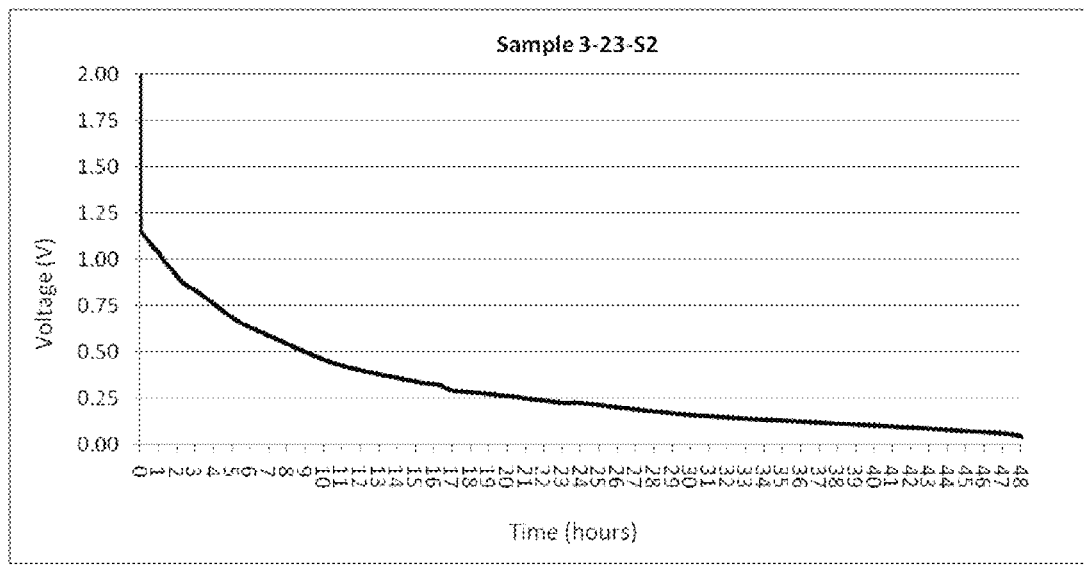

Longer Voltage Decay:

In one or more experiments, the capacitor used in the one or more experiments referenced in the section entitled "Charging under heat bias" was recharged until a saturation current of 200 micro-amps was achieved, and then a voltage decay measurement was preformed. In these one or more experiments, the capacitor was not connected to a resistance load. The results are illustrated in FIG. 39 in which a battery-like behavior was demonstrated. The capacitor was charged using two (2) volts and held charge for more than 48 hours since there was still charge left inside. This discharge may be the result of the non-linear behavior since resistance increases with lower voltages and a residual permanent polarization.

Figure 40:
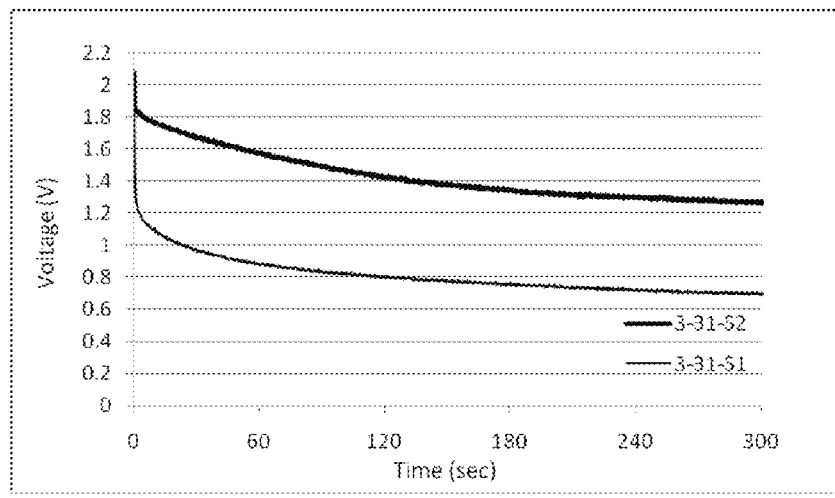

Impact of Electrodes:

In one or more experiments, Kovar electrodes were employed in building the one or more capacitors described herein. In one or more additional experiments, aluminum electrodes were employed in building the one or more capacitors described herein. In each of the relevant one or more experiments, the same or substantially the same dielectric chemistry was used on both a pair of Kovar electrodes and a pair of aluminum electrodes. It was observed that there were noticeable signs of corrosion on the aluminum electrodes. Experimental data is shown in FIG. 40.

Figure 41:
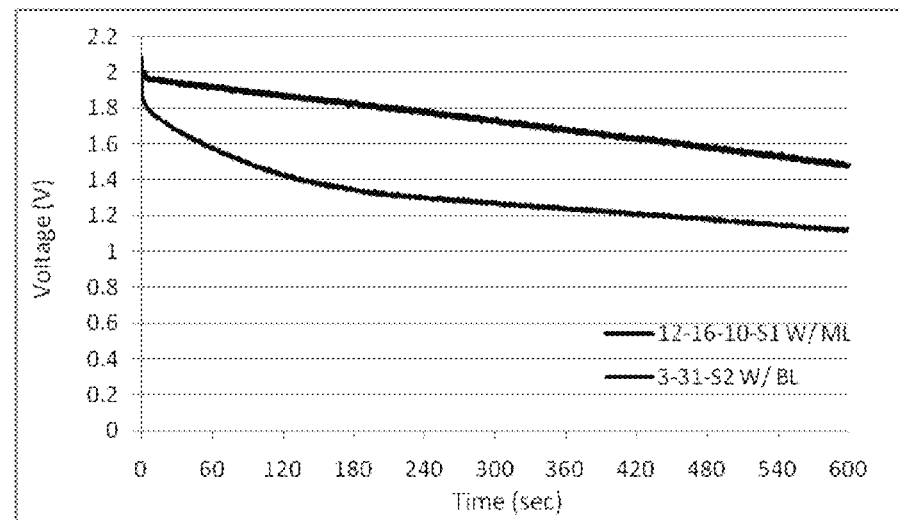
FIG. 41 graphically represents experimental results of the voltage decays in time of capacitors having a metallic inner layer and an organic inner layer.

Impact of a Metal Bridging Layer:

In one or more experiments, the impact of a metallic bridging layer was investigated. In the one or more experiments, Kovar electrodes were used. The dielectric was applied to both the internal sides of the electrodes and dried partially. The solvent left on the two (2) dielectric layers helped in making good contact with, or good wetting of, the inner metallic layer, which was also made of Kovar. The illustration of the device is shown in FIG. 34. The voltage decay was tested and it was determined that the metallic layer was capable of achieving a good voltage drop compared to the one or more embodiments in which the inner layer is made of an organic polymer. Experimental results are depicted in FIG. 41.

The Impact of Voltage Bias

Figure 42:
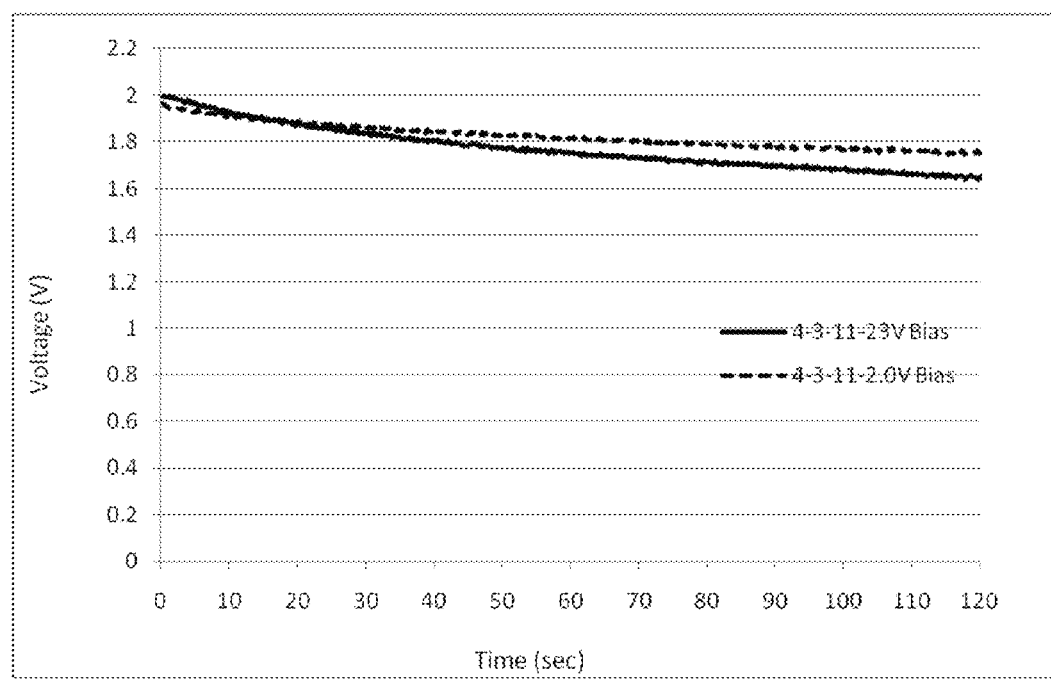
FIG. 42 graphically represents experimental results of the voltage decays in time of a capacitor that was biased using two different voltages FIG. 43 graphically represents experimental results of the voltage decay in time of a capacitor in which the voltage dropped relatively quickly from a higher value to a lower value, at which further decay was slowed; this illustrates the non linearity of the dielectric behavior and correlates with the increased resistance trend that slows down decay at lower voltages.

In one or more experiments, a capacitor was first charged using a two (2) volt bias and then discharged during which time the voltage decay was measured and recorded. Subsequent to the discharge, the capacitor was charged a second time using a 23 volt bias and the voltage was subsequently reduced to two (2) volts followed by a discharge. The voltage decay was measured again for this capacitor. It was determined in one or more experimental results that there was no significant improvement in voltage decay. It was determined that this is because the novel dielectric material exhibits a strong non-linearity in behavior. Higher voltages used for biasing did lead to higher charge storage but not in a linear fashion. The resistance drops to low values at high voltages and results in higher internal leakage currents in the capacitor. Experimental results are illustrated in FIG. 42.

Figure 43:
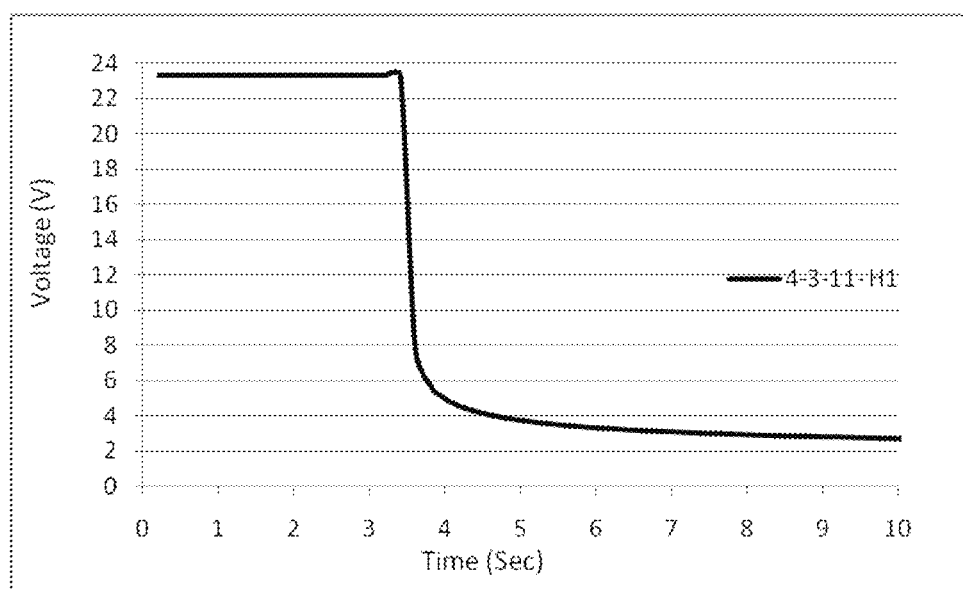

In one or more experiments, it was determined that higher voltages used for biasing did lead to higher charge storage but only an incremental increase was observed and the increase was not linear. The resistance drops to low values at high voltages leads to higher internal leakage currents in the capacitor. As illustrated in FIG. 43, the voltage drops quickly to around two (2) volts where the resistance is high enough to minimize internal leakage currents. A fax ribbon coated with carbon black was used as the inner layer. Part of the fax ribbon was cut and dip coated in a highly polar resin. Subsequently it was placed between two electrodes coated with the novel dielectric and the charge storage and capacitance were maintained.

Cellulosic Paper

A porous paper was impregnated with the cyanoacrylate resin and inner layered between two kovar electrodes having the novel dielectric. The capacitor worked well in terms of resistance, capacitance and charge storage.

Figure 44A:
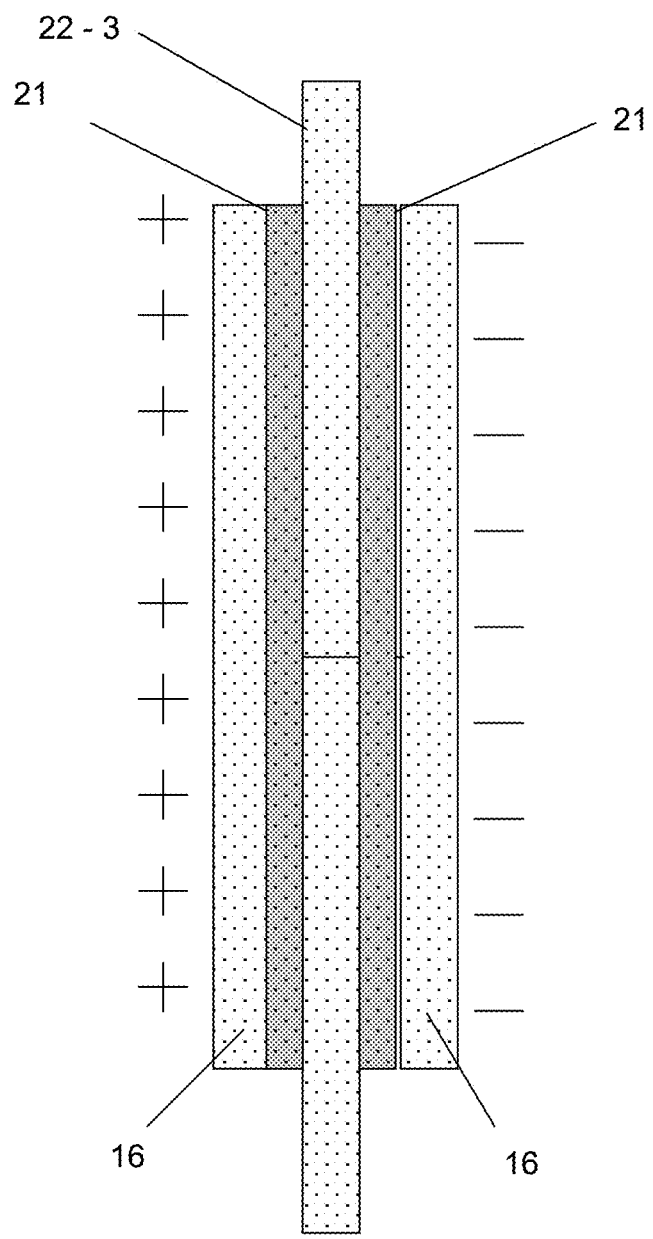
FIG. 44A illustrates a capacitor having a passive metal inner-layer between external electrodes, according to at least one embodiment of the invention.
Figure 44B:
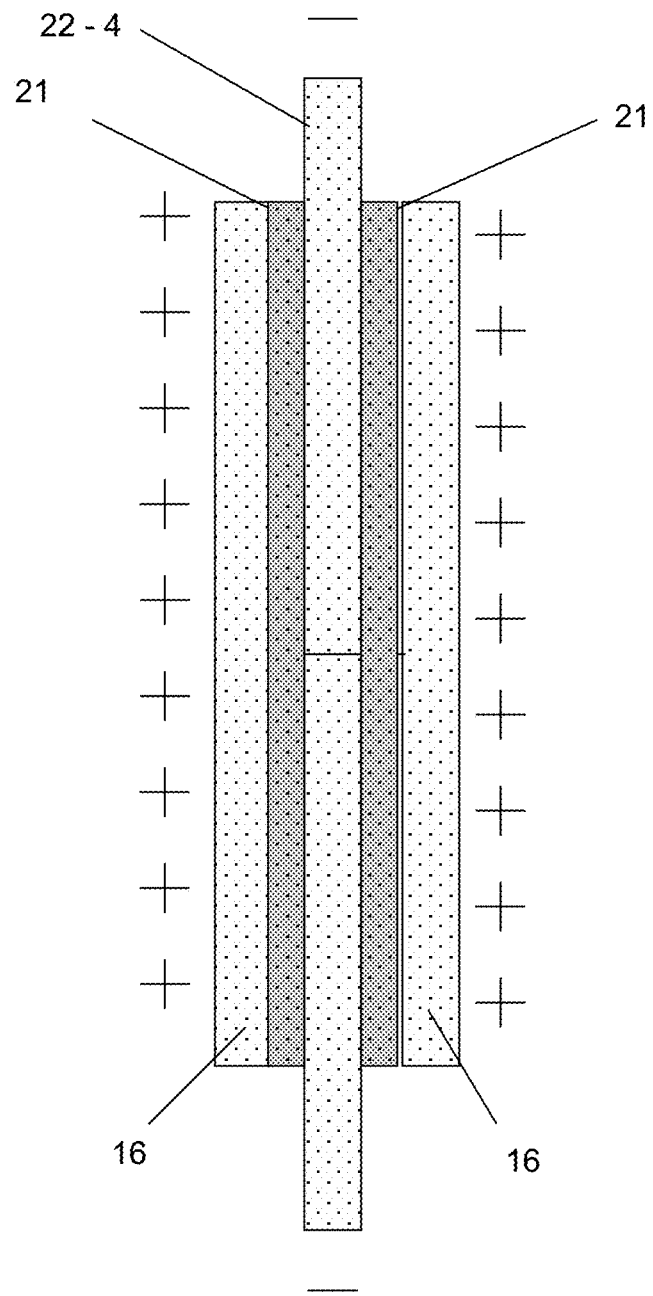
FIG. 44B illustrates a capacitor having an active metal inner-layer (internal electrode) between external electrodes, according to at least one embodiment of the invention.
Figure 45:
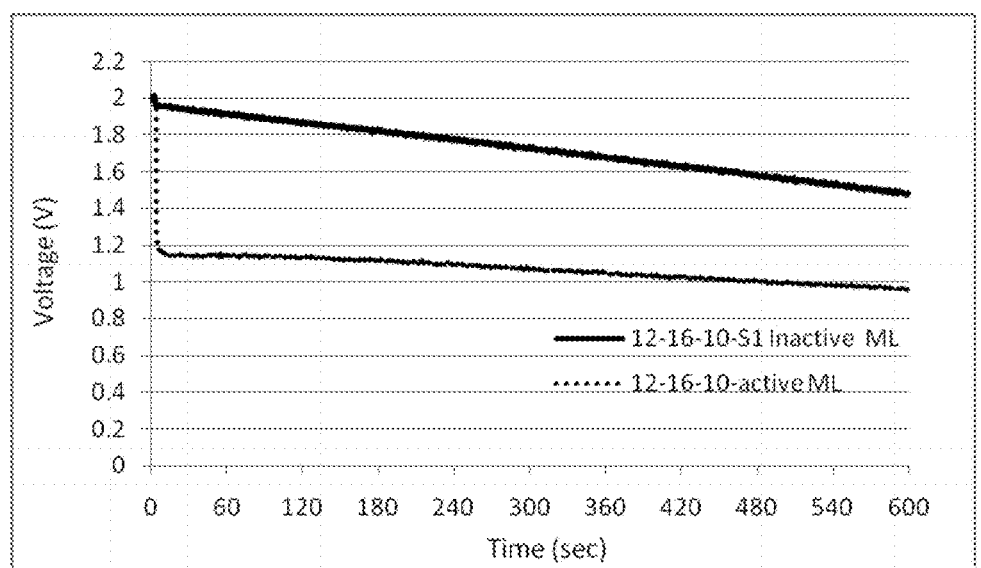
FIG. 45 graphically represents experimental results of the voltage decays in time of capacitors of FIGS. 44A and 44B; the passive metallic inner layer yields better results.

Active Versus Passive Metal Bridging Layers:

In one or more experiments, the biasing was performed using two (2) volts on the external metal electrodes. The metal inner layer had no voltage applied to it and is referred to herein as a passive metal layer. One external electrode was negatively charged and the opposite electrode was positively charged. In one or more additional experiments, a bias was applied to the internal metal layer in a symmetrical fashion vis-a-vis the external electrodes. In this manner, the internal electrodes carry the same charge and the internal metal layer carries the opposite charge. It was determined that the charges were effectively doubled. FIGS. 44A and 44B illustrate the one or more capacitors made according to the one or more experiments. It was determined that the voltage decay is better behaved in the case of the passive metal layer and not in the case of the active metal layer as illustrated in the experimental results shown in FIG. 45.

Dielectrics with Non-Linear Charge Drop with Gap or Voltage

In one or more experiments, it was determined that dielectrics may have reversed non-linearity. The one or more dielectrics disclosed herein may have a non-linear behavior in terms of applied voltage and the effective resistance is significantly higher with lower applied voltages. The applied electric field across the capacitor is related to the applied voltage divided by the distance between the electrodes. With the insertion of the passive metal layer carrying no voltage, the presence of the passive metal layer increases the effective distance of the capacitor, and the electric field gradient is decreased by the addition of the passive metal layer. It was determined that this is the reason why the dielectric separated by the passive layer exhibits better voltage decay since the resistance is in a higher regime and the charge build up is maintained due the lower leakage currents. For this reason, the spacing between the plates has a more favorable response in this novel non-linear dielectric as opposed to the standard dielectric materials. In conventional dielectrics, more applied voltage resulted in better charging until a dielectric breakdown threshold is reached. The one or more capacitors disclosed herein are more appropriately configured than conventional dielectrics at lower voltages.

The one or more capacitors disclosed herein may be employed in multiples in order to increase voltage or current, depending on the configuration. At a charging voltage of about two (2) volts in which the one or more capacitors display advantageous characteristics, a multitude of capacitors could be employed to achieve battery-like behavior. Alternatively, serial addition of capacitor or dielectric thickness may build up voltage. For example, a ten (10) Volt capacitor battery may be built using by stacking multiple capacitors in series.

A Combination of Organic and Metallic Bridging Layers

Figure 46A:
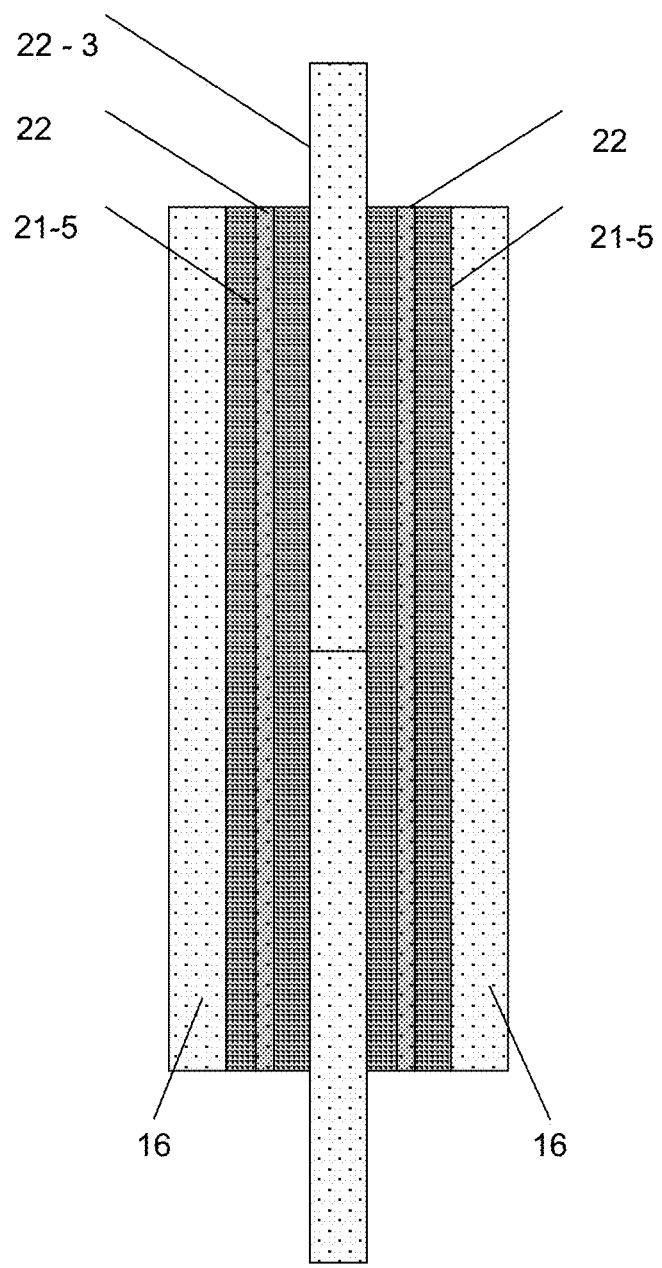
FIG. 46A illustrates a capacitor having a metal inner-layer and an organic inner layer combined in the same capacitor, according to at least one embodiment of the invention.
Figure 46B:
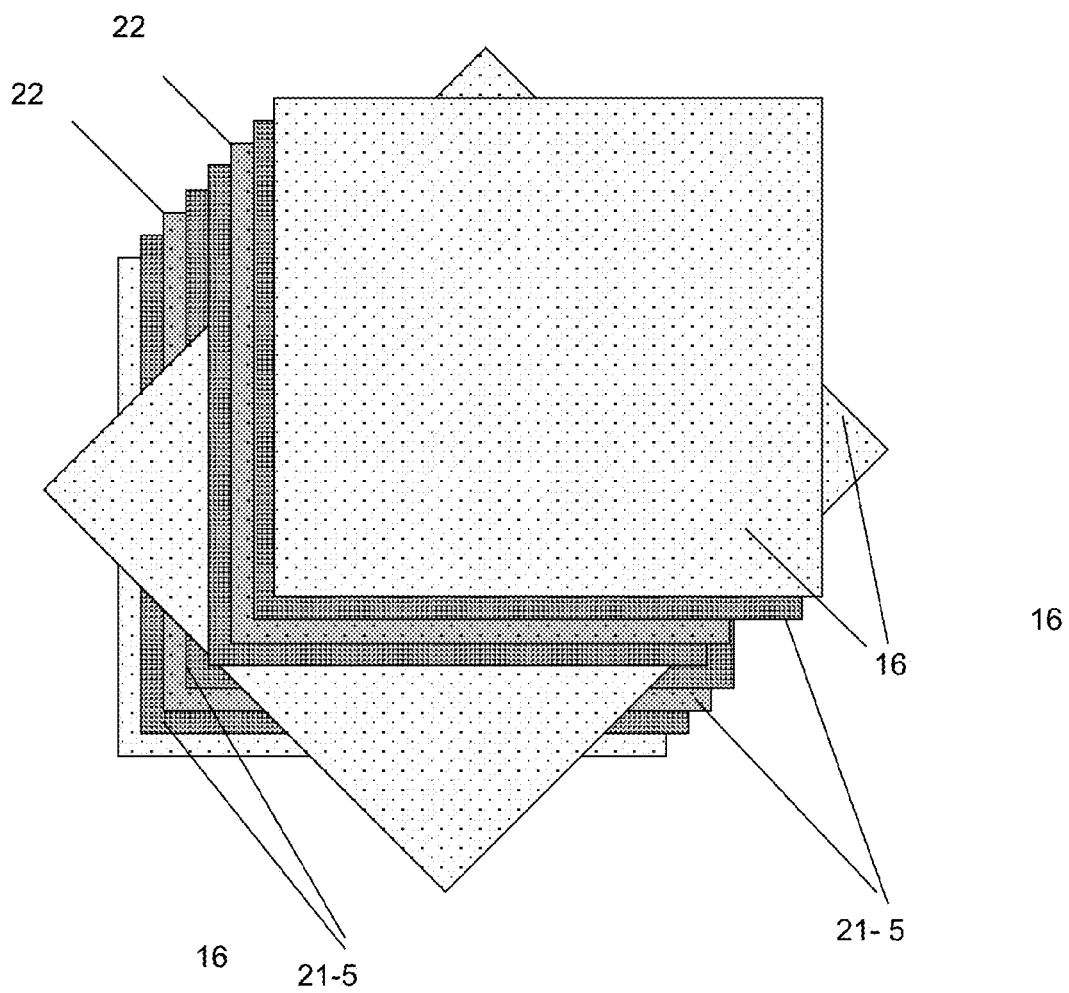
FIG. 46B is a plan view of the capacitor of FIG. 46A.

In one or more experiments, a combination of a metal and an organic bridging layer was employed in one or more capacitors. In one or more embodiments, a resin doped with carbon was used as the organic inner layer and Kovar was used as the metallic inner layer. A side view of the one or more capacitors is illustrated in FIG. 46A and a top view of the one or more capacitors is illustrated in FIG. 46B.

Voltage Build Up Through Stacking

Figure 47:
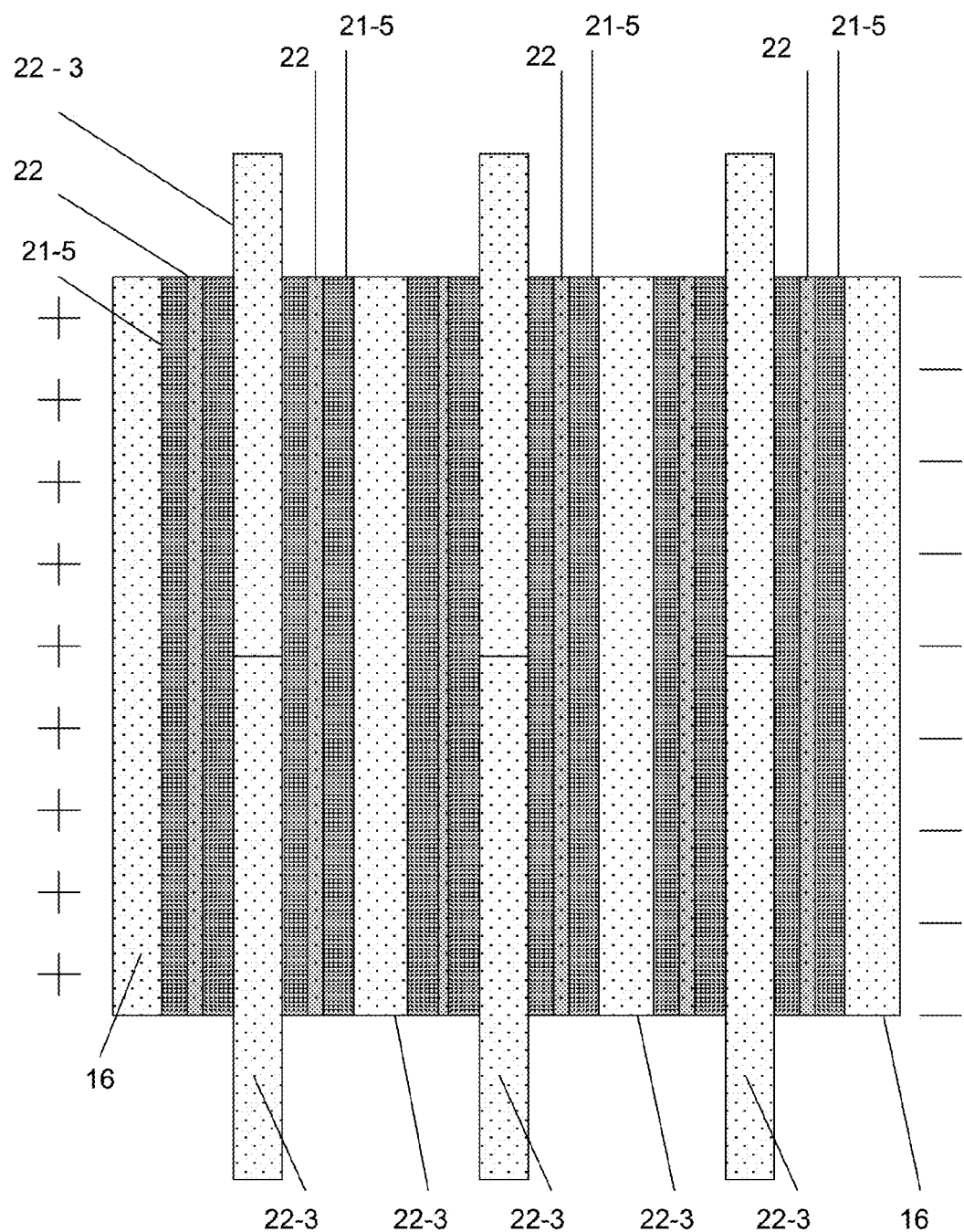
FIG. 47 illustrates a capacitor having five passive metallic inner-layers between external electrodes, according to at least one embodiment of the invention.

In one or more experiments, in order to reach higher voltage output while maintaining a large charge storage capability, a set of five (5) inner metal layers, referred to herein as metallic bridging layers, were used between two (2) external electrodes that were under bias. A representative example is illustrated as FIG. 47.

Voltage Decay Around 10V

Figure 48:
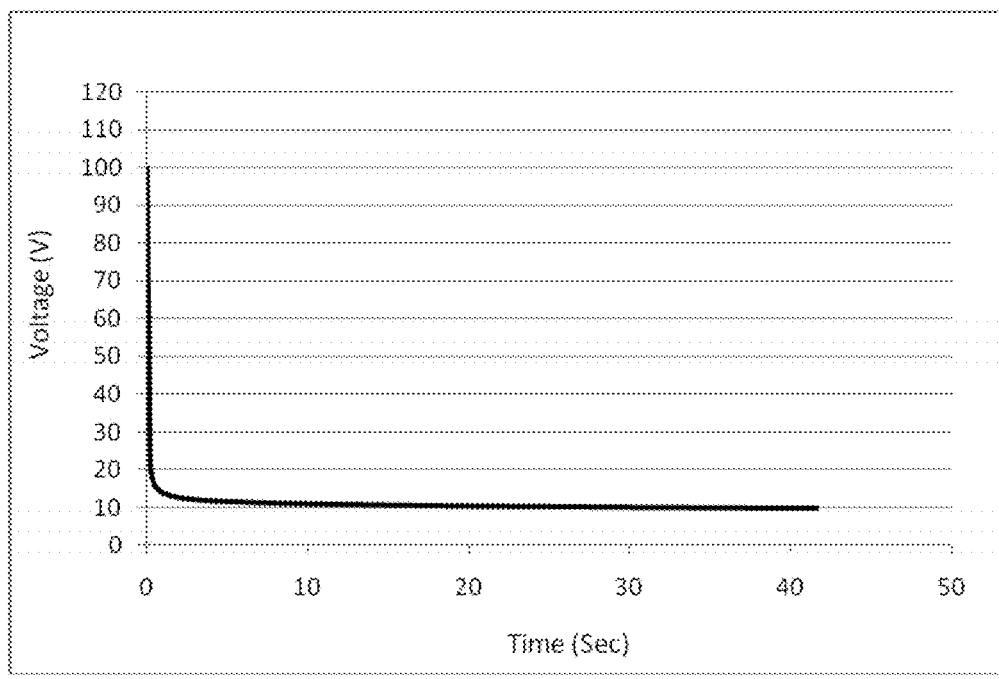
FIG. 48 graphically represents experimental results of the voltage decay in time of the capacitor of FIG. 47 where a voltage build up to 10V was demonstrated.

The one or more capacitors referred to in the section entitled "Voltage Build Up Through Stacking" were charged using a 100 Volt power supply and then discharged through an HP meter. The experimental results showing the voltage decay over time is illustrated in FIG. 48.

Figure 49:
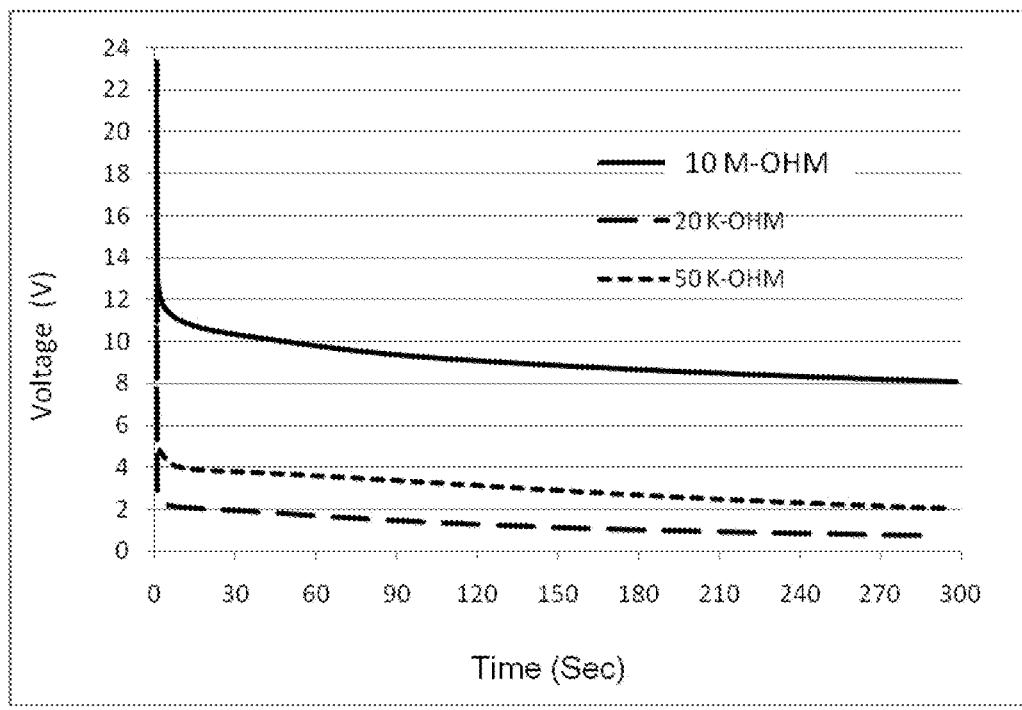
FIG. 49 graphically represents experimental results of the voltage decays in time of a capacitor discharged through various resistive loads from 10M-Ohm to 20 k-Ohm, according to at least one embodiment of the invention, FIG. 50 graphically represents experimental results of the voltage decays in time of a capacitor according to at least one embodiment of the invention and contrasted with the discharge of a commercially available electrolytic capacitor having 220 micro-Farads, each through the same resistance load.

In one or more experiments, the charge up and discharge of a capacitor according to one or more embodiments was performed. The discharge or voltage decay was done through the meter, then through a 50 K-OHM and a 20 K-OHM resistance load. Experimental results of the one or more experiments are illustrated in FIG. 49. As illustrated, the voltage through the meter was around 10 Volts and decreased over time for the decay through the meter. A lower voltage was observed through a 50 K-OHM and a 20 K-OHM resistance load. It was determined that this suggests that a higher resistance is better suited for discharging the ultra capacitor.

Figure 50:
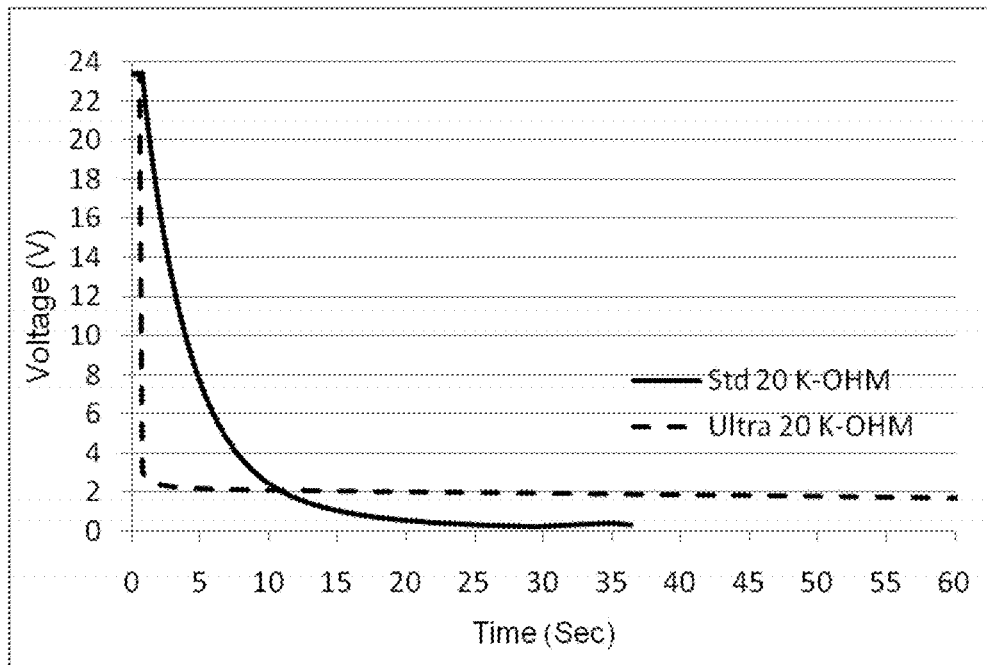
Figure 51:
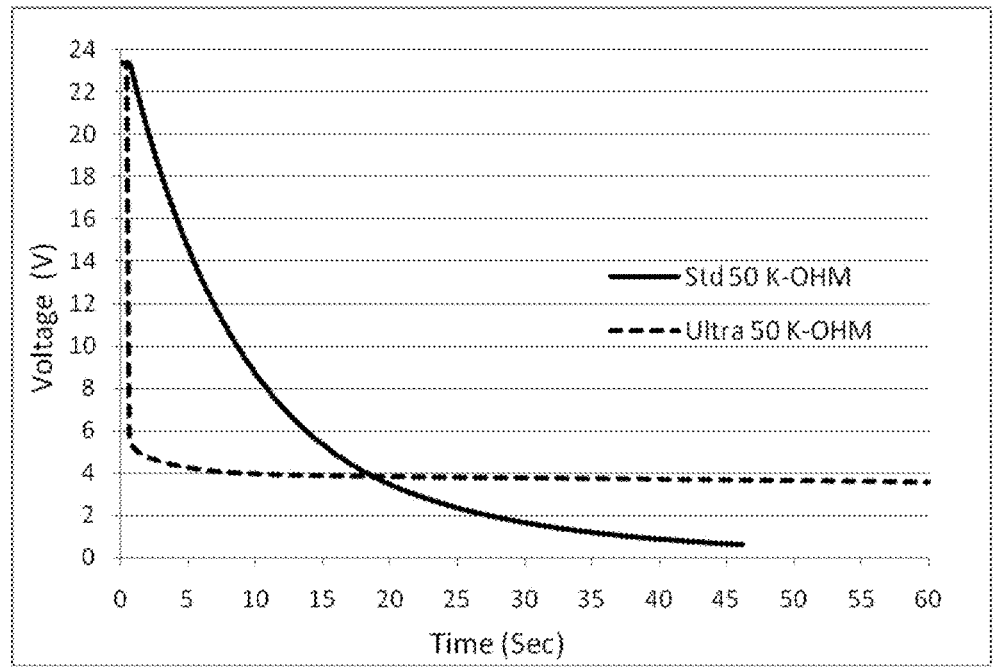
FIG. 51 graphically represents experimental results of the voltage decays in time of the capacitors investigated in FIG. 50, each through another resistance load that was different than that of FIG. 50.

In one or more experiments, a comparison between the ultra-capacitor and a commercially available 220 microfarad electrolytic capacitor was performed. The discharge was done through a 20 K-OHM resistance load in one or more experiments illustrated in FIG. 50 and through a 50 K-OHM resistance load in one or more experiments illustrated in FIG. 51.

The Charge Storage

Figure 52:
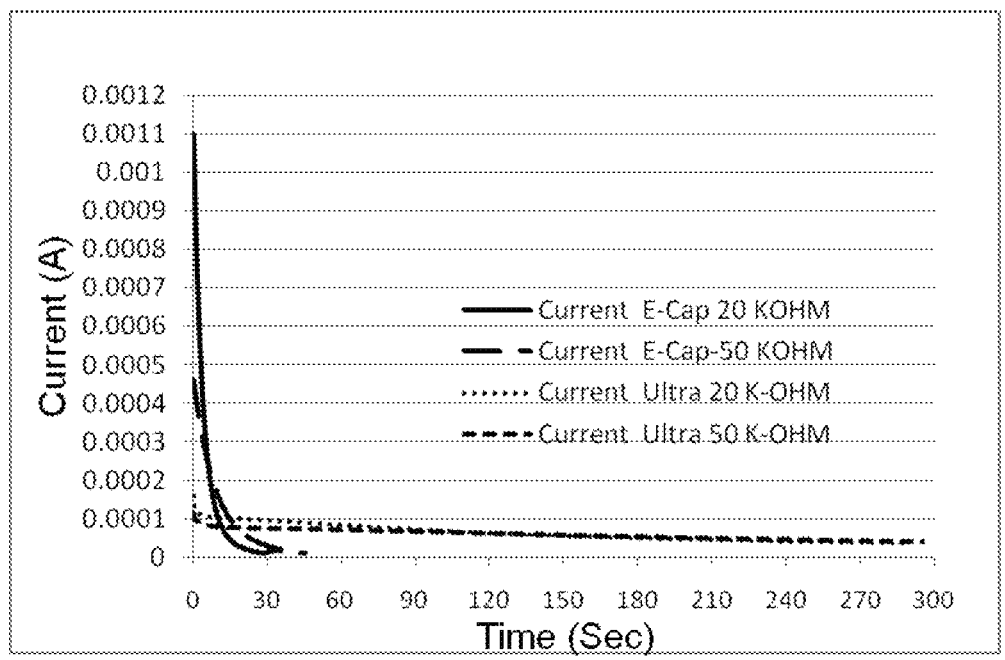
FIG. 52 graphically represents experimental results of the voltage decays in time of the capacitor of FIG. 47 and an electrolytic capacitor, each through first and second resistance loads.

The charge storage is directly related to the current flowing through the resistive load. Since the voltage decay is measured through a known resistive load, the current flowing through the load can be calculated by the ratio of voltage and resistance at any given point in time through the discharge period. In one or more experiments, the current flow through the resistive load through for the one or more capacitors referred to in the section entitled "Voltage Build Up Through Stacking" was measured and contrasted against an electrolytic capacitor. The experimental results are illustrated in FIG. 52.

The Cumulative Charge

Figure 53:
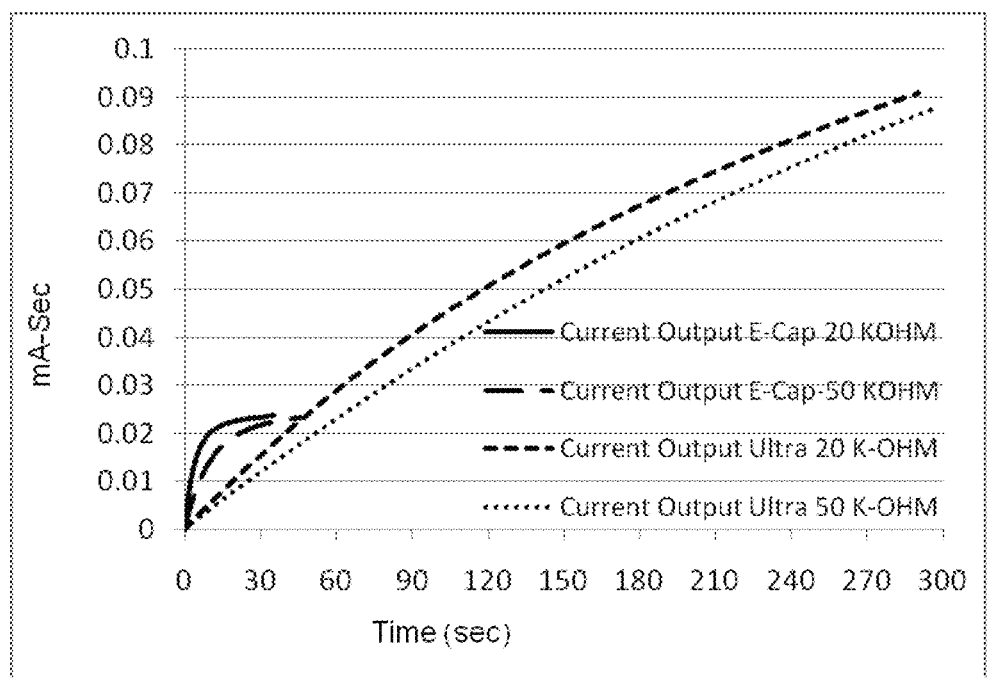
FIG. 53 graphically represents experimental results of the current flows through a resistive load per unit time for the capacitor of FIG. 47, taken at several resistance load values, contrasted with the current flow through a resistive load per unit time for an electrolytic capacitor of 220 micro Farads.

In one or more experiments, the current flow through a resistive load per unit time for the one or more capacitors referred to in the section entitled "Voltage Build Up Through Stacking" was integrated over a period of five (5) minutes and contrasted with the current flow through a resistive load per unit time for the electrolytic capacitor. The experimental results are illustrated in FIG. 53.

Discharge Through a Higher Resistive Load

Figure 54:
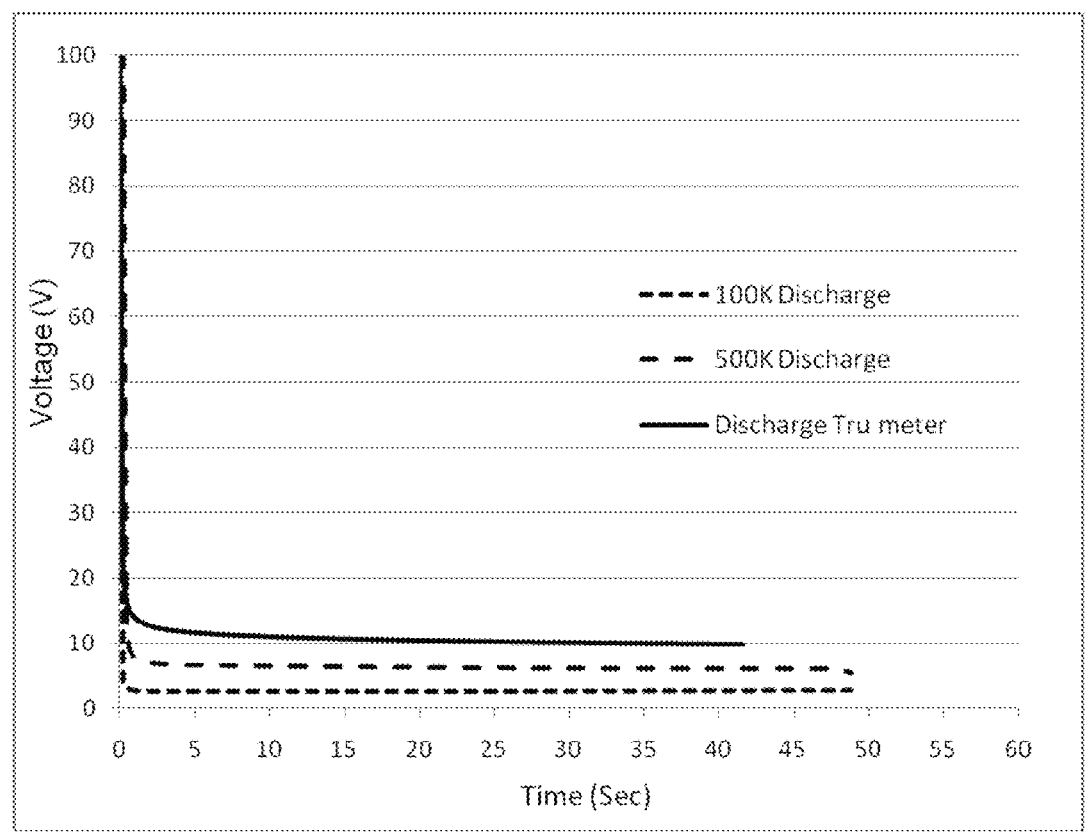
FIG. 54 graphically represents experimental results of the voltage decays in time of the capacitor of FIG. 47 through several resistance loads.
Figure 55:
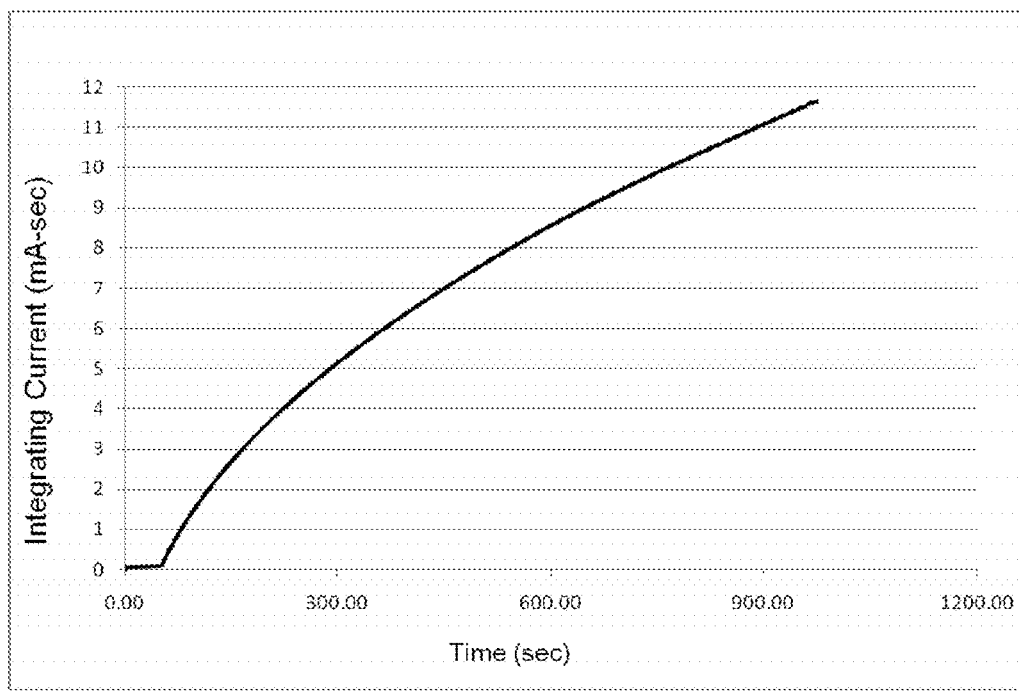
FIG. 55 graphically represents the charging of the capacitor as it was investigated in FIG. 54.
Figure 56:
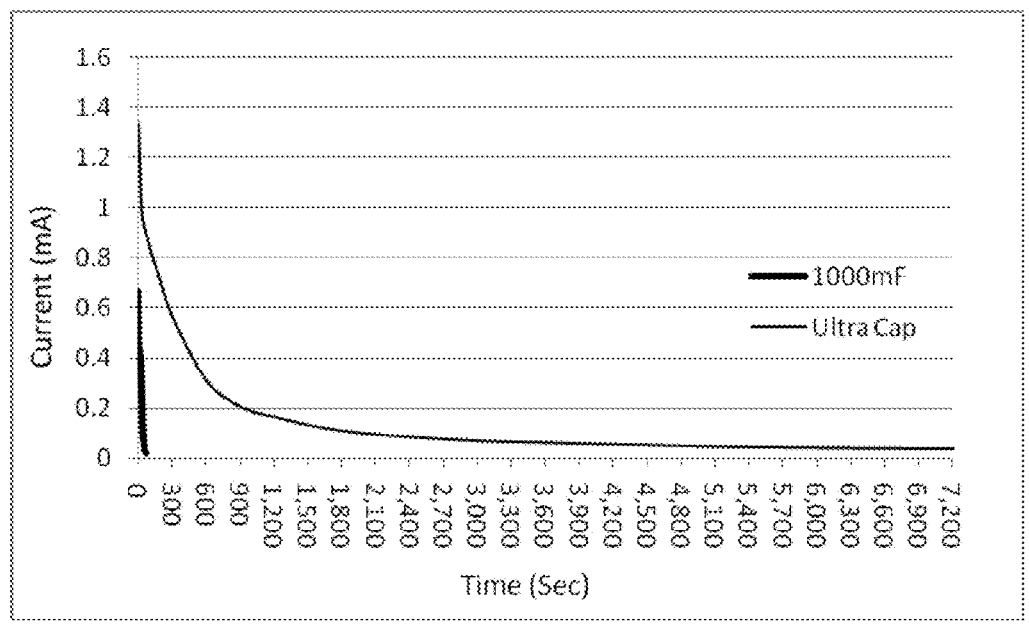
FIG. 56 contrasts the charging currents of a capacitor having 2 external electrodes and five metallic inner layers, according to at least one embodiment of the invention, and a 1000 mF capacitor.
Figure 57:
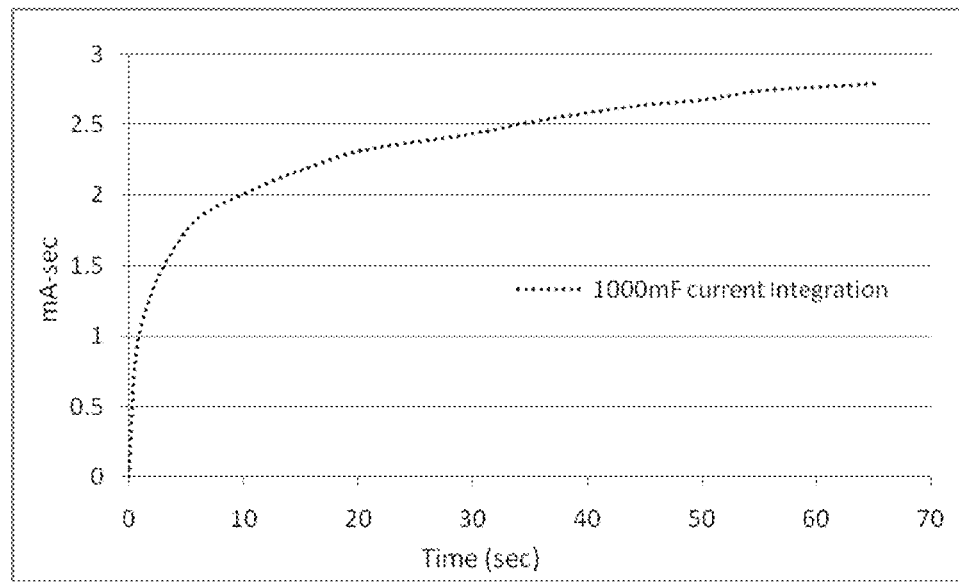
FIG. 57 graphically represents the cumulative charge output or current integration in mA-sec for a 1000 mF capacitor.
Figure 58:
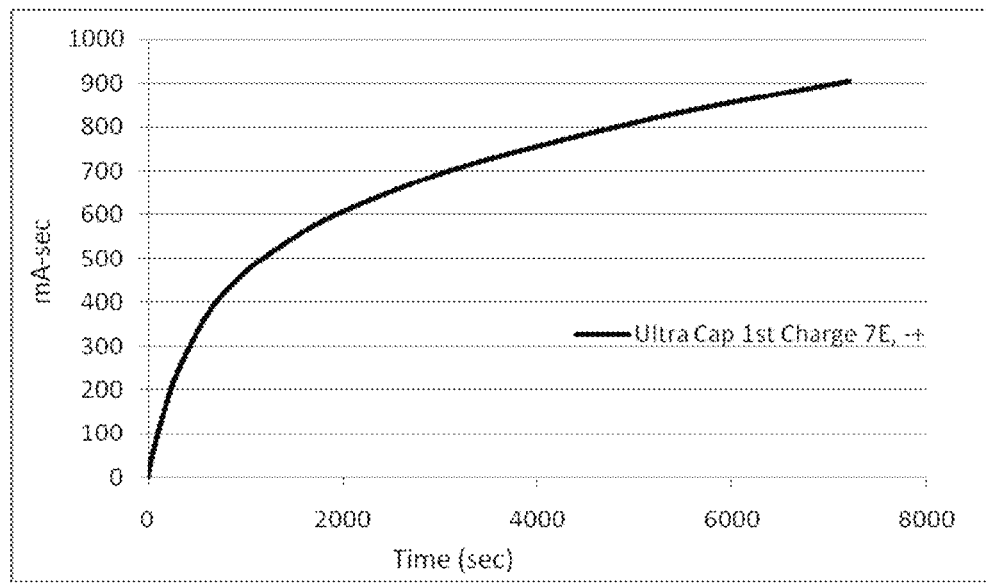
FIG. 58 graphically represents the cumulative charge output or current integration in mA-sec of the novel capacitor having two external electrodes and five metallic inner layers according to at least one embodiment of the invention.
Figure 59:
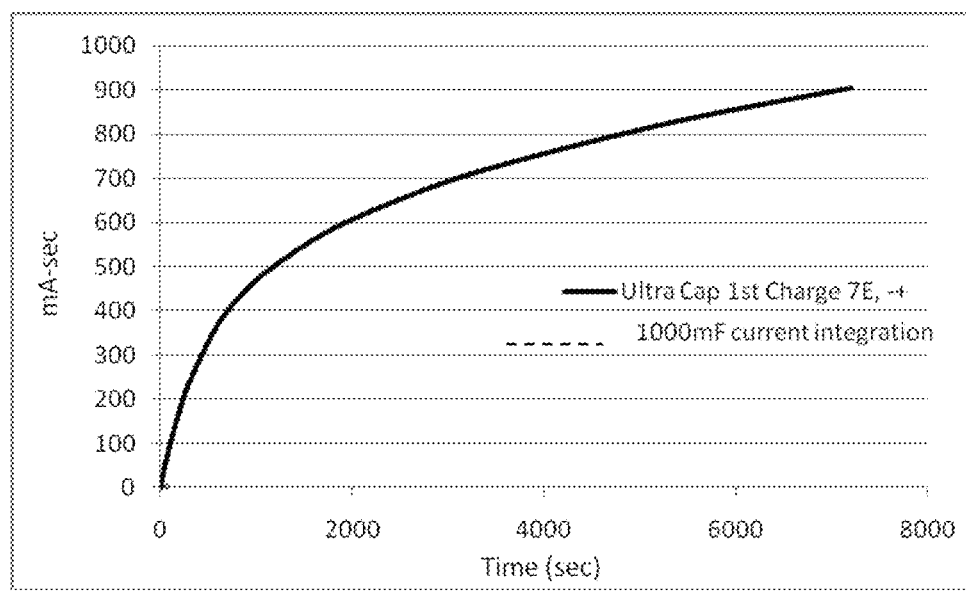
FIG. 59 contrasts the charge output in mA-sec for the novel capacitor having two external electrodes and five metal inner layers, according to at least one embodiment of the invention, and a 1000 mF capacitor.

In one or more experiments, the charge up of the one or more capacitors referred to in the section entitled "Voltage Build Up Through Stacking" using 100 Volts was performed followed by a discharge or voltage decay through the meter, then through a 500 K-OHM resistance load and a 100 K-OHM resistance load. Experimental results are illustrated in FIGS. 54 and 55. As illustrated, the voltage through the meter was around ten (10) Volts and decreased over time. A lower voltage was observed through a 100 K-OHM resistance load and a 500 K-OHM resistance load. It was determined that a higher resistance load is better suited for discharging the one or more capacitors as higher current flow is observed. FIG. 55 illustrates the integration of current and time.

Measuring Charging Current

In one or more experiments, one or more capacitors were built using seven (7) metal inner layers. In these one or more experiments, the one or more capacitors were charged and measured per unit time. The current flow into the one or more capacitors was measured and integrated to yield the current that flowed into the capacitor. This current was then contrasted with the charging current that went into a 1000 mF capacitor. In this manner, the charge storage capacitor of the one or more capacitors could be compared to a known charge storage capacity. Experimental results are illustrated in FIGS. 56 through 59.

Figure 60:
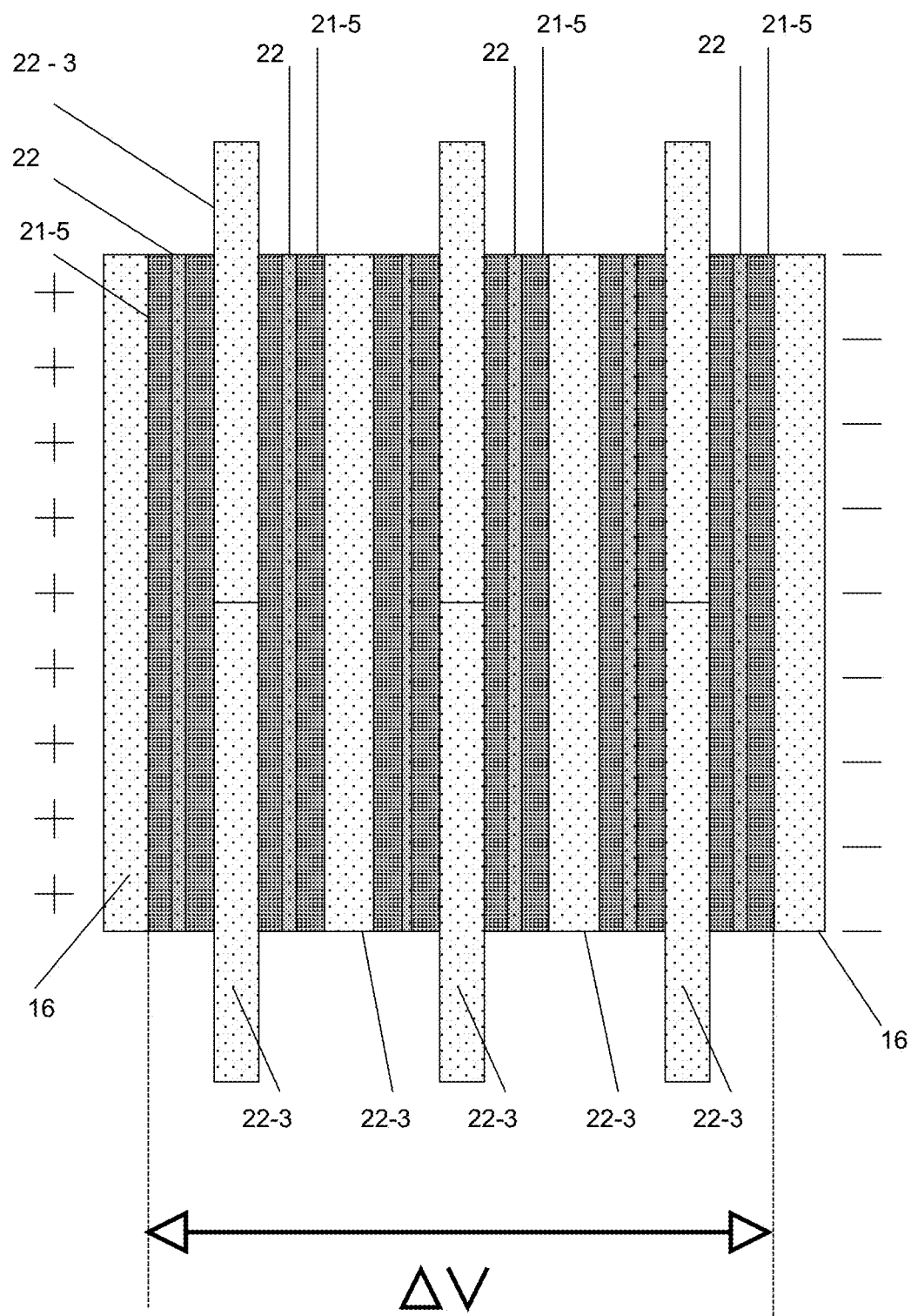
FIG. 60 represents the charging of the novel capacitor having two external electrodes and 5 metal inner layers, according to at least one embodiment of the invention.
Figure 61:
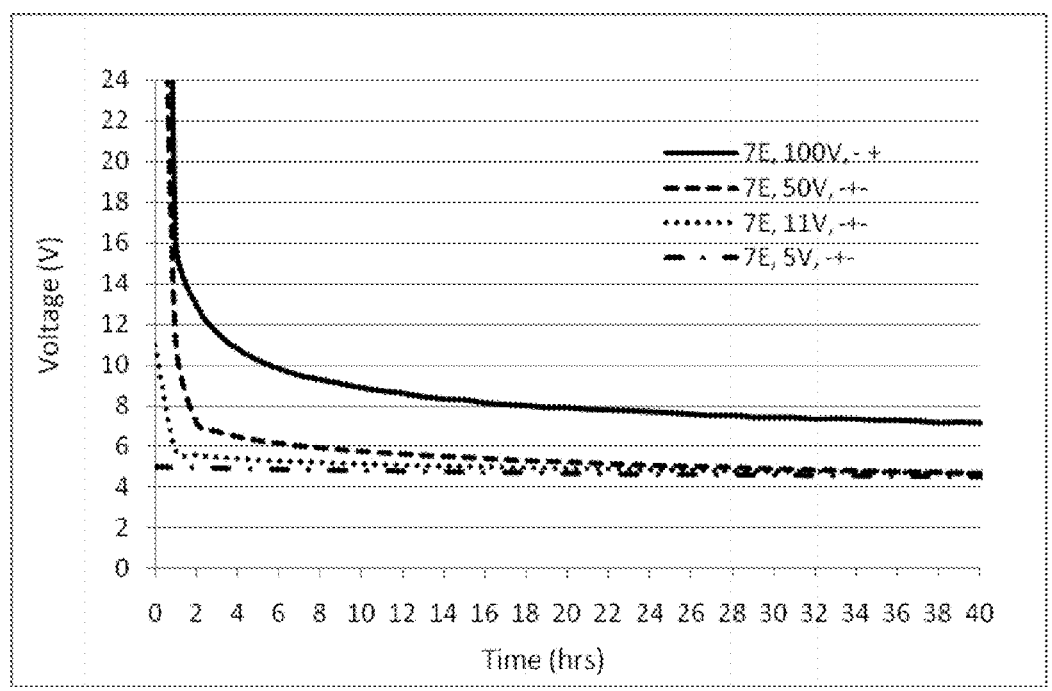
FIG. 61 graphically represents various voltage decay measurements performed on a capacitor having five metal inner layers, according to at least one embodiment of the invention, and charged according to FIG. 60 at various voltages including 100V, 50V, 11V and 5V.

Voltage-Build Up Through a Stack Up Having a 7 Metal Layer Ultra-Capacitor:

In one or more experiments, various voltage decay measurements were performed on the one or more capacitors using seven (5) metal inner layers to illustrate the buildup of charge as a function of voltage. Biasing takes place from the outer most electrodes and the voltage is distributed across the various electrodes as illustrated in FIG. 60. Experimental results are illustrated in FIG. 61 in which the biasing was done at various voltages on the external electrodes. In one or more experiments, the net voltage between adjacent electrodes is divided by the number of metal layers, resulting in a lower voltage operational regime where resistance is high and capacitance is high and leakage current is minimal. However, the capacitor needs a high biasing voltage for a good charge build up to be achieved. There is a capacitance and a resistance that builds up between any two (2) inner metal layers. The effective resistance of the system is the sum total of the resistances presented between each of the metal layers which happen to be configured in series. Since the resistance is high, more voltage is needed to drive more current. Conversely, the voltage decay following the biasing steps should exhibit a dependency of the biasing voltage. As illustrated in FIG. 61, the voltage decay is higher when biasing is performed at 50V, which in turn in higher than biasing preformed at 11V, which in turn is higher for biasing performed at 5V.

Figure 62:
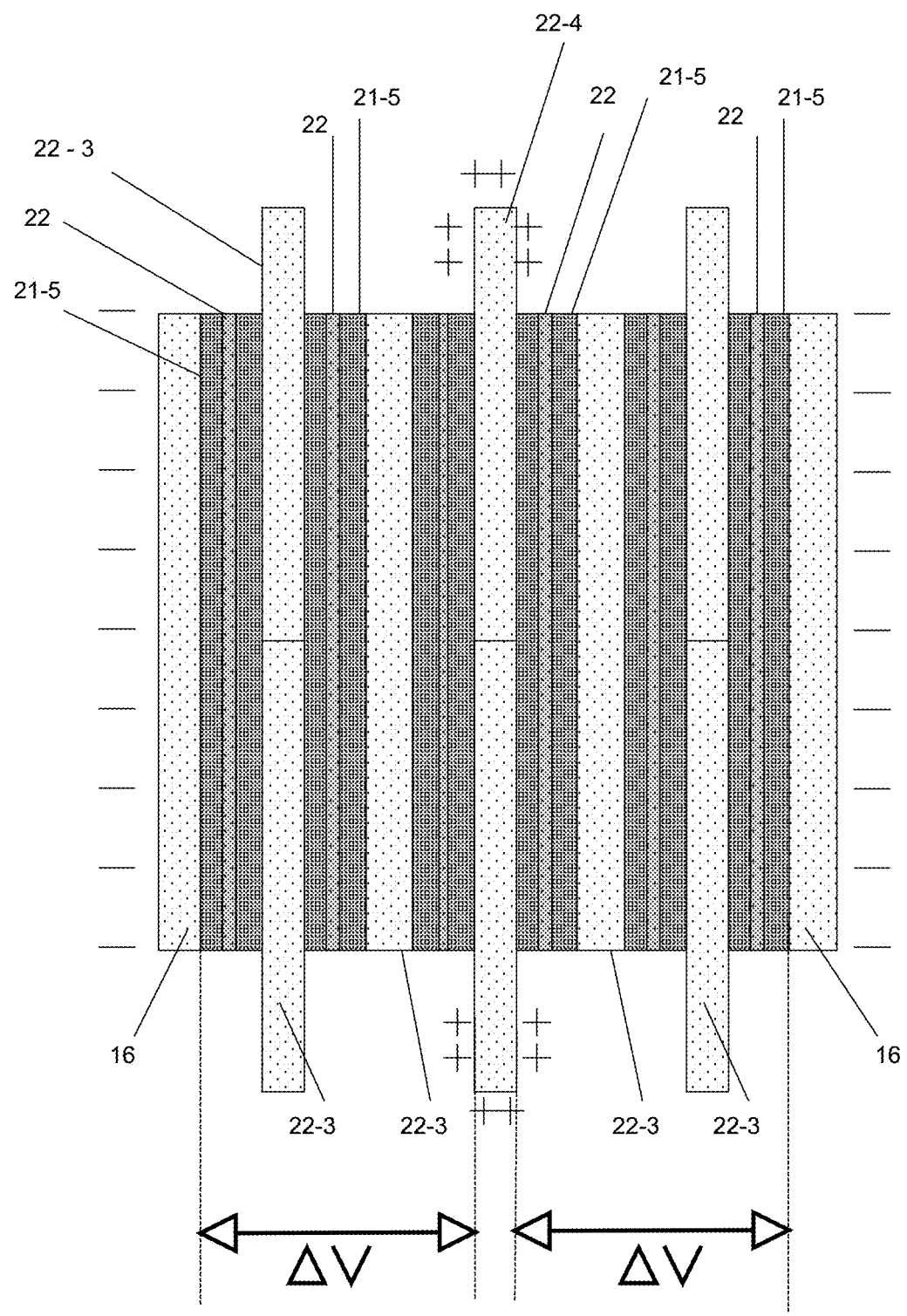
FIG. 62 represents the charging of a capacitor having two external electrodes and five metal inner layers, according to at least one embodiment of the invention, where the middle electrode was used as a positive pole and the two external electrodes were used as negative poles.

Since more voltage is needed to drive more charging current into the one or more capacitors using seven (5) metal inner layers, the middle electrode was used as the positive pole and the two (2) external electrodes were used as the negative poles as illustrated in the FIG. 62. Since the biasing takes place from the outer most electrodes and the center electrode, the applied voltage is distributed across two (2) sets of ultra-capacitors each having three (3) inner metallic layers. In these one or more experiments, the applied voltage is divided by the three (3) inner metallic layers and the resistance of the system is cut in half.

These one or more biasing configurations allow for doubling the voltage between adjacent electrodes since the same voltage is applied through half as many inner metallic layers. The resistance is cut in half since there are only half as many series of resistances between adjacent electrodes for the same applied voltage. It was determined that this effectively quadrupled the current.

Figure 63:
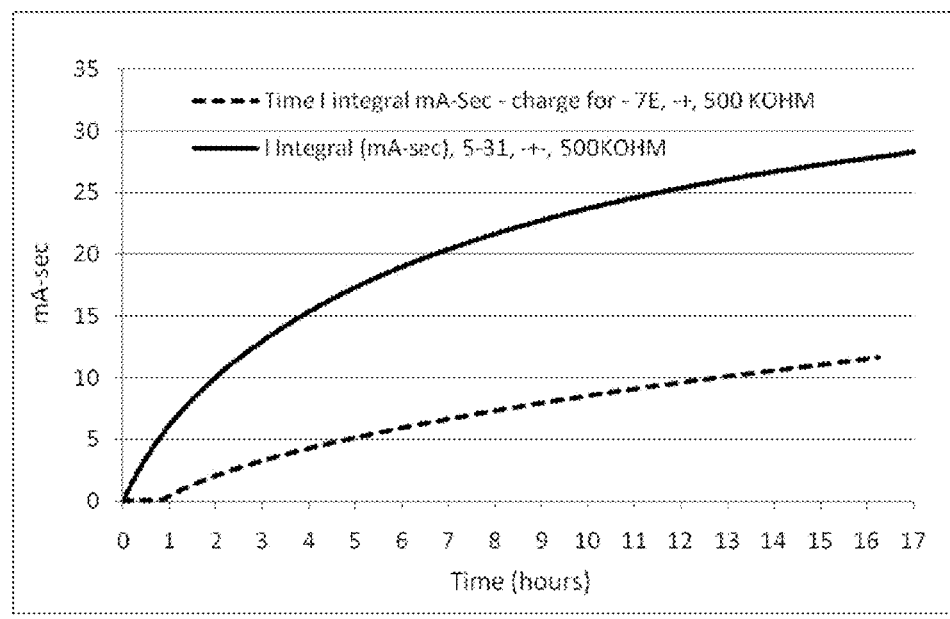
FIG. 63 graphically represents current integration or total charge output the novel capacitor having two external electrodes an five metal inner layers, that was biased using 100V charged according to the two different charging arrangements of FIGS. 60 and 62.

In one or more experiments, the voltage decay through a known resistive load enabled measurement of the current per unit time going through the load at any given time. In one or more experiments, the current was then integrated to yield the charge release in mA-sec as a function of time. As can be illustrated in FIG. 63, more current was stored in and discharged from the one or more capacitors that were charged using a center inner metal layer as a biasing pole compared to the one or more capacitors that were biased across its external electrodes.

Figure 64:
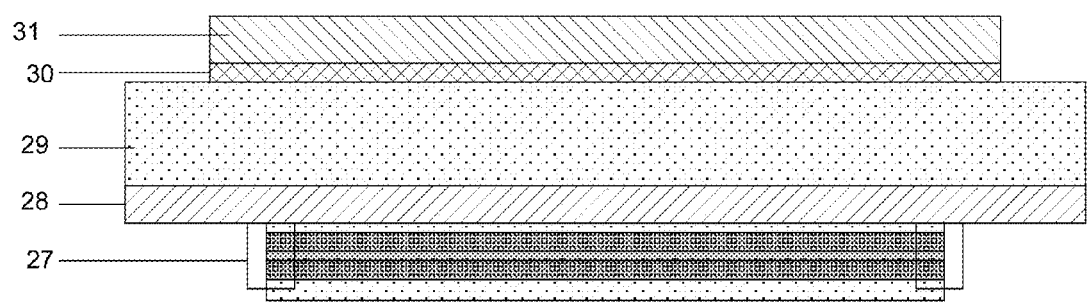
FIG. 64 graphically represents one or more capacitors for use with a photovoltaic array according to one or more embodiments disclosed herein.

The novel dielectric enables a novel fully integrated PV device that has the novel-supercapacitor device attached to it. A typical design would require the PV solar cell. The supercapacitor can be mounted or built on the backside electrode (28) in FIG. 64. The design is such that the TCO upper electrode (31), a semiconductor junction material (30) on top of a p-type or n-type semiconductor substrate (29) is connected in parallel with the supercapacitor with a safety diode placed to prevent back current through the solar cell. The diagram shows the backside electrode (28) serving as one of the direct supports for one of the supercapacitor electrodes. The other is mounted on the other side of a perimeter spacer (27) that permits addition of the electrolyte. Low cost requires that the supercapacitor electrodes be fabricated by a process that is fully compatible with the manufacturing process for the PV film stack. Metal contacts and electrodes can be deposited using the same processes as in PV manufacturing. A representative example according to one or more embodiments is illustrated in FIG. 64.

While the embodiments have been described in connection with the preferred embodiments of the various figures, it is to be understood that other similar embodiments may be used or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed:

1. A dielectric material comprising:
   at least one layer of material comprising:
   organometallic particles in a substantially continuous phase; and
   wherein the organometallic particles comprise stacked organometallic molecules, and
   wherein the organometallic particles include a first size of particles and a second size of particles.

2. The dielectric material of claim 1, wherein a chemistry of each of the organometallic molecules is formed of a complex of a metal with an organic molecule having delocalized electrons.

3. The dielectric material of claim 1, wherein a substantial number of the organometallic particles are electrically connected.

4. The dielectric material of claim 1, wherein the organometallic particles are embedded in an organic matrix.

5. The dielectric material of claim 1, wherein a substantial number of the organometallic particles are crystalline and comprise at least one organometallic crystal formed of stacked organometallic molecules.

6. The dielectric material of claim 1, wherein organometallic particles comprise metal-phthalocyanine particles.

7. The dielectric materials of claim 6, wherein the metal-phthalocyanine particles are selected from the group consisting of copper-phthalocyanine, zinc-phthalocyanine, magnesium-phthalocyanine, nickel-phthalocyanine, lead-phthalocyanine, iron-phthalocyanine and combinations thereof.

8. The dielectric material of claim 5, wherein the organometallic particles are crystalline and comprise at least one metal-phthalocyanine crystal formed of stacked metal phothlocyanine molecules.

9. The dielectric material of claim 2, wherein the continuous phase material comprises a second dielectric material in dispersed form.

10. The dielectric material of claim 8, wherein the second dielectric material is selected from the group consisting of $BaTiO_3$, ferroelectric, relaxor dielectric, alumina, silica, activated silica, alkali aluminosilicates, alkaline aluminosilicates and zeolites.

11. The dielectric material of claim 1, wherein the at least one layer of material comprises a first layer and a second layer, the first layer comprising the first type of organometallic particle, and the second layer comprising the second type of organometallic particle.

12. An energy storage device comprising a thickness of the dielectric material according to claim 1 and two electrodes disposed substantially on opposite surfaces of the at least single layer dielectric material.

13. The energy storage device of claim 12, wherein the electrodes are made of conductive materials including metals, metal alloys, carbon base conductors, graphene, activated carbon, carbon-nano-tubes, conductive polymers and organic polymers doped with carbon base conductors and metals, conductive materials with high surface area and high porosity, composited electrodes made of a combination of these materials.

14. The energy storage device of claim 13 wherein the dielectric material contains at least two layers, each layer formed of material from the group consisting of organometallic particles in substantially continuous form, and wherein the at least two layers further comprise an inner layer disposed between each of the at least two layers and said inner layer has conductive and/or semi-conductive layer.

15. The energy storage device of claim 14, wherein said inner layer is made of a viscous organic based material from having a high polarity and doped with conductive materials including silver, copper, gold, graphene, activated carbon, conductive polymers and other conductive materials and material combinations.

* * * * *